US010387882B2

(12) United States Patent
Hagen et al.

(10) Patent No.: US 10,387,882 B2
(45) Date of Patent: Aug. 20, 2019

(54) METHOD FOR USING SUPERVISED MODEL WITH PHYSICAL STORE

(71) Applicant: Klarna AB, Stockholm (SE)

(72) Inventors: Ted Hagen, Stockholm (SE); Karl Otto Henrik Björk, Stockholm (SE); Kristoffer Cassel, Stockholm (SE); Hans Erik Hjelm, Sollentuna (SE); Nils Emil Larsson, Stockholm (SE); Tobias Persson, Stockholm (SE); Sebastian Siemiatkowski, Stockholm (SE)

(73) Assignee: Klarna AB, Stockholm (SE)

(*) Notice: Subject to any disclaimer, the term of this patent is extended or adjusted under 35 U.S.C. 154(b) by 0 days.

(21) Appl. No.: 15/167,890

(22) Filed: May 27, 2016

(65) Prior Publication Data

US 2017/0004487 A1  Jan. 5, 2017

Related U.S. Application Data

(60) Provisional application No. 62/187,620, filed on Jul. 1, 2015.

(51) Int. Cl.
*G06Q 20/00* (2012.01)
*G06F 15/16* (2006.01)
(Continued)

(52) U.S. Cl.
CPC ....... *G06Q 20/4016* (2013.01); *G06F 16/215* (2019.01); *G06Q 20/20* (2013.01); *G06N 5/025* (2013.01)

(58) Field of Classification Search
CPC ............... G06Q 20/4014; G06Q 20/32; G06Q 30/0601; G06Q 20/4016; G06Q 20/20; G06F 17/30; G06N 5/025
See application file for complete search history.

(56) References Cited

U.S. PATENT DOCUMENTS 6,029,193 A   2/2000  Yamamoto et al.
8,103,650 B1  1/2012  Kauchak et al.
(Continued)

FOREIGN PATENT DOCUMENTS

JP    2007514333       5/2007
KR    20020012306 A    2/2002
(Continued)

OTHER PUBLICATIONS

Notice of Grounds for Rejection (JP) dated Oct. 20, 2015, issued in corresponding Japanese Application No. 2014-560359.
(Continued)

*Primary Examiner* — Ariel J Yu
(74) *Attorney, Agent, or Firm* — Davis Wright Tremaine LLP

(57) ABSTRACT

Details associated with a transaction are received from a first computing device. An identity of a party to the transaction is determined. An address to which communications to the party can be directed and accessed via a second computing device is obtained, where the second computing device is associated with the party. Confirmation data specific to the transaction is generated. The confirmation data is provided, via the address, to the second computing device. Confirmation of receipt of the confirmation data is received from the party. A set of payment options is provided to the part. A selection of a payment option is received from the party, and notice that the transaction has been completed is provided to the first computing device.

21 Claims, 19 Drawing Sheets

(51) Int. Cl.
  *G06Q 20/40* (2012.01)
  *G06Q 20/20* (2012.01)
  *G06F 16/215* (2019.01)
  *G06N 5/02* (2006.01)

(56) References Cited

U.S. PATENT DOCUMENTS

| | | | |
|---|---|---|---|
| 8,171,545 B1 | 5/2012 | Cooley et al. | |
| 8,321,425 B2 | 11/2012 | Custis et al. | |
| 8,494,897 B1 | 7/2013 | Dawson | |
| 8,606,696 B1 | 12/2013 | Halpern | |
| 8,818,910 B1 | 8/2014 | Liu et al. | |
| 8,998,159 B2 | 4/2015 | Pearson | |
| 9,092,516 B2 | 7/2015 | Ilyas et al. | |
| 9,324,098 B1 | 4/2016 | Agrawal et al. | |
| 9,355,155 B1* | 5/2016 | Cassel | G06F 21/552 |
| 9,514,452 B2 | 12/2016 | Dhar et al. | |
| 9,571,514 B2 | 2/2017 | Carter et al. | |
| 2001/0023414 A1 | 9/2001 | Kumar et al. | |
| 2001/0032182 A1 | 10/2001 | Kumar et al. | |
| 2003/0014633 A1 | 1/2003 | Gruber | |
| 2003/0018636 A1 | 1/2003 | Chi et al. | |
| 2003/0163790 A1 | 8/2003 | Murata | |
| 2003/0167245 A1 | 9/2003 | Murata | |
| 2005/0021462 A1* | 1/2005 | Teague | G06Q 20/04 705/40 |
| 2005/0097040 A1 | 5/2005 | Chen et al. | |
| 2005/0125338 A1 | 6/2005 | Tidwell et al. | |
| 2005/0166065 A1 | 7/2005 | Eytchison et al. | |
| 2008/0021890 A1 | 1/2008 | Adelman et al. | |
| 2008/0133407 A1 | 6/2008 | Guillory et al. | |
| 2009/0119182 A1* | 5/2009 | Krstulich | G06F 21/42 705/26.1 |
| 2009/0171759 A1* | 7/2009 | McGeehan | G06Q 30/02 705/35 |
| 2009/0305673 A1 | 12/2009 | Mardikar | |
| 2010/0042487 A1 | 2/2010 | Barazani | |
| 2010/0042827 A1 | 2/2010 | Pratt et al. | |
| 2010/0293094 A1 | 11/2010 | Kolkowitz et al. | |
| 2011/0131122 A1 | 6/2011 | Griffin et al. | |
| 2011/0306368 A1* | 12/2011 | McCarthy | G06Q 30/0241 455/466 |
| 2011/0307381 A1 | 12/2011 | Kim et al. | |
| 2012/0078888 A1 | 3/2012 | Brown et al. | |
| 2012/0204257 A1 | 8/2012 | O'Connell et al. | |
| 2013/0097157 A1 | 4/2013 | Ng et al. | |
| 2013/0226865 A1* | 8/2013 | Munemann | G06F 3/0482 707/609 |
| 2013/0301953 A1 | 11/2013 | Montague | |
| 2013/0322709 A1 | 12/2013 | Irani et al. | |
| 2014/0074687 A1 | 3/2014 | Halpern | |
| 2014/0136608 A1 | 5/2014 | Lin et al. | |
| 2014/0164218 A1 | 6/2014 | Stewart | |
| 2014/0207518 A1 | 7/2014 | Kannan et al. | |
| 2014/0229408 A1 | 8/2014 | Vijayaraghavan et al. | |
| 2014/0279299 A1 | 9/2014 | Erenrich | |
| 2014/0279509 A1 | 9/2014 | Khilnani et al. | |
| 2014/0280592 A1* | 9/2014 | Zafarani | H04L 67/22 709/204 |
| 2015/0039292 A1 | 2/2015 | Suleman et al. | |
| 2015/0046302 A1 | 2/2015 | Hu et al. | |
| 2015/0066158 A1 | 3/2015 | Kim et al. | |
| 2015/0121482 A1 | 4/2015 | Berman et al. | |
| 2015/0127628 A1 | 5/2015 | Rathod | |
| 2015/0188851 A1* | 7/2015 | Tomkins | H04L 51/00 709/206 |
| 2015/0237039 A1 | 8/2015 | Grajek et al. | |
| 2015/0263999 A1* | 9/2015 | Levin | G06F 17/2785 709/206 |
| 2016/0034463 A1 | 2/2016 | Brewer | |
| 2016/0042288 A1 | 2/2016 | Cohen et al. | |
| 2016/0239837 A1* | 8/2016 | Klingen | G06Q 20/38215 |
| 2016/0307210 A1 | 10/2016 | Agarwal et al. | |
| 2016/0314316 A1 | 10/2016 | Patil et al. | |
| 2016/0378919 A1 | 12/2016 | McNutt et al. | |
| 2017/0004487 A1 | 1/2017 | Hagen et al. | |

FOREIGN PATENT DOCUMENTS

| | | |
|---|---|---|
| KR | 20090126666 A | 12/2009 |
| WO | 2011097397 A1 | 8/2011 |

OTHER PUBLICATIONS

Kim, W. and O. Jeong, "On Leveraging Social Web Sites," Innovative Computing, Information and Control (ICICIC), 2009 Fourth International Conference on, IEEE, Piscataway, NJ, Dec. 7, 2009, pp. 1273-1276.

Krishna Hari, K. Kokula and S. P. Rajan "A Clubbing of e-Commerce and Social Networking Sites," Ubiquitous Computing and Multimedia Applications (UCMA), 2011 International Conference on, Apr. 13-15, 2011, pp. 8-9.

Musiał, K. and P. Kazienko, "Social networks on the Internet," World Wide Web: Internet and Web Information Systems (WWW), Springer US, Jan. 26, 2012, pp. 31-72, 16:1, doi:10.1007/s11280-011-0155-z.

Korean Notice of Preliminary Rejection, Patent Application No. 10-2014-7028021, filed Mar. 6, 2013, 6 pages.

International Preliminary Report on Patentability dated May 26, 2014 in International Application No. PCT/EP13/54529.

International Search Report dated Jun. 5, 2013 in International Application No. PCT/EP13/54529.

Written Opinion of the International Searching Authority dated Jun. 5, 2013 in International Application No. PCT/EP13/54529.

\* cited by examiner

METHOD FOR USING SUPERVISED MODEL WITH PHYSICAL STORE

CROSS REFERENCE TO RELATED APPLICATION

This application incorporates by reference for all purposes the full disclosure of co-pending U.S. patent application Ser. No. 14/830,686, filed Aug. 19, 2015, entitled "METHOD FOR USING SUPERVISED MODEL TO CONFIGURE USER INTERFACE PRESENTATION," co-pending U.S. patent application Ser. No. 14/830,690, Aug. 19, 2015, entitled "METHOD FOR USING SUPERVISED MODEL TO CONFIGURE USER INTERFACE PRESENTATION," and co-pending U.S. patent application Ser. No. 14/918,169, filed Oct. 20, 2015, entitled "WORKFLOW PROCESSING AND USER INTERFACE GENERATION BASED ON ACTIVITY DATA." This application claims priority from U.S. Provisional Application No. 62/187,620, filed on Jul. 1, 2015, entitled "INCREMENTAL LOGIN AND AUTHENTICATION TO USER PORTAL WITHOUT USERNAME/PASSWORD," the content of which is incorporated by reference herein in its entirety.

BACKGROUND

As computers and computer networks become ubiquitous, more and more transactions are being conducted over computer networks. Various mechanisms and procedures have been implemented in order to make such transactions secure and in order to verify and authenticate the parties involved. Often, such verification and authentication requires the user to input information that the user may not readily remember, is intrusive, or is not easily accessible to the user. Accordingly, requiring the user to input such information impedes the transaction and adversely affects the user experience, which may cause fewer transactions to be conducted over computer networks.

BRIEF DESCRIPTION OF THE DRAWINGS

Various embodiments in accordance with the present disclosure will be described with reference to the drawings, in which.

DETAILED DESCRIPTION

Figure 1:
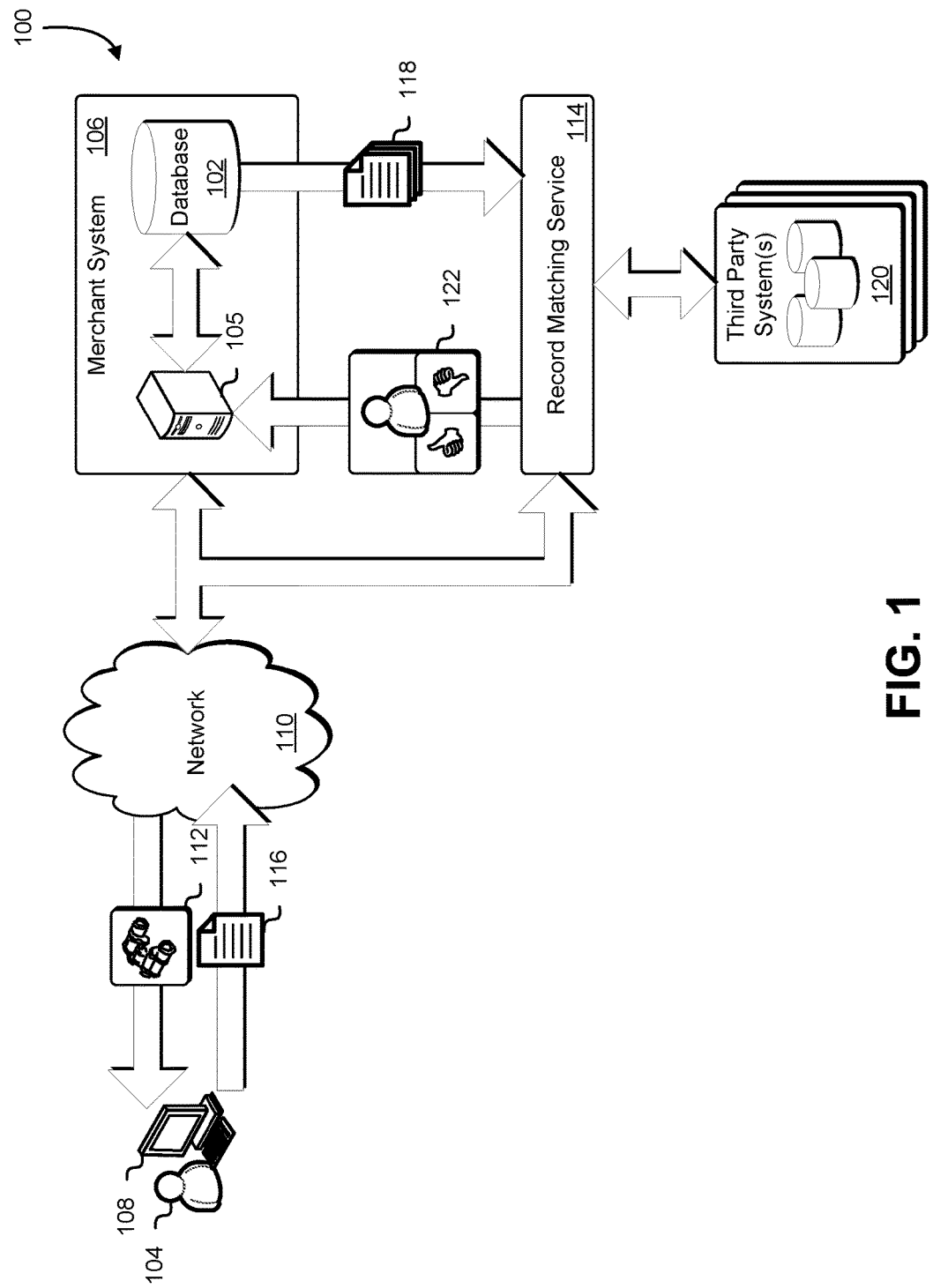
FIG. 1 illustrates an example of a record matching service interacting with other entities in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested in the present disclosure include a system and method for determining an identity of a user based on details corresponding to an order, where the details lack a ground truth value that identifies the user. The techniques described include receiving a request to determine a user identity associated with details of an order, user registration, access information, or the like. The request may include details from which a set of values that correspond to values in fields of a database of historical records can be extracted. In some examples, "historical records," may refer to a data set in which data similar to the details or the set of values have been previously stored, at least some of the data in the data set having originated from a different source (e.g., one or more different users than the user associated with the user identity) than the current source of the details.

The set of values may be transformed into a normalized set of search terms, and a set of inverse document frequencies (IDFs) corresponding to the set of search terms may be calculated. Examples of transforming values into search terms include converting be values to upper or lower case (e.g., "Lars" into "lars"), concatenating multiple values into a single search term (e.g., "henry" and "gibson" into "henrygibson"), removing leading zeros, padding with leading zeros, removing white space, padding with white space, truncating a value (e.g., "donald" into "don"), removing nonnumeric characters (e.g., "$1,000" becomes "1000"), adding nonnumeric characters (e.g., "127000000001" into "127.000.000.001"), adding wildcard characters (e.g., "main st*"), and so on. The inverse document frequencies may reflect how common the search term is in the database of historical records. For example, an IDF of a search term that occurs in 10,000 records of the database will be lower than an IDF of a search term that occurs in 100 records of the database. Thus the higher the IDF, the more rare (i.e., uncommon) the term is. Rare terms may be more likely to indicate that a current user is associated with or the same as the user that corresponds to matching records in the database.

Historical records are retrieved based on the search queries. For example, for a given name search term of "henry" and a family name search term of "gibson" may retrieve a set of records containing either given name field values matching "henry," family name field values matching "gibson," or both. The retrieved historical values may be ranked according to a ranking scheme, which may be based on frequencies of matched values, and a subset of top ranking historical records may be selected and evaluated through a specially trained supervised model called a random forest. The supervised model may output, for each of the top ranking historical records, a confidence score, which may be based on votes cast by decision trees in the random forest. A business rule management system may then determine, based on a set of rules and the confidence scores, whether the user is the same as a user associated with some or any of the top scoring historical records.

Techniques described and suggested in the present disclosure further include receiving a set of field values that corresponds to a transaction. The set of field values may include the values input by a user into form fields of the website of an online merchant. The set of field values may also include one or more other details about the transaction, including an Internet protocol address of one or more computing devices involved in the transaction, time, and/or date. Based on the set of field values, identifying information for the user that is a party to the transaction may be obtained, such as the user's identity (which may be determined according to techniques described above), the user's age, the user's e-mail address, the user's phone number, and so on. Information about previous transactions may also be obtained based on the user's determined identity, such as information about one or more previous purchases by the user.

A characteristic associated with the customer, such as a credit risk (e.g., likelihood of default by the user), may be calculated, and, based on this characteristic, previous transaction information, and the identifying information, a set of inputs may be generated. For each possible payment type potentially available for the user, the set of inputs may be passed to a random forest of the supervised model to obtain a score indicating a likelihood that the user will prefer to pay for the transaction using that particular payment type. The random forest in this embodiment is a random forest that was trained on a data set of previous purchases of various users, with the records of the data set having one or more ground truth values, at least one of which being the payment type selected for the particular purchase by the particular user.

Based on the scores for each of the potential payment types, the system may select the user interface customized around the payment type most likely preferred by the user. For example, if previous purchases indicate that payment type for purchases made between 9:00 AM and 5:00 PM is usually direct bank withdrawal, but outside those hours payment type is usually by credit card, if the transaction is occurring at 10:53 PM, the system may select to display credit card as the default payment type in the checkout user interface. Upon selection of the payment option by the user the system may perform the particular workflow associated with that payment type.

Techniques described and suggested in the present disclosure further include techniques for determining an ideal balance between credit pricing and customer conversion. In other words, determining an ideal reduction in the cost of credit in order to encourage more users to finalize transactions, thereby allowing a creditor to maintain profitability through increased volume. Techniques described and suggested in the present disclosure further include techniques for using a random forest of the supervised model to determine likelihood, based on details associated with the transaction, that a customer will return one or more items from the transaction. By predicting the likelihood of returns, efficiency can be achieved in merchant systems by, for example, allowing additional information for payment processing (i.e., because some products may be in-transit back to the merchant, and therefore the customer need not be charged in full for the order) and providing the merchant with a more dynamic inventory (e.g., the merchant may not need to restock some items if returns of some items are expected).

Techniques described and suggested in the present disclosure further include predicting, using a random forest of the supervised model, future purchasing behavior of users based on browsing habits. For example, if a user browses product pages for 32-inch televisions of one or more merchants, the system of the present disclosure may conclude that the user is on the verge of purchasing a 32-inch television, and, accordingly, may present promotions or price reductions for 32-inch televisions. Techniques described and suggested in the present disclosure further include predicting likelihood, using a random forest of a supervised model, that a user will not complete a transaction, and, accordingly, may present promotions or other incentives in order to encourage such users to complete their transactions. Techniques described and suggested in the present disclosure further include utilizing a 3-D Secure security layer for credit card transactions based on a predicted likelihood, as determined by a random forest of the supervised model, that a user will not complete a transaction.

Techniques described and suggested in the present disclosure are directed to an improvement of computer functionality, specifically the field of user authentication, by determining an identity of the user without requiring credentials such as username and password. Additionally, techniques described and suggested in the present disclosure improve the efficiency, by utilizing a random forest, trained using population data having ground truth values for user identities, of computer systems that perform user authentication, enabling such computer systems to determine the user identity and compute a confidence score within a threshold amount of time (e.g., 50 milliseconds). Moreover, described and suggested techniques discussed herein are necessarily rooted in computer technology in order to overcome problems specifically arising with ease-of-use of computing devices for conducting transactions between parties over a computer network by verifying one or more identities of the parties to the transaction using top-of-mind information and/or details intrinsic to the transaction itself. For example, online payment systems generally use computer-implemented techniques for authentication, thereby allowing such online payment systems to perform automated processing of payments while ensuring with high probability that payments are authorized by a proper party (i.e., one with authorization to utilize a payment instrument). Techniques described and suggested herein allow for such online payment systems to operate more efficiently and in a manner that addresses many of the cumbersome aspects of conventional authentication techniques, thereby making such online payment systems easier to use. Further, many organizations employ complex systems to customize user interfaces, such as web pages. Techniques described and suggested herein allow for more efficient and/or more effective customization of such user interfaces, including user interfaces for online payment systems.

FIG. 1 illustrates an overview of the main components of a system 100 for implementing some embodiments described in the present disclosure. As illustrated in FIG. 1, the system 100 may be configured to facilitate a transaction, by way of communications over at least one network 110, between a remote user 104, using a user device 108, and a merchant system 106. The merchant system 106 may include at least one server 105 in communication with the user device 108 through the network 110.

The merchant system 106 may be a website or other Internet-accessible platform configured to provide goods and/or services to customers at a price. Note that although the system 100 is described in the context of an online marketplace, it is contemplated that the system may be usable in other contexts. For example the merchant system, rather than being an online marketplace, may be a system hosting a social media site, a news site, or other site configured to perform operations based on the identity of the remote user 104. The merchant system 106 may include a merchant database 102 in communication with the server 105.

The remote user 104 may be an individual attempting to purchase an item or service from the merchant corresponding to the merchant system 106. As noted, embodiments of the present disclosure can be implemented in other contexts; for example, the remote user 104 may be a user attempting to register or authenticate as a user of a media website hosted by the merchant system 106. As illustrated in FIG. 1, the remote users 104 may access, through the network 110 using the user device 108, a website, such as an online marketplace, that is hosted on the at least one server 105.

The database 102 may be an organized collection of data, such as tables, queries, reports, views, and other objects. The database 102 may be configured for the storage and retrieval of data for the merchant system 106. For example, the database 102 may include, among other things, information about the products being sold by the merchant, such as quantity in stock, price, description, images of the products, and so on. The at least one server 105 may be configured to host a website and/or other applications for the merchant. The database 102 may also be a repository for historical information 118, such as details about past orders, identifiers for customers who have previously purchased something from the merchant, and other such information. Examples of such repositories include those commercially available from Oracle®, Microsoft®, Sybase®, and IBM® as well as open-source repositories such as MySQL, Postgres, SQLite, MongoDB, and any other repository capable of storing, retrieving, and accessing structured or unstructured data.

Figure 19:
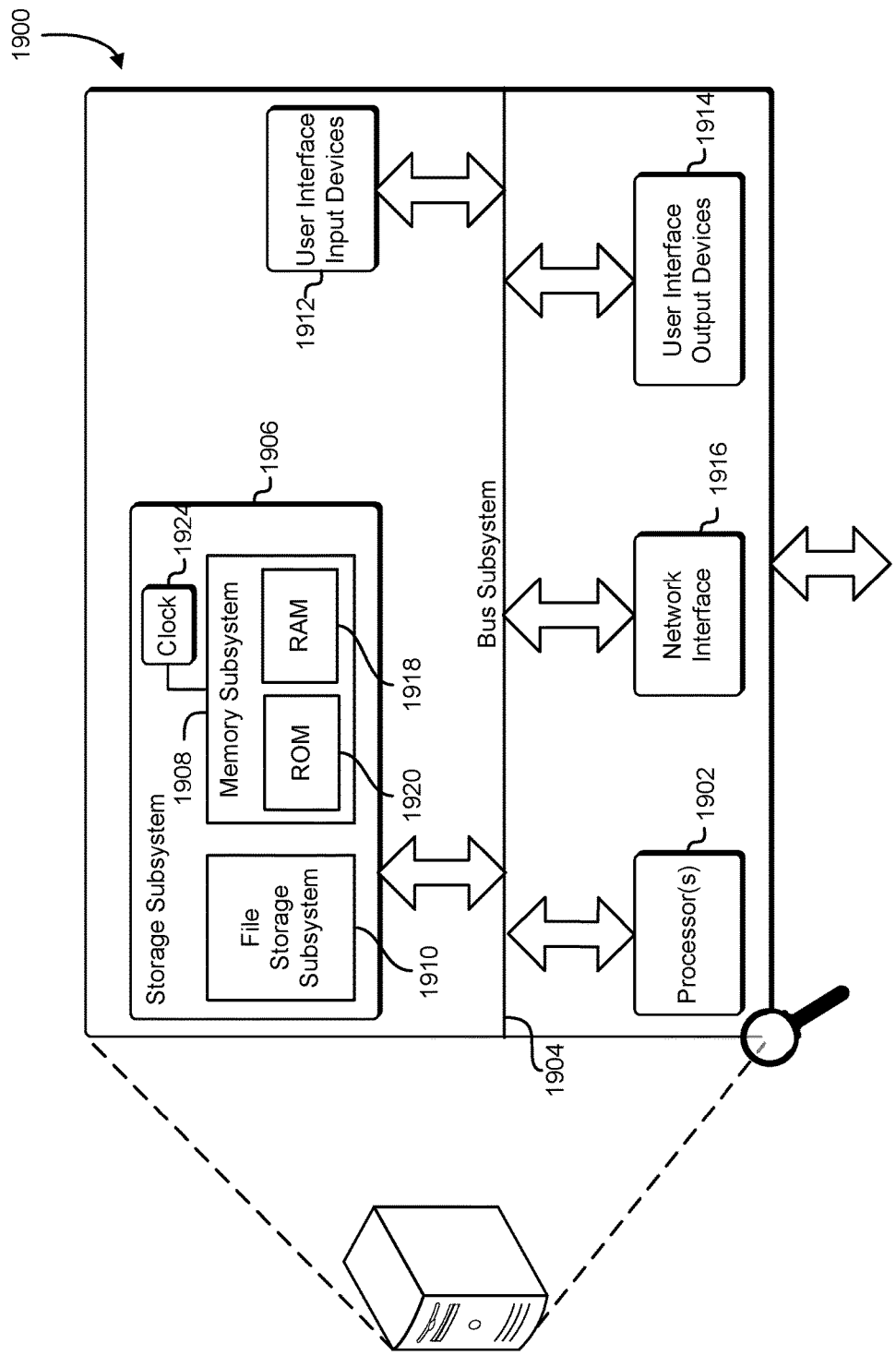
FIG. 19 illustrates a computing device that may be used in accordance with at least one embodiment.

The user device 108 may be an electronic computing device, such as a personal computer, mobile device, tablet computer, home theater device, or a device similar to the device 1900 of FIG. 19, configured to communicate with sites like the website of the merchant system 106, such as through a browser and/or application programming interface. The network 110 represents the path of communication between the remote user 104 and merchant system 106 and/or the record matching service 114. Examples of the network 110 include the Internet, a local area network, a wide area network and Wi-Fi.

FIG. 1 specifically depicts the remote user 104 attempting to purchase an item 112 through the merchant system 106, such as through an application programming interface call or other user interface to the merchant systems 106. As noted, the element represented by the item 112 may alternatively be a service offered by the merchant in exchange for a fee. The at least one server 105 may be one or more computing devices similar to the device 1900.

The record matching service 114 may be a system comprising one or more computing devices configured to at least identify the remote user 104 from details 116 provided by the remote user 104 and/or the user device 108. The details 116 may include one or more details about the user (e.g., given name, family name, telephone number, e-mail address, delivery address, billing address, postcode, etc.), the item 112 (e.g., item identifier, price, quantity, size, color, description, etc.), the user device 108 (e.g., Internet protocol address, browser version, operating system, etc.), and/or other details (e.g., current date, current time, etc.). As an example, if the details 116 received by the record matching service 114 include details for a large order of flowers by "Henry Gibson" from an online merchant, but records corresponding to the name "Henry Gibson" in the database 102 are typically orders for writing materials, the record matching service 114 may determine that the user 104 has a low probability of being the same "Henry Gibson" as was found in the database 102. Consequently, the record matching service 114 may assign a new identifier to the user 104.

The record matching service 114 may be configured to receive the details 116 from the remote user 104 via an application interface call or other user interface component configured to communicate with the record matching service 114 through the network 110 (e.g., the Internet). The record matching service 114 may be configured to determine, based at least in part on the details 116, an identity of a remote user 104 at least to a certain degree of confidence, perform a credit assessment of the determined remote user 104, and/or handle payment for purchase from the merchant by the remote user 104. The record matching service 114 may be configured to communicate with components of the merchant system 106 in order to determine an identity of the remote user 104 based on information such as the historical information 118. Based on this information, the record matching service 114 may communicate to the merchant system 106 a result 122 indicating a determined identity of the remote user 104 and, in some cases, a confidence score reflecting likelihood that the determined identity is actually the identity of the remote user 104. The record matching service 114 may also be used in an automated payment system that may communicate with third party systems 120 (e.g., banks, credit card services, or other financial organizations), such as for the purpose of determining whether to extend credit to the remote user 104. For example, as a result of the remote user 104 indicating to proceed with the purchase of the item 112, the merchant system 106 may send a purchase order request to an automated payment system of the record matching service 114. The purchase order request may include information such as a session identifier for identifying the user device 108 and/or other control data.

In the system of the present disclosure, the record matching service 114 may attempt to complete the user purchase even before the remote user 104 chooses which payment method to use. This may be achieved by creating a "reservation for credit," and extending credit to the customer as a result. The reservation for credit may be similar to a reservation made by a credit card company in response to receiving a request for credit authorization. That is, the record matching service may determine a credit limit for the remote user 104 that the record matching service 114 will honor for purchases from the merchant of the merchant system 106, based on certain details of the transaction, such as the goods being purchased, the merchant identity, the amount of purchase, the type of payment plan, the customer's purchasing ability, customer's payment history, and/or the customer's most recent purchasing activity. In some cases, the record matching service 114 may determine not to extend credit to the remote user 104. In some cases, the credit limit may apply only to the specific transaction, whereas in other cases the credit limit may apply overall to one or more transactions between the remote user 104 and one or more merchants.

Figure 2:
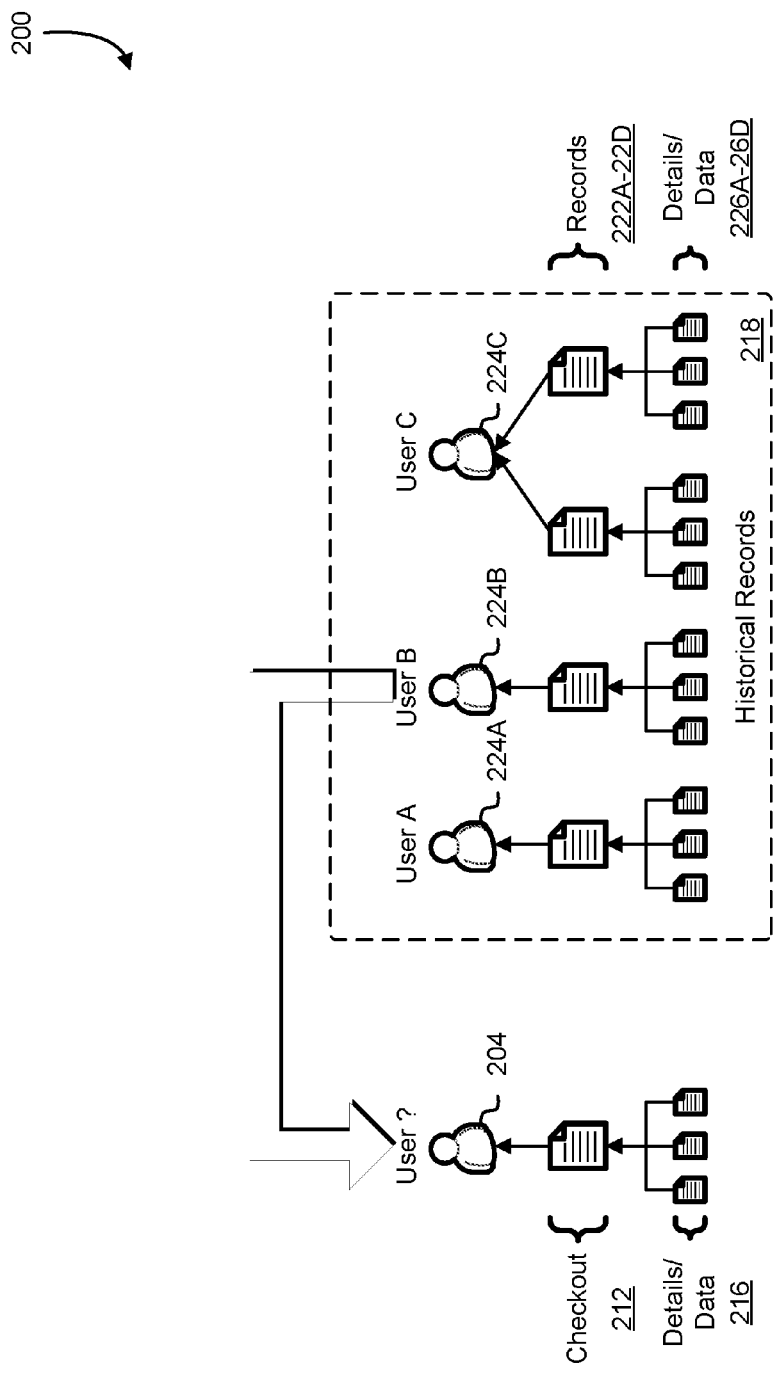
FIG. 2 illustrates an example of matching a user identity to a past user in accordance with an embodiment.

FIG. 2 illustrates an example 200 of an embodiment of the present disclosure. Specifically, FIG. 2 depicts matching a customer 204 to an identity associated with at least one of the customers 224A-24C. The customer 204 may be identified by the system of the present disclosure using details 216 associated with an order checkout 212. Note that the order corresponding to the order checkout 212 may not yet have been placed; in other words, the identification of the customer 204 may be made before the customer 204 even completes a purchase transaction. In some cases, the identification may be made even before checkout; i.e., based on one or more details received about or provided by the customer 204. The details 216 may include one or more details relevant to the customer and/or the transaction, such as the items being purchased, the price of the items, time of day, Internet protocol address of the device being used by the customer 204 making the purchase, given name of the customer, family name of the customer, postcode, telephone number, e-mail address, and so on.

The identities of the customers 224A-24B may be stored in a data store of historical records 218 in association with details 226A-26C that correspond to the historical records 222A-22C. A benefit provided by the system of the present disclosure is that the customer 204 may be identified with a certain amount of certainty/confidence requiring only minimal input or top-of-mind input from the customer 204. For example, if the system of the present disclosure has access to historical records 218 indicating that "Martha Hudson," at the address 221A Baker Street, places an order for tea with a particular online merchant on the second day of every month from a particular Internet protocol address, if the customer 204 places an order for tea from the particular online merchant on May 2nd from the particular Internet protocol address, the system may determine, based on these details, with a certain amount of confidence that the customer 204 is Martha Hudson.

In some examples, "top-of-mind" information may refer to details that are so familiar to the customer 204, that they require little effort to recall and/or input. For example, the customer 204 can likely remember his/her given name and family name with ease. However, depending on how common such given name and family name are, and input of a given name and a family name may not provide sufficient confidence that the customer 204 is not just a different customer with the same name as, say, customer 224B. However, the customer 204 is also likely to remember his/her e-mail address and birthdate with little effort, and an e-mail address or birthdate may provide greater confidence that the customer 204 is the same as another customer. Consequently, an input of an e-mail address and/or a birthdate in conjunction with one or more other top-of-mind values may provide sufficient confidence that the customer 204 is the same as a customer associated with a historical record, or may provide sufficient confidence that the customer 204 is not the same as the customer.

Conversely, not all customers however may have their phone number at the top of their mind, and few customers will be able to recall one of their credit card numbers with ease or at all. Therefore, even though such information has a lot of value in providing confidence that the customer 204 is or is not the same customer as another customer, it may be less preferable, from a user experience standpoint, to demand such information from the customer 204. On the other hand, an Internet protocol address has much value in identifying a particular customer, and can be obtained from the customer device rather than the customer. Accordingly, one of the objects of the present disclosure includes determining a customer identity from information intrinsic to the transaction (e.g., Internet protocol address of the device being used by the customer) and/or information easily recalled and input by the customer. Note too, that other types of input are contemplated, such as audio (e.g., voice and speech recognition), gesture and pattern recognition (e.g., gesture detected via image sensor, signature drawn on a touch screen, pattern of mouse pointer motion, etc.), and biometric input (e.g., thumbprint, etc.).

In FIG. 2, an identity of "Customer A" is associated with a record 222A and a set of details 226A, an identity of "Customer B" is associated with a record 222B and a set of details 226B, and an identity of "Customer C" is associated with records 222C-22D and respective sets of details 226C-26D. As can be seen in the example 200, the system of the present disclosure has identified the customer 204, based on the details 216, as "Customer B." Note that the system of the present disclosure does not necessarily attempt to locate a historical record that is the most similar to the details 216, but, instead, locates the historical record based on frequencies of values in the details 216. For example, if historical records 222A and 222C-22D include, in corresponding details 226A and 226C-26D, a postcode of "90210," while historical record 222B includes in corresponding details 226B a postcode of "40516." Here, it may be that the postcode "90210" occurs with a frequency of, for example, 3 in 4, while the postcode of "40516" occurs with the frequency of 1 in 4. In this manner, the system of the present disclosure may be able to narrow down the identity of the customer 204 based upon the frequencies that details 216 occur within the historical records 218. For example, consider two different potential matches: A first potential match has a first user with a postcode having a frequency of 1 in 4 potentially matched to a first order having a postcode frequency also of 1 in 4 (0.25). A second potential match has a second user with a postcode having a frequency of 2 in 4 (0.5) is potentially matched to a second order having a postcode frequency of 2 in 4. Because of the lower frequency of the first potential match, the first potential match is more likely to be correct than the second potential match. This, combined with other frequencies for different fields (e.g., by using a supervised model, such as a random forest) allows for high probability matches using the frequencies for field values rather than the field values themselves.

Figure 3:
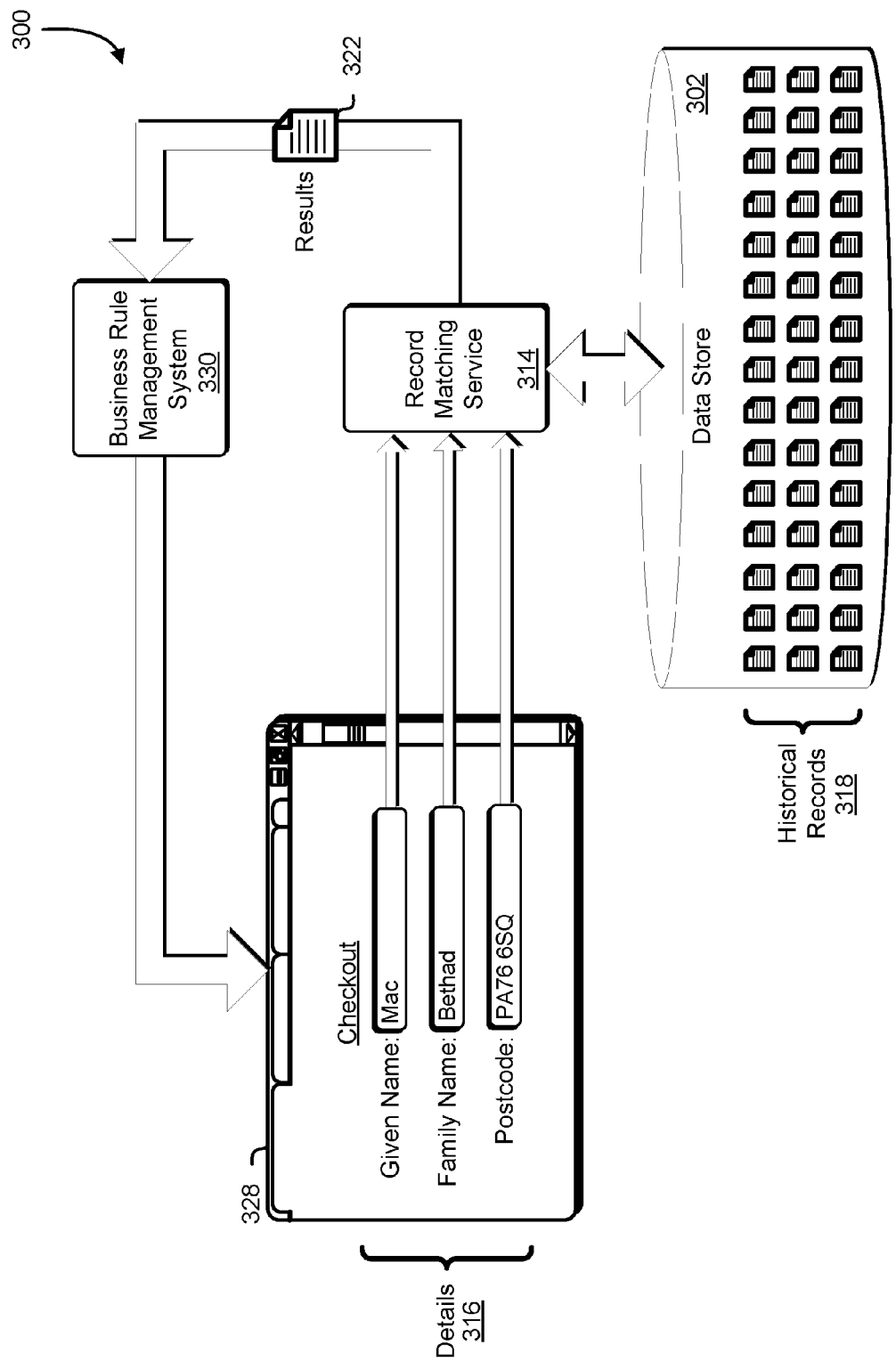
FIG. 3 illustrates an example of a flow of matching details to identify a customer in accordance with an embodiment.

FIG. 3 illustrates another example 300 of an embodiment of the present disclosure. Specifically, FIG. 3 depicts a user interface 328 such as might be used during part of a record checkout process in a transaction between a customer and an online merchant. The example 300 shows that details 316 have been entered into the user interface 328 by a customer. The details 316 are provided to a record matching service 314. The record matching service 314 analyzes the details 316, with reference to historical records 318 stored in a data store 302, and, based on the analysis, provides a set of results 322 to a business rule management system 330. The business rule management systems 330 may determine, based on the set of results 322 received from the record matching service 314, an identity for the customer associated with the details 316 or may determine that additional details are needed from the customer, and communicate this determination to the merchant and/or the user interface 328.

The record matching service 314 may be a service provided to merchants, website owners, or other users that is designed to find a closest match between the details 316 and at least one record from a set of historical records 318. To that end, when the record matching service 314 receives the details 316, the record matching service 314 attempts to determine whether the customer entering the details 316 is associated with a historical record and what other historical records may also be associated with the customer.

The data store 302 may be a repository for data objects, such as database records, flat files, and other data objects. Examples of data stores include file systems, relational databases, non-relational databases, object-oriented databases, comma delimited files, and other files. In some implementations, the data store 302 is a distributed data store. The details 316 may be information similar to the details 216 of FIG. 2, and may include information such as given name, family name, Internet protocol address, e-mail address, etc. As shown in the example 300, a customer has entered "Mac," "Bethad," and "PA76 6SQ" in the given name, family name, and postcode fields respectively in the user interface 328. The user interface 328 provides the details 316 to the record matching service 314 in a request to determine the identity of the customer.

Note, it is also contemplated that the methods of the present disclosure may be actively and incrementally repeated as a customer enters more input, such as, for example, on a character by character basis. For example, after the customer types the letter "M," for the given name, the system may attempt to perform the process of the present disclosure to determine whether the customer can be identified with sufficient certainty (e.g., confidence score of 0.9 or above) from the first initial of the given name. After the customer types, "a" in the given name field, the system of the present disclosure may attempt to determine the customer's identity from the first two letters of the given name, "Ma," and so on. Upon determining the customer's identity with acceptable certainty, the system may respond by pre-populating the remaining field or by prompting the user to verify the determined customer identity (e.g., "Are you 'Mac Bethad' of postcode PA76 6SQ'?").

In some embodiments, the order of input fields and the actual input fields displayed in the user interface 328 will vary based on information value associated with the particular input field type. For example, an e-mail address and birthdate may be determined to be the most useful field for identifying a particular user. In such a case, rather than requesting given name, family name, and postcode, as displayed in FIG. 3, the fields may simply be e-mail address and birthdate and the user identity can be determined from only those two fields. Similarly, in some of these embodiments, input fields can dynamically vary based on which input fields are determined to be the most useful for identifying the user based on information already known about the user. For example, after the user enters his given name, "Mac," into the given name field of the user interface 328, the system of the present disclosure may determine that only two users with the first name, "Mac," are found in historical records, but that they reside at different postcodes. Consequently, in this example, the system may cause the user interface 328 to hide the family name field, and only prompt the user to further fill out the postcode field. If the postcode field value matches the postcode of one of the two "Macs" in the historical records, the system may determine that the current user is the same as the matching "Mac." If the postcode field matches neither of the two "Macs," the system may determine either to prompt the user for additional information (e.g., family name) that may distinguish the two users, or may assume that the user is a new user and create a new user identity for the new "Mac" at the new postcode. Note that, in various embodiments, a match does not necessarily require equality. For example, two values may match if they are not equal, but mathematically equivalent. As another example, two values may match if they satisfy one or more matching criteria (e.g., "kat" may match "Kathryn" if the matching criteria specifies that, in a case-nonspecific manner, only the first three characters must be the same). Generally, any way of determining whether there is a match may be used.

An advantage provided by the system of the present disclosure is that separate transactions may be determined as associated with the same user merely from details associated with the transactions, and then the separate transactions may be linked to the same user identifier. The details may include top-of-mind information input from the user and/or information collected during the conduct of the transaction (e.g., Internet protocol address of the user device, geolocation data (such as from a global positioning system), etc.). Although it is contemplated that usernames and/or passwords may be additionally or alternatively utilized by embodiments of the present disclosure, in many embodiments, a user account associated with the user identifier may be created as an account without recourse to a conventional process of establishing a shared secret (e.g., username/password) between the user and the service provider in order for the user to have administrative access to the user account. In some embodiments, the user may be prompted to confirm control of one or more assets (e.g., mobile telephone, e-mail account, etc.) associated with the transaction as additional assurance of identity of the user).

In the present disclosure, the term, "asset," may refer to an item, account, or other tangible or intangible property, having identifying asset information, that can be proven to be under the control of a user. For example, an asset may be a telephone, an e-mail account, a residence, a social media account, or other asset. The term, "asset information," may refer to data assigned to the specific tangible or intangible property (e.g., a device, an account, etc.) under the control of the user that may operate as an address (or other reference information) indicating a location to which communications can be transmitted, or some other identifier usable to confirm that the asset is under the control of the user. For example, a telephone number may be a unique series of numbers assigned to a device owned by or under the control of the user. Likewise, an e-mail address may be a unique string of characters assigned to an e-mail mailbox owned by or under the control of the user. Examples of asset information may include information such as a telephone number, an e-mail address, a residential address, a social media uniform resource locator (URL), and an OAuth token.

Confirming control of the asset, combined with, in some cases, any details associated with the session (e.g. Internet protocol address of the user device, any identifying information provided, etc.) may be used by embodiments of the present disclosure to determine, with sufficient certainty (e.g., confidence score exceeding a threshold) that the identity of the user is the user authorized to access the account, that credential (e.g., username/password) verification may not be required (i.e., superfluous). In this way, the system of the present disclosure can avoid the complexity of managing one or more sets of credentials for each user, and improve security by avoiding the need for complex password requirements and passwords, which may be insecurely protected or easily forgotten by users. Furthermore, any details input by the user may simply be top-of-mind information (e.g., e-mail address, telephone number, etc.) or information already associated with the transaction (e.g., items selected for purchase, payment method, etc.), thereby improving usability of the interface for the user.

Although depicted within a single data store, the historical records 318 may be distributed among multiple data stores accessible to the record matching service 314, and the multiple data stores may even be distributed among multiple geographic locations. In some implementations, the historical records 318 may reside in one or more data stores of the provider of the record matching service 314, whereas in other implementations, the historical records 318 may reside with individual merchants or with a third-party that contracts with the in the individual merchants. For example, some of the historical records 318 may be stored in a data store of an online merchant in the United States, and some other of the historical records 318 may be stored in another data store of another online merchant in Europe. In some implementations, the record matching service 314 may attempt to match the user only with a historical record 318 associated with the particular merchant with whom the user is conducting the transaction. In still other implementations, the record matching service may attempt to match the user only with a historical record associated with a geographic location (e.g., specific to a particular country, state, postcode, etc.) of the merchant or of the user (e.g., as may be determined by the user's Internet protocol address). On the other hand, in some implementations, the record matching service 314 may attempt to match the user with a historical record from all of the historical records 318 to which the record matching service 314 has access. In some embodiments, a particular scheme for partitioning the historical records 318 (e.g., by country, by continent, by age of the historical record, etc.) within the data store 302 is determined based on what will allow the system of the present disclosure to identify the customer within a particular time threshold (e.g., 50 milliseconds). In other words, the historical records may be country-specific and/or merchant specific.

The set of results 322 may be a set of user identifiers and/or historical record identifiers for historical records associated with respective user identifiers, and may include a score for each of the user identifiers reflecting a level of confidence that a supervised model of the record matching service 314 has that the respective user identifier is associated with the same user as the user that input the details 316. The user interface 328 may be a web-based user interface such as a hypertext markup language page, widget, hypertext markup language form, set of JavaScript code, other web-based technology, or any combination of the above that allows communication between the user and the record matching service 314 and/or an online merchant. Alternatively, the user interface 328 may be a standalone application executing on a computing device, such as a personal computer, tablet computer, a cellular phone, or kiosk. The user interface 328 may even be implemented as a remote procedure call in vote from a command line. The business rule management system 330 may be a hardware and/or software component configured to evaluate the results 322 from the record matching service in order to determine an identity for the user associated with the details 316. In some implementations, the business rule management systems 330 may be a component of the record matching service 314.

Figure 4:
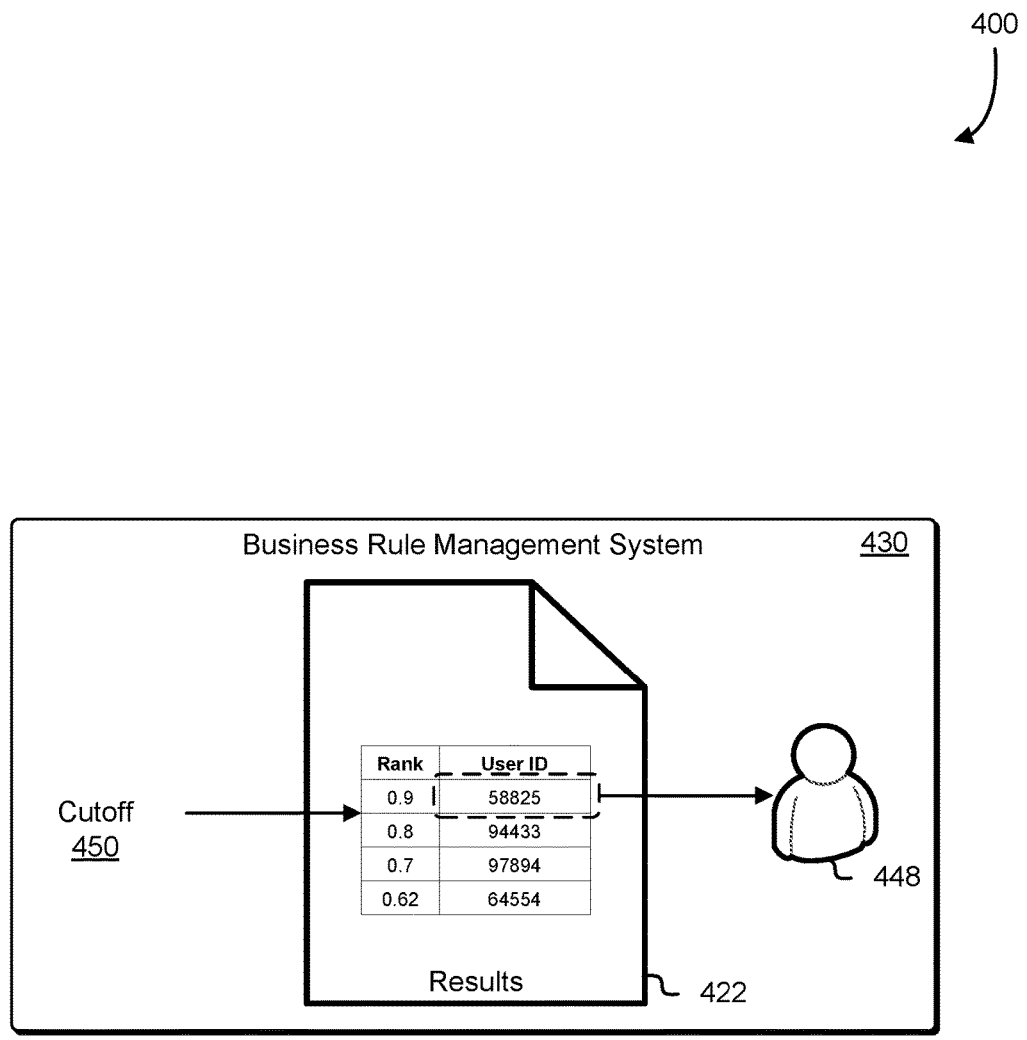
FIG. 4 illustrates an example of determination of a user identity by a business rule management system in accordance with an embodiment.

FIG. 4 illustrates an example 400 of a business rule management system 430 which makes a determination of an identity 448 of a user whose record-related details yielded the set of results 422 received from a supervised model of a record matching system of the present disclosure. The business rule management system 430 may be a system similar to the business rule management system 330 of FIG. 3. The business rule management system 430 may utilize a cutoff value 450 for determining which, if any, of the results in the set of results correspond to the user. The cutoff value 450 may be a value which has been determined to be the appropriate balance between precision and recall. In other words, for cases where the determination of user identity needs to be very accurate (e.g., in cases where credit is being extended to the user, where access to sensitive information is being granted to a user, etc.) the cutoff value 450 may be higher than for cases where accuracy of the user identity is not as critical (e.g., determining user identity in record to open a technical support ticket, determining user identity in record to provide targeted advertising, etc.).

For example, when determining the identity of a user in order to complete a transaction for an online purchase and bill the online purchase to the correct person, it may be important to set the cutoff value 450 to 0.9, as is shown in the example 400. This may reflect, that at least 90% of the decision trees of the supervised model (see the supervised model 746 of FIG. 7) voted that the user associated with the details is the same as the user associated with a set of records having scores at or above the cutoff value 450. On the other hand, in a case where the user identity is being determined to open a technical support ticket, the cutoff value 450 may be 0.51, suggesting that only 51% or more of the decision trees of the supervised model need agree that the user associated with the details is the same as a user associated with the set of records having scores at or above the cutoff value 450.

As shown in FIG. 4, only one user, user "58825," achieved a score at or above the cutoff value 450. Consequently, the business rule management system 430 may determine that the identity 448 of the user associated with the input details correspond to user "58825." In cases where none of the results meet or exceed the cutoff value 450, the business rule management system 430 may respond to the merchant or to the user interface either that additional details are required in record to determine the user identity 448 with sufficient certainty or that the user identity 448 could not be determined. If the user identity 448 is unable to be determined, the merchant may consider the user to be a new user, and consequently caused a new user ID to be generated for the current user.

In a situation where multiple user IDs receive scores above the cutoff value 450, the business rule management system 430 may select the highest scoring user ID as the user identity 448, or may use some other scheme to select the user identity 448 from the multiple user IDs (e.g., selecting the second highest scoring user ID, selecting a user ID corresponding to the most recent historical record, selecting a user ID corresponding to the historical record with the highest price, etc.). In some embodiments, if multiple user IDs receive scores above the cutoff value 450, the business rule management systems 430 will request or cause the merchant to request additional details from the user in order to determine which of the multiple user IDs is associated with the current user. As an example, if three different user IDs score above the cutoff value 450, the current user may be asked to input his/her phone number. In such an example, the additional detail of a phone number may affect the scoring such that all but one user ID sinks below the cutoff 450, And consequently that user ID may be determined as the user identity 448.

In some cases, when multiple user IDs receive scores above the cutoff value 450, the business rule management system may initiate a process for determining whether two or more of different user IDs in the results 422 actually correspond to the same user, and should be consolidated under a single user ID. An example of such a process may be to ask the user that entered the details to confirm details of past historical records.

Figure 5:
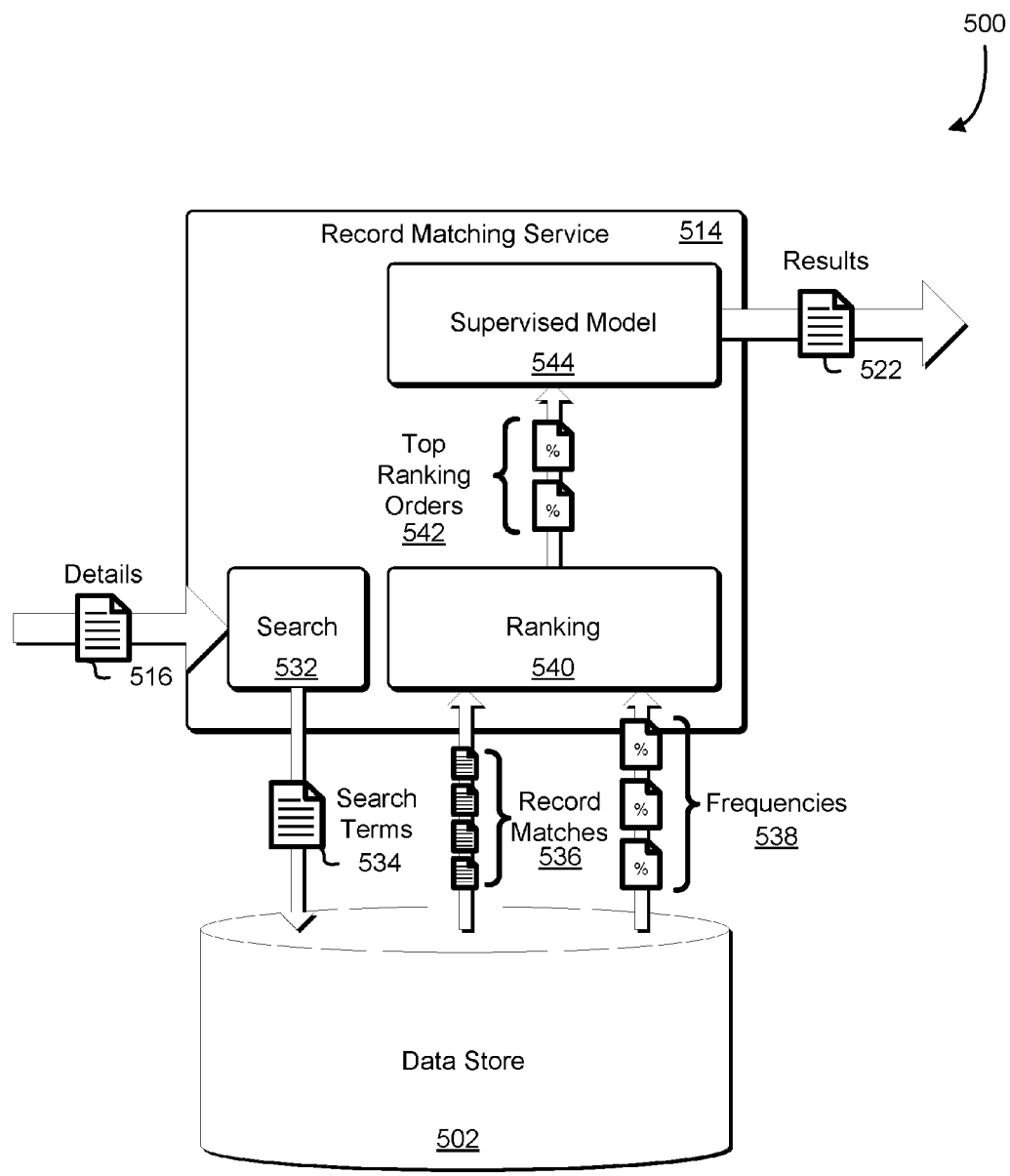
FIG. 5 illustrates an example of a record matching service in accordance with an embodiment.

FIG. 5 illustrates an aspect of an embodiment 500 of the present disclosure/etc. As illustrated in FIG. 5, the embodiment 500 includes a record matching service 514 that receives details 516 from a user (e.g., from an interface similar to the user interface 328 of FIG. 3) into a search component 532. The search component 532 may transform the details 516 into one or more search terms 534 to query against historical records in a data store 502. Then, matching historical records 536 and frequencies 538 of occurrence of the search terms may be provided to a ranking component 540 of the record matching service, which may rank the matching records 536 based on the frequencies 538. The top ranking records 542 may then be provided to a supervised model 544, which may score the top ranking records and output the results 522.

Similar to the data store 302 of FIG. 3, the data store 502 may be repository for data objects, such as database records, flat files, and other data objects. The record matching service 514 may be a system comprising various hardware and software configured to perform the functions of the search component 532, the ranking component 540, and the supervised model 544 as a service to third parties such as merchants and or users of merchants.

The details 516 may be details about the current state of a user record provided to the record matching service 514 by a merchant and/or input by a user. The details 516 may be similar to the details 216 described in conjunction with FIG. 2, and may include information such as an Internet protocol address of a computing device being used by a user, an identity of a merchant, one or more identities of items selected for purchase by the user, user given name, user family name, postcode, e-mail address, telephone number, time of day, date, and other information. The search component 532 may be hardware, software, or a combination of hardware and software configured to receive the details 516, determine the set of search terms 534, and may query the data store 502 based on the set of search terms 534.

The search terms 534, for example, may be a value of a particular field (e.g., given name field, such as values of "frank," "lars," "amy," etc.), may be a portion of a particular field (e.g., domain part of an e-mail address, such as values of "blazingmail.com," "example.org," "osu.edu," etc.), or combinations of values of one or more fields or portions of fields (e.g., combination of given name and family name, such as a value of "winstonchurchill." The search terms 534 may be normalized; in other words, they may be converted to upper or lower case, whitespace may be added or removed, letters with diacritic marks are converted to a non-diacritic form, or certain other types of characters may be removed (e.g., nonnumeric characters in a telephone number may be removed). For example, the details of "Winston," "Churchill," "10 Downing Street," for given name, family name, and address fields, may yield search terms such as "winston" (normalized given name), "churchill" (normalized family name), "winstonchurchill" (combination of given name and family name), "10" (house number), "downing" (street name), "win" (first three letters of given name), and "dow" (first three letters of street name). As another example, an Internet protocol address may be transformed into a standard format (e.g., "xxx.xxx.xxx"). As still another example, nonnumeric characters may be removed from a phone number value (e.g., "(212) 555-7665" converted to "2125557665").

The matching records 536 may be a set of historical records containing at least one match to a search based on at least one of the search terms 534. For example, a historical record associated with the user, "Winnie Jones," may be returned based on the first three letters of given name, "win," mentioned above. A historical record may be a set of details corresponding to a record placed by a customer with a merchant. The set of details may be in the form of one or more database records, a character-delimited string, or some other format.

The frequencies 538 may be one or more of term frequencies, inverse document frequencies, or other values reflecting frequencies that each of the search terms 534 occur within the entire set of historical records, a particular record, or a particular field in a record. Further details on frequencies may be found in the description of FIG. 10. However, as an example, in addition to the historical records matching, "win," as the first three letters of the given name (described above), a value corresponding to the rarity of matching, "win," in a first three letters of the given name may be passed as one of the frequencies 538. For example, if the first three letters "win" occurs in the given name in 65,000 records out of 2 million historical records, an inverse document frequency value of "4.9" may be passed to the ranking component 540 to reflect the commonality of the search term. In other words, the larger the inverse document frequency value, the greater the likelihood that an individual will correspond to any given record that is retrieved using that search term.

The ranking component 540 may be hardware, software, or combination of hardware and software configured to rank the matching records 536 based on the received frequencies 538. The matching records 536 may be ranked in various ways, one example being to sum, for each matching record, the frequencies 538 corresponding to search terms 534 that were matched in the matching record. In other words, for a record that only matches "win" in the first three characters of the full name of "Winnie Jones," the record may given a value of 4.9. Whereas, a record for "Copperknob Churchill" (full name) at "10A Downing Street," (address) that matches the family name "churchill," having an inverse document frequency of "21.5" and the street name of "downing," having an inverse document frequency of "34.7" may be given a value of 56.2. When the records are later ranked and filtered, the record for "Copperknob Churchill" may consequently be ranked higher than "Winnie Jones."

Note that if a particular search term is not found/matched in a particular historical record, the frequency may be negative. So, for the example of "Winnie Jones," the family name "jones" may have an inverse document frequency of 2.1. Therefore for every matching record in the matching records 536 that does not contain the family name "jones," 2.1 may be subtracted from the rank calculation for that matching record. In a similar manner, if a particular detail was not provided with the details 516 or was left blank by a user, a value of zero may be considered for that field. For example, if the user associated with the details 516 is "Winnie Jones," and a particular matching record has a blank or no value for family name, the value of 2.1 may be neither added nor subtracted when computing the ranking that particular record (i.e., the contribution of that field may be considered zero).

The top ranking records 542 may then be provided to the supervised model 544. The top ranking records may be a predetermined number of the matching records 536 with the highest rank values. The predetermined number may be a quantity determined to most likely include a record associated with the user corresponding to the details 516 (e.g., top 30 records, top 100 records, top five records, etc.). The top ranking records 542 passed to the supervised model 544 may only include details such as a user identifier associated with the record and a frequency value for each search term matched in the particular top ranking record. In some cases, an identifier for the top ranking historical record may also be included. However, in some embodiments, actual details, search terms, and field values of the top ranking records 542 are not passed to the supervised model 544.

The supervised model 544 may be a random forest generated based at least in part on a large number of historical records containing information about individual users (e.g., population data), which may or may not include the historical records stored in the data store 502. The supervised model 544 may be a set of decision trees (e.g., 1,000 trees) generated as a result of an analysis of a large reference data set having at least some values that correspond to fields in the historical records of the data store 502. The decision nodes of each decision tree in the set of decision trees may be configured with a condition for evaluating the frequencies 538 of fields that were matched in the top ranking records 542. The result of each evaluation may be a vote as to whether the particular top ranking record is (e.g., vote of 1) or is not likely (e.g., vote of 0) to be associated with the user of the details 516. Each decision tree in the set of decision trees may vote for each of the top ranking records 542, and once each of the decision trees has voted for the top ranking record, the number of votes for the top ranking record 542 may be summed to yield a confidence score for the top ranking record 542. For example, if 547 trees vote that a particular top ranking record is likely associated with the user of the details 516, the confidence score output with the results 522 may be 547. Note, in some implementations the confidence score may be represented as a percentage or proportion of the total number of voting trees; that is, in the example above the confidence score may be output as 54.7% or 0.547 instead. In some implementations, the records in set of top ranking records may be evaluated by the supervised model in series, whereas in other implementations the records in the set of top ranking records may be evaluated by the supervised model in parallel.

Note too, that in some implementations, each decision tree may be able to make more complex votes than a simple yes or no (1 or 0). For example, in some implementations, a decision tree may output 1 for yes, −1 for no, and 0 for too close to call or indeterminable. In still another implementation, each decision tree's vote may reflect the confidence that particular decision tree has that the particular top ranking record is associated with the user of details 516; for example, a particular decision tree may output 0.321 if it determines that the particular top ranking record is only 32.1% likely to be associated with the user of details 516. As with the binary vote described above, such alternative implementations may be scored by adding the votes of each of the voting trees in the random forest. The results 522, then, may be similar to the results 322 of FIG. 3 and may include, for example, one or more of the top ranking records 542 and, in some cases, a score for each of the top ranking records 542 generated by the supervised model 544. Additional details about the decision trees in the supervised model 544 may be found in the descriptions of FIGS. 6 and 6. Note too that each decision tree may be linearized into a set of decision rules (e.g., of the form "if [condition1] and [condition2] and [condition3], then return [result1]; if [condition1] and [condition2] and not [condition3], then return [result2]," etc.).

Figure 6:
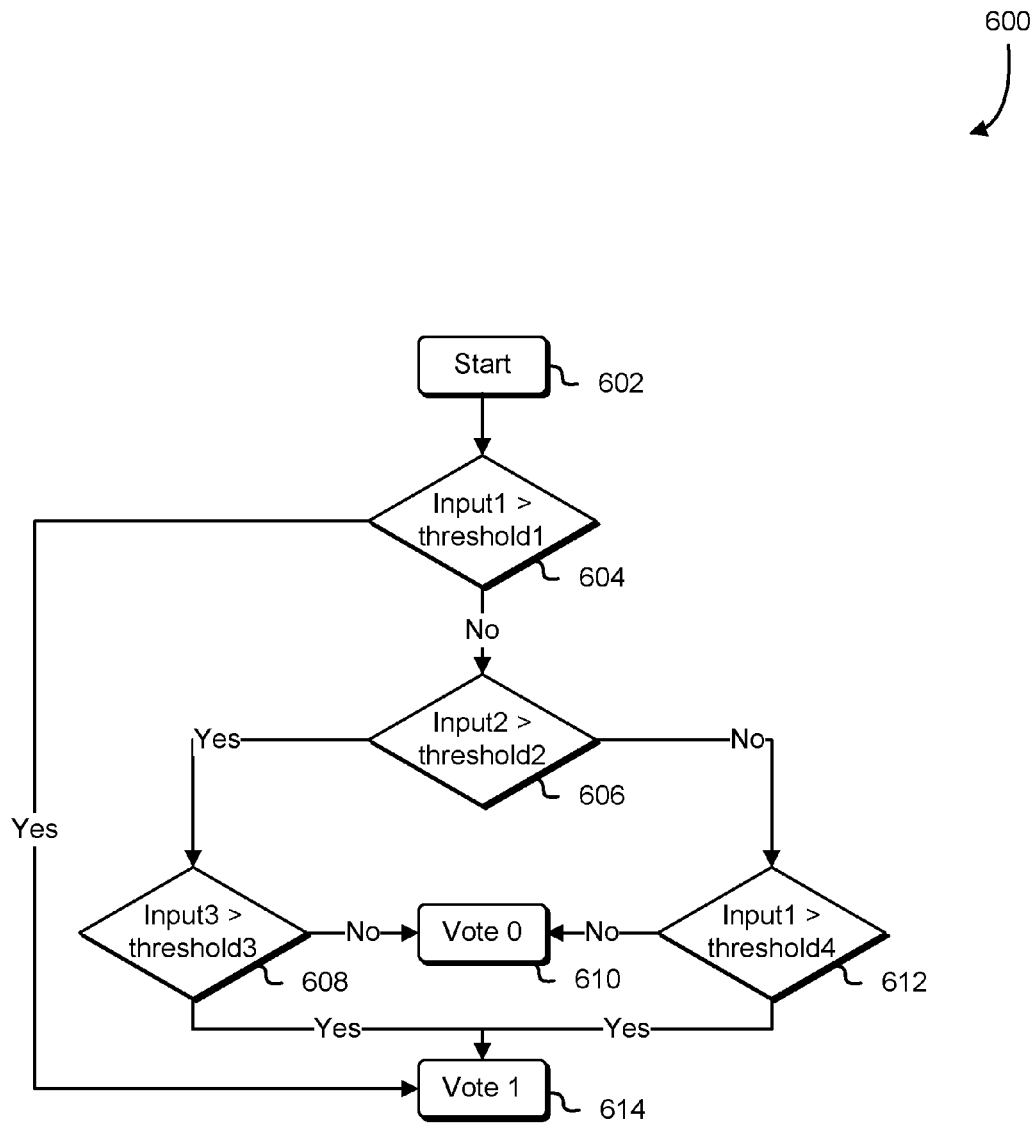
FIG. 6 illustrates an example of a decision tree of a supervised model in accordance with an embodiment.

FIG. 6 illustrates an example decision tree 600 as may occur in the random forest of the supervised model in an embodiment of the present disclosure. Note that the decision tree depicted in FIG. 6 is for illustrative purposes only and may differ from actual decision trees in the supervised model. In the decision tree 600, at 602, input values representing a frequency value associated with a particular field of a top ranking record, similar to one of the top ranking records 542 of FIG. 5, may be received. For example, a first input (e.g., given name) may be a frequency value of "4.9," a second input (e.g., family name) may be a frequency value of "21.5," and a third input may be a frequency value of "1.3."

In this example, at 604 the decision tree may compare the first input frequency value of 4.9 against a first threshold. Note that the first threshold may have been determined when the random forest of the supervised model was generated, based on a data set and the likelihood to arrive at a ground truth based on a given frequency. For example, the first threshold, as determined when the random forest was generated, maybe 4.3. In such a case, the system traversing the decision tree may immediately proceed to 614 and cast a vote of confidence that the user associated with the particular details is the same user as the user associated the particular top ranking record. That is to say, at a time when the decision tree 600 was generated, it may have been determined that, if there is a match of the field associated with the first input (e.g., given name) with an inverse document frequency of 4.3, it is more likely than not that the user associated with the details and the user associated with the particular top ranking record is the same user. However, if the first threshold is 5.1, then the system traversing the decision tree may proceed to 606, whereupon the second input may be compared with a second threshold. If the second threshold value is 12.9, the system traversing the decision tree may proceed to 608 because 21.5 is greater than 12.9.

In 608, the third input may be compared with a third threshold. If, for example, the third threshold is 1.033, the system may proceed to 614 to output of vote of confidence that the user associated with the details is the same as the user associated with the particular top ranking record, because 1.3 is greater than 1.033. On the other hand, in another example, if the third threshold is 8.2, the system would proceed to 610 to output a vote of no-confidence.

However, in the example of FIG. 6, in 606 if the second threshold is 35.5, because 21.5 is less than 35.5, the system traversing the decision tree 600 may proceed to 612. As can be seen by 612 inputs may be compared against thresholds multiple times while traversing the decision tree. Here, the first input is again compared, but this time against a different threshold, a fourth threshold. Thus if the first input is greater than the fourth threshold the system traversing the decision tree 600 may cast its vote of confidence in 614. Otherwise, the system may instead proceed to 610 and cast a vote of no-confidence.

In the supervised model, there may be multiple decision trees of various configurations making similar decisions as described above in parallel or in series with each other. After each of the decision trees in the supervised model have cast their votes, the votes may be summed, and a score based on the summation of votes for the particular top ranking historical record may be output. Note that in some implementations, actual field values and/or details may be provided to the supervised model, and the decisions of the decision trees may be based on field values and/or details rather than frequencies as described above. However, an advantage provided by the supervised model making decisions based on frequencies instead of actual field values may be that decisions can be made without regard to certain differences between regions and cultures. For example, in the United States, the name "Michael" may be very common, however in Argentina, "Michael" may be much less common. On the other hand, the name "Santiago" in Argentina may be common, but in the United States may be uncommon. Therefore, a supervised model based on frequencies may be agnostic as to the regional origin of the details and/or location of the merchant.

Another advantage provided by passing frequency values to the supervised model instead of actual details or field values is that, in a system where the supervised model is remotely located from or otherwise separate from the record matching service, if the input to the supervised model is intercepted by an unauthorized entity, little if any information about actual records or users would be compromised. Consequently, the supervised model itself could be implemented as a separate standalone service for merchants. For example, a merchant may have its own record matching system and may upload a set of frequencies in a manner similar to how the ranking component 540 of FIG. 5 provides frequencies to the supervised model 544, and, in response, the supervised model service may provide results similar to the results 522 back to the merchant.

Figure 7:
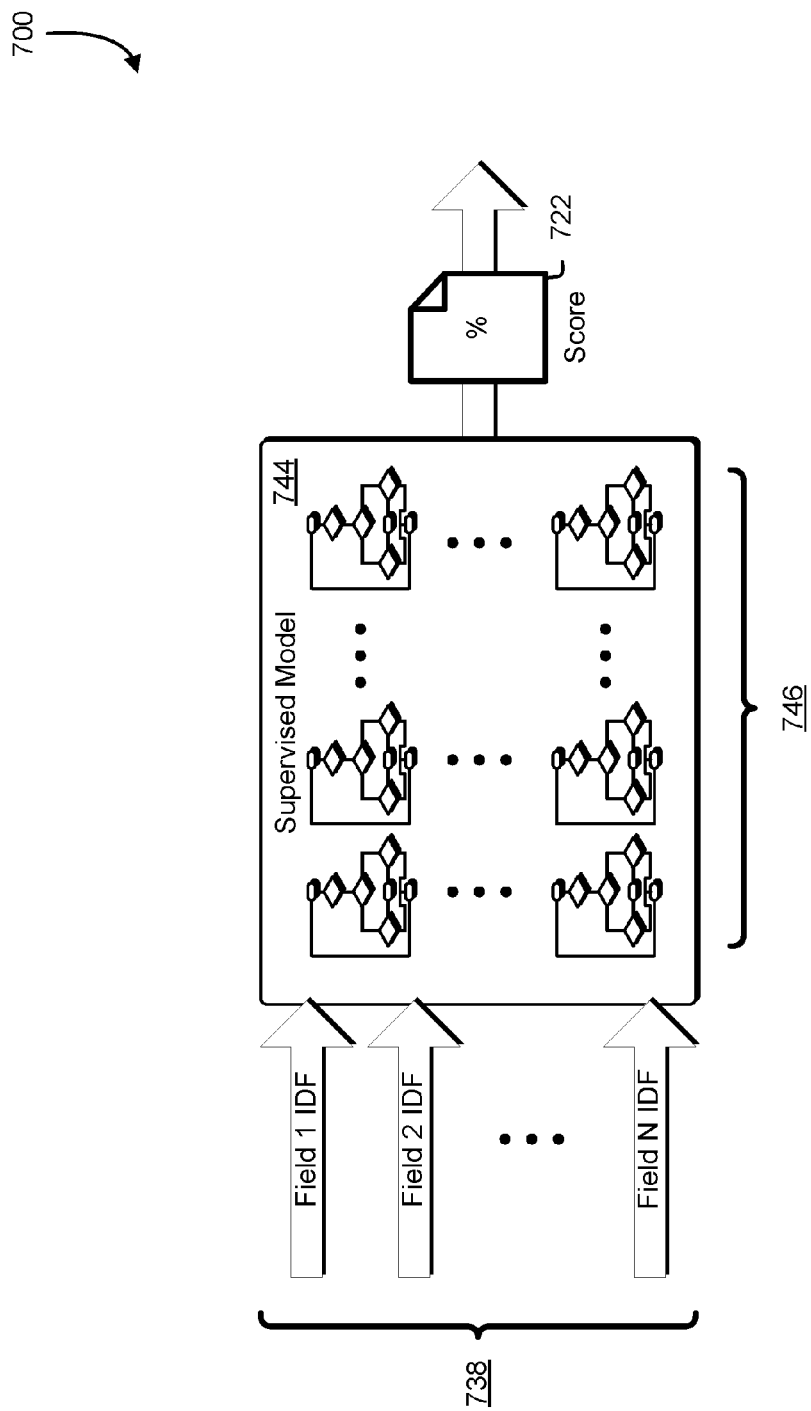
FIG. 7 illustrates an example of a supervised model in accordance with an embodiment.

FIG. 7 illustrates an example 700 of a supervised model 744 of an embodiment of the present disclosure. As illustrated in FIG. 7, the example 700 may include a set of frequencies 738 of search terms matching corresponding fields. The set of frequencies 738 are processed through a set of decision trees 546 in the random forest of the supervised model. Each of the decision trees 546 may be traversed and may vote, based on the set of frequencies 738, in a manner similar to the decision tree 600 of FIG. 6. When all of the decision trees 546 have voted, the votes may be counted and a confidence score 722 based on a number of counted votes may be output. This process may be repeated for each of the top ranking historical records input to the supervised model. Note that, the supervised model may perform voting for all of the provided top ranking historical records, and then output the scores as a set, and may additionally output, with each score, a user ID and/or historical record ID corresponding to the particular historical record. Note too, that, in some implementations, the supervised model does not utilize decision trees. For example, the supervised model may be implemented as a set of naïve Bayes classifiers, a linear set of decision rules, or as a multinomial logistic regression.

Figure 8:
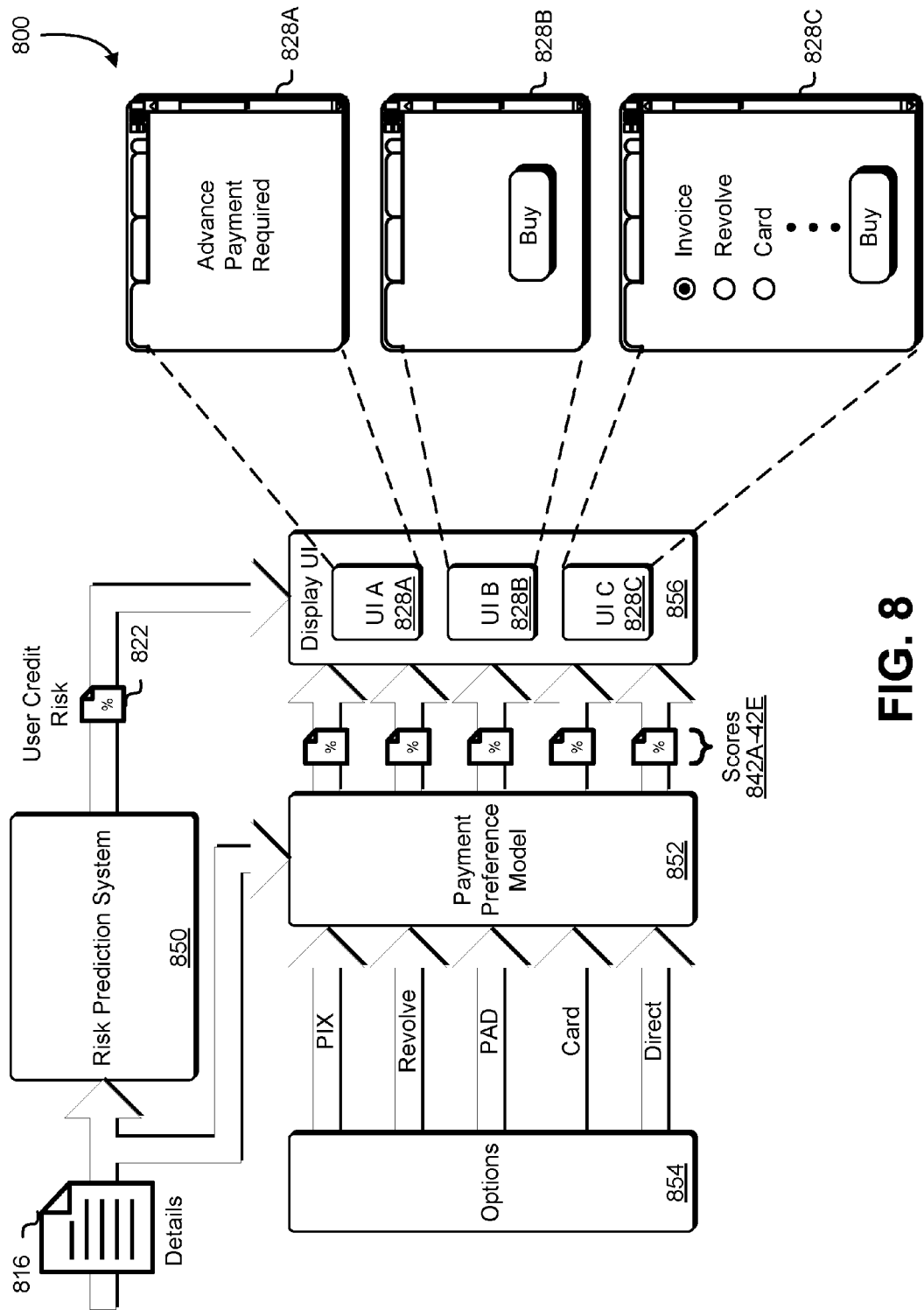
FIG. 8 illustrates an example of a supervised model dynamically customizing user interfaces in accordance with an embodiment.

FIG. 8 illustrates an example 800 of an embodiment of the present disclosure. Specifically, FIG. 8 depicts a payment preference model 852 that outputs, based on details 816, a set of scores 842A-42E reflecting a likelihood that the user associated with the details 816 will select a particular payment option 854. The payment preference model 852 may include a supervised model/random forest for determining the set of scores 842A-42E. The set of scores may be input to a user interface displaying component 856 along with a credit risk 822 of the user as determined by a risk prediction systems 852, and the user interface displaying component 856 may output a user interface screen (e.g., a checkout window) according to a set of business rules.

An example operation of the example 800 would be a case where a user is at a checkout screen of an online merchant, preparing to purchase an expensive component (e.g., television, speakers, 8-track tape player, etc.) for a home theater system. The payment preference model 852 may determine, based on details such as the expense of the items being purchased, that it is highly likely that the user will want to pay for the purchase in installments, and consequently the score output for that payment option may be the highest. As another example, if the same user purchases a paperback book 15 minutes later, the payment preference model may determine, based on the relative inexpensiveness of the item being purchased compared to the previous purchase, that the user is likely to prefer to pay for the paperback book with a credit card, and consequently the credit card payment option may receive the highest score output by the payment preference model 852.

Figure 10:
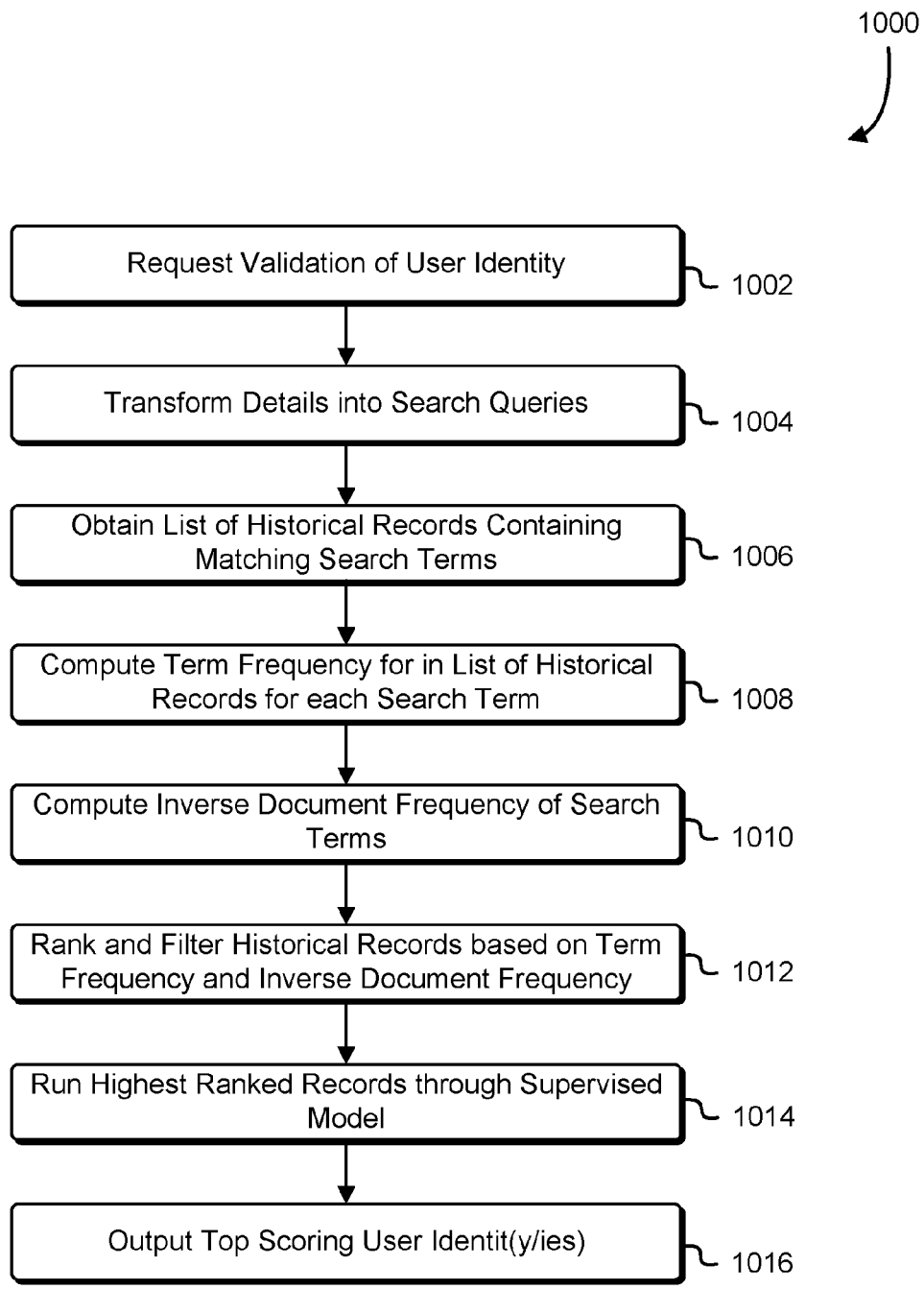
FIG. 10 is a block diagram that illustrates an example of scoring customer identities associated with historical records based on a set of details in accordance with an embodiment.

The example 800 assumes that the user identity has already been determined or can be determined from the details 816 in the manner described in the present disclosure (e.g., process 1000 of FIG. 10). The details 816 may be information corresponding to a transaction. For example, a user may have selected one or more items for purchase from an online merchant. In such an example, the details 816 may include information such as identities of the items, quantities of each item, prices of the items, postcode to which the items will be delivered, and so on. The details 816 may be transformed into one or more variables for use in determining the credit risk of the user and/or potential payment preferences. Examples of such variables may be found in the table below:

TABLE 1

| Variable Name | Variable Group | Description |
| --- | --- | --- |
| name_in_email | Purchase specific | Compares the user given and family name to the email |
| estore_group | Purchase specific | The group in which an e-store is active |
| seconds_since_midnight | Purchase specific | The number of seconds since midnight |
| activation_amount | Purchase specific | The total activation amount of the purchase |

TABLE 1-continued

| Variable Name | Variable Group | Description |
| --- | --- | --- |
| age | Purchase specific | The user age |
| stds_dev_from_previous_purchases | Purchase specific | The number of standard deviations that the activation amount is from previous archived purchases |
| tot_debt | Purchase specific | The user's total amount owed to creditor |
| number_different_products | Purchase specific | The number of different active products for the user |
| days_since_last_purchase_0_3_months | Pre calculated historic | The number of days since the last purchase within 3 months |
| activation_amount_last_purchase_0_3_months | Pre calculated historic | The activation amount of the last purchase within 3 months |
| payment_method_last_purchase_0_3_months | Pre calculated historic | The payment method of the last purchase within 3 months |
| n_credit_card_0_3_months | Pre calculated historic | The number of credit card purchases within 3 months |
| n_direct_bank_0_3_months | Pre calculated historic | The number of direct bank purchases within 3 months |
| n_prepay_0_3_months | Pre calculated historic | The number of pre-pay purchases within 3 months |
| n_invoice_0_3_months | Pre calculated historic | The number of invoice purchases within 3 months |

The first variable, name_in_email may be a Boolean variable indicating whether the given name and/or family name of the user is found within the e-mail address. If this variable is true, this provides further indication that the e-mail address is associated with the user and vice versa. The random forest of the supervised model may be trained to use this variable in making its determinations. The random forest may be trained on many more variables than those described above; the variables listed above are listed for illustrative purposes. The variable, estore_group, may be a variable for categorizing the items or services being purchased. For example, a cellular phone may belong to an "electronics" estore_group and a pair of shoes may belong to a "clothing" estore_group. The variable, seconds_since_midnight may be used to capture the time of day of the transaction, which may affect preferred payment by the user. For example, some users may not carry their credit card during working hours, and consequently those users may choose to use a different payment type when making purchases during working hours.

The variable, activation_amount may refer to the total cost of the transaction. The variable, tot_debt may refer to the total amount currently owed to a creditor or merchant. The variable, number_different_products, may refer to the quantity of different products being purchased in the transaction. The variable, days_since_last_purchase_0_3_months may refer to the number of days since the most recent purchase in the last three months. The variable, activation_amount_last_purchase_0_3_months may refer to the total cost of the most recent purchase within the last three months. The variable, stds_dev_from_previous_purchases may reflect how much the current transaction deviates in cost from previous transactions. The variable, payment_method_last_purchase_0_3_months may refer to the payment method used in the most recent purchase within the last three months. The variables, n_credit_card_0_3_months, n_direct_bank_0_3_months, n_prepay_0_3_months, and n_invoice_0_3_months may refer to the number of purchases made with credit card, direct bank withdrawal, prepay, and invoice respectively in the last three months. These variables may be variables usable by the random forest of the supervised model.

The risk prediction system 850 may be a hardware and/or software component configured to perform a risk assessment of the user based on the user identity, past information about the user, and the details 816. For example, if the user is a new user with no payment history, the risk prediction system 850 may determine that the risk that the user will default on payment is higher, and consequently the value output in the user credit risk 822 may reflect this risk. Similarly, if the user had previously purchased only small value items but the purchase in the current transaction associated with the details 816 is a very expensive purchase, the risk prediction system 850 may also determine that there is a moderate risk that the user will default on payment, and consequently the user credit risk 822 may be an output value reflecting this moderate risk. On the other hand, if the user had previously purchased high-value items and fulfilled paying for those items, the risk prediction system 850 may determine that the user is of low risk of defaulting on payment, especially if the current transaction is of low value, and consequently the user credit risk 822 may be an output value reflecting this low risk.

The user credit risk 822 may be a characteristic associated with the user identity that indicates a potential risk of default on payment by the user associated with the details 816. For example, a user credit risk of 0.4 may be an estimate by the risk prediction system 850 that the user associated with the details 816 is 40% likely to default on payment. Similarly, a user credit risk of 0.015 may reflect a confidence in the user (e.g., only 1.5% likely to default). The user credit risk 822 may be a numerical or string value. The user credit risk 822 may be computed based on information about previous transactions associated with the user identity.

The options 854 represent different payment options (also referred to as payment types) that could potentially be made available to the user in a user interface at checkout. A first option may be, "pay in X" (or "PIX" for short), which is an option that allows the user to fulfill the payment obligations within a certain amount of time (e.g., six months, one week, 60 days, etc.). A second option may be a revolving account of credit. A third option may be a "pay after delivery" option. A fourth option may be to pay with a credit card. A fifth option may be to pay directly from a bank account. Note that these payment options are for illustrative use only, and it is contemplated that other types of payment are also within the scope of the present disclosure. Furthermore it is also contemplated that for some merchants or in some regions, some of the options 854 may be unavailable to the user, in which case they may be omitted from being passed through the payment preference model or may be disregarded by the user interface displaying component 856.

Each of the options 854, when processed by the system, cause the system to perform a particular workflow in order to receive funds from the transaction. That is, the system acts as an automatic payment system that receives payment based on the option used. For example, upon selection by the user to pay with credit card, the system may contact the computers associated with the brand of credit card in order to receive funds and ensure that the user is appropriately charged. Likewise, if the customer selected an option from an interface that deducts the appropriate funds from a bank account, the system may contact the user's bank to deduct the funds from the user's bank account. Or, if the customer selected to pay in 14 days, the system may wait to receive payment from the customer for up to 14 days.

The payment preference model 852 may comprise hardware and/or software that is configured to output/predict a likelihood that the user associated with the details 816 will select a particular purchase option for the transaction associated with the details 816. The scores 842A-42E may be computed by passing a set of inputs, generated based on the details 816, through a random forest that has been trained on a data set of information about past usage by other users. The inputs may be one or more values for one or more variables, similar to the variables described above (e.g., name_in_e-mail, estore_group, seconds_since_midnight, activation_amount, tot_debt, number_different_products, days_since_last_purchase_0_3_months, activation_amount_last_purchase_0_3_months, stds_dev_from_previous_purchases, payment_method_last_purchase_0_3_months, n_credit_card_0_3_months, n_direct_bank_0_3_months, n_prepay_0_3_months, and n_invoice_0_3_months, etc.).

As noted, the random forest of the supervised model may have been trained from a data set that included at least some of these types of inputs. For example, the training data set for the random forest may have fields for payment type, e-mail address, time of day, total number of different products, debt currently owed by the user to the merchant, amount of the purchase, days since the previous purchase, merchant identity, product identity, day of month, etc. In this manner, the payment preference of the user may be determined based in part on the behaviors of other users in similar situations according to variables similar to those described above. For example, if the user is buying a home theater component at 10:24 PM, and the most recent purchase by the user within the last three months was clothing and the user at that time is selected to pay in part, the payment preference model 852 may base its determination based on what past users in similar situations preferred (e.g., as determined by the supervised model trained on such data). On the other hand, if the user associated with the details 816 is known to always pay with credit card, that fact may influence the scores 842A-42E of the payment preference model. The set of scores 842A-42E may reflect a probability determined by the supervised model that the user will prefer a particular one of the options 854.

The user interface displaying component 856 may be a component of the system configured to determine, based on the set of scores 842A-42E and the user credit risk 822, which of the user interfaces 828A-28C to display to the user associated with the details 816. The user interfaces 828A-28C may be web-based or standalone applications having text or graphic controls (e.g., HyperText Markup Language form fields, dropdown boxes, multiselect boxes, radio buttons, checkboxes, images, buttons, hidden fields, textboxes, and other such form elements, etc.) for conducting and/or finalizing a transaction, such as between the user and an online merchant. In some embodiments, the user interfaces are dynamically generated by the user interface displaying component 856. As an example of a flow, if the user interface displaying component 856 determines that the user credit risk 822 is above a certain threshold (e.g., because the user associated with the details 816 does not have a reliable credit history), the user interface displaying component 856 may output an interface similar to the user interface 828A, prompting the user to pay in advance before receiving ordered items.

On the other hand, if the user interface displaying component 856 determines that, based on the user credit risk 822, that the user is approved for credit the user interface displaying component 856 may select from at least a couple of different potential user interfaces to display. For example one option may be to display a user interface 828B giving the user the option to buy now and decide how to pay later, or another option may be to display a user interface 828C allowing the user to select how to pay from a number of options (e.g., "invoice," "revolve," etc.). The user interface 828B may present the user with the "buy" that, when clicked, defaults to the payment preference option determined by the payment preference model 852, however the user interface 828B may also include a hyperlink, button, or other control that can be clicked by the user to cause the user interface 828C to display in case the user desires to change the type of payment preferred. In some embodiments, the user can click "buy" (or equivalent interface control) to confirm the default payment type and finalize the transaction, and then change the payment type later. One of the purposes of the embodiment illustrated by the example 800 is to present the user with a checkout screen based on a determination of what the user will prefer. Within the user interface displaying component may be a business rule management system, similar to the business rule management system 330 of FIG. 3, configured to determine, based on the user credit risk 822 and the set of scores 842A-42E, which of the user interfaces 828A-28C to display.

As an example, if, according to a database of historical records, the user, "Henry Gibson," always pays with a credit card, the payment preference model 852 may determine that this user is likely to want to pay with a credit card again, and, consequently, the user interface displaying component 856 may cause the user interface 828B to display along with the message to the effect of, "Paying with credit card on file." Alternatively, the user interface displaying component 856 may cause the user interface 828C to display, but the option for "Card" may be preselected. Similarly, based on the scores 842A-42E, the options may be displayed in an order based on the scores 842A-42E in the user interface 828C.

Selection of a particular option or selection to "buy" by the user may cause an automated payment system to respond accordingly (i.e. perform the appropriate workflow). For example, if confirmation of the payment option by the user is received by the user interface, the workflow for that payment option may be caused to be processed. For example if the payment option confirmed was a credit card payment, the system may contact the appropriate systems of the credit card company so that the user is charged for the amount of the purchase so that the merchant can receive funds from the purchase. Likewise, if the payment option confirmed was an invoice payment, the system may generate and send an invoice to the user prompting the user to remit payment upon receipt.

In some embodiments, the user identity determined by the system of the present disclosure is usable to deliver personalized content, such as through a widget embedded in a webpage or through some other interface, to the user. In these embodiments, the content delivered may vary based on the confidence that the system has that the determined identity corresponds to the user. For example, if the system has low confidence (e.g., 30%) that the user is the same as the closest matching user found in historical records and/or the system determines that the credit risk 822 is too high (e.g., above a threshold), the system may present a general/less targeted content to the users, such as a weather report for a region associated with the closest matching user or a simple welcome message (e.g., "Welcome to the checkout page!"). On the other hand, if the system has a higher confidence (e.g., 70%) that the user is the same as the closest matching user found in historical records and/or the system determines that the credit risk 822 is sufficiently low (e.g., below a threshold), the system may present more targeted content (e.g., "We think you might be interested in our new baseball caps!"). Similarly, if the system has a much higher confidence (e.g., 95%) that the user is the same as the closest matching user and/or the system determines that the credit risk 822 is very low (e.g., below still another threshold), the system may present even more specific content (e.g., "You have been preapproved for our credit products!"). In other words, the cutoff value 450 may be increased or decreased as needed based at least in part on the significance of consequences associated with an incorrect determination of a user identity.

Figure 9:
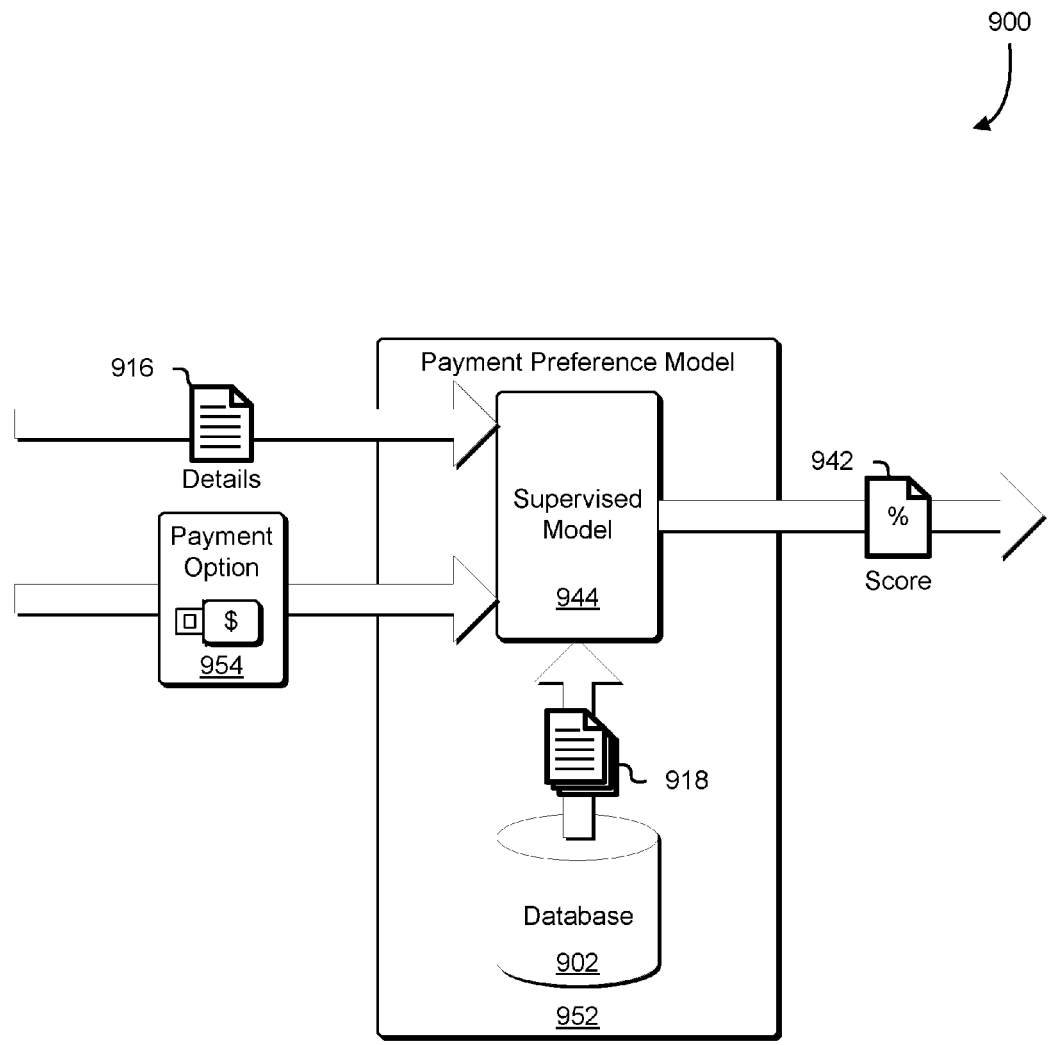
FIG. 9 illustrates an example of a supervised model scoring a prospective payment option in accordance with an embodiment.

FIG. 9 illustrates an example 900 in which an embodiment may be practiced. Specifically, FIG. 9 depicts a payment preference model 952 that receives, as input, the details 916 about the current transaction in process, and a possible payment option 954. The payment preference model 952 utilizes a supervised model 944 (e.g. a random forest trained to make payment preference predictions) to output a score 942, based on these inputs and a set of historical records 918 in a database 902.

The details 916 may be a set of field values associated with a current transaction by a user. Some of the field values may be values input by a user into an online form (e.g., given name, family name, postcode, etc.), whereas other field values may be related to a computing device being used to conduct the transaction (e.g., Internet protocol address) or other information related to the transaction (e.g., date, time, etc.). The details 916 may include information such as price, time of day, item type, quantity, and similar information related to the transaction.

The set of field values may further include information either identifying the user or usable at least in part to determine the identity of the user, similar to the manner described for the process 1000 of FIG. 10. Therefore, based on the set of field values, additional information about the user may be obtained, such as age of the user, e-mail address of the user, whether the given name and/or family name of the user is found within the e-mail address of the user, whether the user owes payment to the merchant for any previous purchases, etc. In this manner, the details 916 may therefore include information about previous transactions/purchases as may be determined by the record matching service 314 in business rule management systems 330 of FIG. 3. Information about previous transactions may be obtained from a data store (not pictured) that stores information about transactions by this and other users. In some cases, this data store may be specific to an online merchant that is a party to the transaction, whereas in other cases the data store may be a central data store for storing transactions between various users and various merchants.

The payment option 954 may be a payment option, similar to the payment options 854 of FIG. 8 (e.g., pay-in-X, credit card, direct bank withdrawal, etc.). The database 902 may be a database for storing the set of historical records 918 of previous purchase behavior by other users. For example, the set of historical records 918 may include data about previous purchases by previous users, such as age of the users, times of purchase, prices at the time of purchase, deviations of the purchase price from prices of previous transactions, and so on. The supervised model 944 may have been trained on similar historical data; that is, the random forest of the supervised model may been generated based on data containing similar types of data collected about previous purchases of users, using the payment options chosen by those users as the ground truth. Consequently, the decision trees of the supervised model 944 may be configured to cast a vote for the likelihood of any given payment option (e.g., the possible payment option 954) to be the preferred method of payment by the user associated with the details 916.

The payment preference model 952 may comprise one or more hardware and/or software components for scoring payment options based on received details 916. Such components including the supervised model 944 in the database 902. Although not depicted, in some implementations, similar to the supervised model of the record matching service described in reference to other embodiments in the present disclosure, the payment preference model 952 may include a search component that transforms the details 916 into search terms. The search terms may be used to perform search queries on the database 902 to return the set of historical records 918. In some implementations, the set of historical records 918 may also be returned with a set of frequencies (not depicted) reflecting how common the search terms are within the database 902. For example, if name_in_email occurs 60% of the time, a frequency corresponding to that search query may be returned to 0.6. In these implementations, these frequencies may be passed through the random forest in order to obtain scores for each in the set of options without passing the actual details 916 through the random forest.

The supervised model 944 may, as noted above, be a random forest trained on a data set of previous purchases by other users. Each record of the data set having at least one field for a ground truth value, one of which being the particular methods of payment preferred by the other users. Thus, when the supervised model 944 receives the set of details 916 (or set of inputs determined from the set of details 916), each decision tree of the supervised model 944 may vote on whether the set of details 916 suggests that the associated user will prefer the payment option 954 as a method of payment. The supervised model 944 may then output the vote as the score 942 for the payment option 954. This process may be repeated for each potential payment option, thereby yielding a set of scores, such as the scores 842 of FIG. 8.

Some embodiments of the present disclosure may be used to determine an ideal balance between price reduction and customer conversion. For example, when a price of a product is lowered, the vendor of the product may make less profit per product sold, but the lower price may attract more buyers, thereby resulting in increased overall profit for the vendor. However, at a certain point, further lowering the price does not attract enough buyers to offset the cost of lowering the price (e.g., if the price is lowered to zero, the vendor ceases to make a profit even if the number of buyers are infinite). This may be true both for tangible goods, credit products (e.g., fees associated with offerings of credit), and services.

The likelihood of consumers purchasing a given product based on its price may be expressed using a logarithmic curve. However, each individual may have their own price points and their own curves. For example, what Henry may pay for a product may be different than what Lars will be willing to pay for the same product, and vice versa. In the present disclosure, is contemplated that details about a purchaser and about the current transaction may be passed through a random forest of a supervised model to output likelihood that the purchaser will be persuaded to complete the transaction at a given price. For example, details such as an age of the user, number of products in the current transaction, and day of the month may affect the price sensitivity of the user. Therefore, a random forest of the supervised model may be trained on a data set of historical purchases made by other users where a ground truth value for the data set is a Boolean value indicating whether the purchase was completed. In this manner, the best price for a given product for a given user may be determined by passing details about the transaction through the supervised model. For example, passing a name of the product, a price, age of the user, and time of month, each decision tree of a random forest of the supervised model may cast a vote whether the user will complete the purchase. A count of all the votes then may indicate likelihood that the user will complete the purchase. Note that in some embodiments, the supervised model is alternatively implemented using a regression model based on such historical purchase data instead of a random forest.

Some embodiments of the present disclosure may be used to determine, using a supervised model, the likelihood, based on details associated with the transaction, that a user will return one or more items ordered. For example, a random forest of the supervised model may be trained on historical purchase data where a ground truth is a Boolean value indicating whether a particular purchased product was returned by the purchaser. The data mined for the current transaction in the historical purchase data include be data mined from the text of the item description. Detailed associated with the transaction and in the historical purchase data may be details such as the type of product, the number of similar types of products purchased during the same transaction, sizes of the products, colors of the products, the price of the product, age of the purchaser, day of the month, season of the year, and so on. For example, if the user selects for purchase from an online merchant three pairs of the same type of shoes, but in sizes 6½, 7, and 7½. By passing this information regarding the type and sizes of the products, the supervised model may output a score suggesting that it is very likely that the user will return two of the pairs of shoes. The supervised model, may even suggest that, based on the differences in sizes, that the user will most likely keep the size 7 pair and return the size 6½ and 7½ pairs. Similarly, if the customer orders two sets of curtains that are identical except that they are different colors, the supervised model may determine that the customer is likely to return one of the set of curtains.

Certain returns may be affected by the season of the year. For example, returns for bathing suits may be higher during the summer or fall months then during the winter. Therefore, based on these and other factors, the supervised model may be able to indicate a likelihood that a user will return a particular product purchased. The supervised model may also be able to distinguish that some products may be more likely to be returned than others; for example, if the user orders packs of two different flavors of Ramen noodles, the supervised model may determine that it is unlikely that the user will return either the Ramen noodles.

Based on this prediction, various actions may be performed by the merchant and/or a creditor. For example, if a merchant runs low in stock for a particular item, but the merchant expects, based on the likelihood described above, to be receiving some of the particular items back in a customer return, the merchant may not need to immediately restock the particular item. Furthermore, by avoiding the necessity of restocking the particular item, the merchant may avoid having excess stock on hand when the returned items finally arrived. Another action that may be taken is that a creditor can extend a payment period based on the likelihood that the user will be returning one or more items. For example, if the user was given 14 days to pay in full for a particular order, but the supervised model indicated that it was likely that the user would return one of the items from the particular order, additional time (also referred to as "slack period") may be given to the user to pay in full (e.g., 14 days extended to 28 days), to allow time for the returned item to be delivered back to the merchant. In this manner, a customer need not be inconvenienced by being billed for an item not kept. Additionally or alternatively, additional credit may be added to the credit limit of the user because it is known that the user is not likely to be charged for the full value of the purchase or because it is known that the user will likely receive a credit from returning an item.

However, if the user orders a large number of items and returns most of them, the profit of the merchant may be reduced (e.g., restocking costs, shipping and handling costs, labor and other costs). Therefore another benefit provided by this embodiment may be that, payment options may be dynamically adjusted based on a likelihood of return. For example, if the user orders 20 dresses, and the supervised model determines that it is likely that the user will return 75% of the dresses, the merchant may demand pre-payment by the user in order to complete the purchase, rather than allowing the user to pay by credit card.

Some embodiments of the present disclosure may be used to predict future purchases by the user. For example, a web application, such as a software widget, embedded into merchant web pages may be configured to collect information about the products the user is viewing through a browser and/or selecting for potential purchase. From this information, a supervised model may be able to determine the likelihood of a purchase of a particular item at a particular price by the particular user. For example, if the software widget as described above is utilized by five different online electronic stores, and detects that the user has viewed 32-inch televisions at each of the sites, the supervised model may detect the pattern and indicate that it is very probable that the user will soon purchase a television in the near future, and probably a 32-inch one. Based on this information, a merchant may configure an online store to offer various incentives to the user upon a return visit to the site by the user. For example, if the user had previously been browsing 32-inch televisions during a previous session, upon revisiting the site, the user may be presented with an offer of 20% off on the purchase of a 32-inch television.

The random forest of the supervised model may be trained on historical purchase data that includes data about previous web pages browsed by an individual prior to a purchase, time period between visiting such web pages and the time of actual purchase, categories of products browsed, category of product purchased, and so on. The data may also include data about webpages browsed by an individual that did not result in a purchase. For example, if an individual browsed multiple product pages for 32-inch televisions within a certain price range, and the individual was not subsequently detected as having purchased a television, at least within a predetermined range of time, this information may be collected and may be usable in conjunction with the supervised model to determine how much to lower a price for a particular product in order to increase conversion of consumers. As noted above, data may be mined from the product description text for training the random forest of the supervised model.

Moreover, benefits of these embodiments further include providing merchants with forecasting data. For example, if the software widget described above detected, based on received browsing data from multiple users, that 100 of those users are likely to purchase a 32-inch television within the next week from a particular merchant, the merchant can be notified by the system of the present disclosure, so as to be prepared to have 100 32-inch televisions on hand in preparation for the purchases. In some embodiments, an advantage is that the widget may be utilized by multiple merchants in their webpages in order to take advantage of cross-merchant browsing by potential customers.

Some embodiments of the present disclosure may be used to predict non-completion of purchases, which may provide an opportunity to a merchant to make an adjustment to an offer as an incentive to a prospective purchaser to complete the transaction. In these embodiments, a random forest of a supervised model may be trained on data collected at checkout for an online purchase. The ground truth value for the random forest may be whether the purchase was completed or not. Thus, based on data collected at checkout, such as total price, number of items, types of items, last date of a previous purchase by the user, payment type used for the previous purchase by the user, browser type, device type being used for the purchase (e.g., mobile phone, personal computer, etc.), Internet protocol address, time of day, day of month, and so on, the supervised model may predict whether the user is likely to complete the purchase or abandon the purchase. In a case where the supervised model indicates that it is likely that the user will abandon the purchase, or abandon at least a portion of the purchase (e.g., removing certain items from the shopping cart), the system may be configured to present the user with incentives deemed likely to persuade the user to complete the purchase (e.g., six month grace period to pay for the purchase, low interest terms, discount on next purchase, etc.).

Some embodiments of the present disclosure may be used to predict whether additional security or authentication information should be obtained from the user (e.g., via 3-D Secure protocol) prior to completing the purchase. That is, based on data collected, a supervised model may determine a likelihood of fraud in the transaction, and, as a result, determine whether to prompt the user for further assurances (e.g., Social Security number, challenge response authentication, etc.). In some cases, the supervised model may aid in determining whether, based on a given likelihood of risk of fraud, whether the user is likely to be discouraged from completing the transaction if prompted for further assurances. That is, the merchant may determine that it is worth the risk, up to a threshold of likelihood, to proceed with the transaction without further assurances if the likelihood that further assurances would cause the user to abandon the transaction is too high (e.g., above another threshold).

FIG. 10 is a block diagram illustrating an example of a process 1000 for determining the likelihood that a user placing a record is associated with a historical record in accordance with various embodiments. Some or all of the process 1000 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

Some or all of process 1000 may be performed, for example, by any suitable system such as the computing device 1900 described in conjunction with FIG. 19. The process 1000 includes a series of operations wherein a request is received to determine the identity of a user, the data provided in the request is transformed into a set of search terms, a frequency value is generated for each of the search terms, and a set of historical records is determined based in part on the frequency value. The set of historical records is run through a supervised model of the present disclosure, and an output set of user identities (IDs).

In 1002, the system performing the process 1000 receives an electronic request to validate the user identity associated with the set of details. In some examples, "electronic request" may refer to a request initiated by a computer system or component of the computer system to another computer system or component of the other computer system. Examples of electronic requests include application programming interface calls and remote procedure calls. At least a portion of the set of details may be included with the electronic request, which may be submitted to the system through an application programming interface. As noted, details may include details about user and/or a record in the process of being placed, such as given/first name (e.g., "John," "Henry," "Lars," "Erik," etc.), family/last name (e.g., "McClane," "Gibson," "Jansson," "Knutsson," etc.), billing or delivery address parts (e.g., street number, street name, city name, apartment/flat number, etc.), e-mail address, telephone number, Internet protocol address, and birthdate. In embodiments of the system of the present disclosure, one or more of the details are indexed for more efficient searching. In addition, combinations of one or more of the details may also be indexed. For example, an address combination (e.g., a combination of the first three letters in a street address, a house number, and a postcode), a birthdate and given name combination (e.g., "1976-11-19henry," etc.), and/or a birthdate and family name combination (e.g., "1976-11-19gibson," and given/family name combination (e.g., "henrygibson," etc.) may be indexed additionally or alternatively.

Note that, although the present disclosure describes using details to identify a user who is a customer of an online merchant, the techniques described in the present disclosure may also be used to identify a user in other contexts. For example, rather than details, the electronic request may include the text/content of an article (i.e., piece of writing). The techniques of the present disclosure may be utilized to determine the probability that the article was written by the same author as another article indexed and stored in the system database. Or, as still another example, the techniques of the present disclosure may be utilized to determine the probability that a person signing up for a particular service (e.g., social media service, e-mail service, etc.) has the same identity as an identity associated with other details stored in the database, based on input provided via a validation request of 1002.

In 1004, the values provided in the request parameters may be transformed into search queries. Values for some of the request parameters may be transformed into only a single search query; for example, a postcode of "90210" may only be transformed into a search for postcode that matches "90210." However other request parameters may be transformed into multiple search queries; for example, a given name may be transformed into a query for the given name and another query for the first three letters of the given name (e.g., "Katherine" and "kat"). As another example, a given name and a family name may be transformed into queries for the given name, the family name, combination of the given name and the family name (i.e., given name first), and a combination of the family name and the given name (i.e., family name first). As still another example, a hyphenated given name and/or family name may be split into multiple queries (e.g., "John-Henry" transformed into separate given name queries for "John" and "Henry," "Spencer-Churchill" transformed into separate family name queries for "Spencer" and "Churchill").

Also in 1004, the values provided in the request parameters may be normalized in the search queries. For example, text may be converted into all upper or lower case, white space may be removed (e.g., all white space, leading or trailing white space, etc.), certain character types may be removed (e.g., nonnumeric characters may be removed from a telephone number, non-alpha characters may be removed from a given name or family name, etc.), or Internet protocol address may be normalized to a canonical format.

In 1006, a set of records in the data set (e.g., historical records from users) matching any of the search queries may be obtained. In the above example, for "Kelly Taylor" residing in postcode "90210," the set of records may include all records matching the given name "Kelly," all records matching the family name "Taylor," and all records matching the postcode "90210." In this example, the total count of records may be determined to be 250,000 (e.g., some of the records may overlap).

In 1008, for each record in the set of records determined in 1006, a term frequency is computed for each of the search queries determined in 1004. Term frequency may refer to a number of occurrences of a search term within a particular search field. In the present disclosure, however, terms are typically found within a particular search field only once or not at all. For example, for a given record, the given name field will either match the given name search query (e.g., "john"), in which case the term frequency for the given document will be 1 for the given name search query, or it will not match, in which case the term frequency for the given document will be 0 for the given name search query.

In 1010, an inverse document frequency (IDF) value may be computed for each of the search terms. The IDF is based on the premise that, the rarer the match, the greater the probability that the record is associated with the user being validated. IDF values may be computed in a number of ways, one of which may be according to one of the following formulas. In a case where the term matched within a record, the IDF value may be computed as:

$$IDF(\text{term}) = \log_2 \frac{\text{total\_number\_of\_records}}{1 + \text{number\_of\_occurrences(term)}}$$

or 1 if number_of_occurrences(term) + 2 > total_number_of_records

In a case where the term is not found (i.e., not matched) within a record, the IDF value may be computed as:

$$IDF(\text{term}) = -\log_2 \frac{\text{total\_number\_of\_records}}{\text{total\_number\_of\_records} - \text{number\_of\_occurrences(term)}}$$

or −1 if number_of_occurrences(term) + 2 > total_number_of_records

In a case where the term is not provided or missing from the details (e.g., a "middle name" field was left blank by the user or otherwise not provided to the record matching service):

$$IDF(\text{term}) = 0$$

The frequency in these cases refers to a count of records that match the respective term in the search of the data set. For example, a query may be generated to obtain a count of records where the given name field matches "john," in a data set containing 1 million records of user information. Such a query may return a result count of 32,716. Whereas, a query to obtain a count of records where the given name matches "Darrell," in the data set, may return a result count of 780, indicating that "John" is a much more common name than "Darrell." As another example, a set of details may include a given name of "Kelly," a family name of "Taylor," and a postcode of 90210. From a data set of 35 million user records, a given name count of 60,550 records matching given name, "Kelly," may be obtained, a family name count of 108,850 records matching the family name, "Taylor," may be obtained, and a postcode count of 185,864 records matching the postcode, 90210.

In the above examples, $IDF_{GivenName}(\text{"john"})=1.485$ and $IDF_{GivenName}(\text{"darrell"})=3.107$, reflecting that the uniqueness of the given name "Darrell" is greater than "John." The inverse document frequency value may be usable for determining the likelihood that the user associated with the current details is associated with one or more of the matching records. In the example above for "Kelly Taylor," $IDF_{GivenName}(\text{"kelly"})=9.175$, $IDF_{FamilyName}(\text{"taylor"})=8.329$, and $IDF_{Postcode}(90210)=7.557$.

In 1012, for each of the records that contains at least one occurrence that matches a search query, a rank may be determined based on rank calculation. Various permutations of ranking are possible. In one example, the rank calculation for each document may be the sum of the term frequencies (i.e., 1 or 0) in the document multiplied by the IDF for the term:

$$S(\text{record}) = \sum_{\text{term}} \text{match\_in}(\text{record}, \text{term}) \times IDF(\text{term})$$

Where match_in(record,term) is 1 if the search query finds the term in the respective field of the record, is −1 if the search query does not find the term in the respective field of the record, and 0 if the search term is blank or was not provided in the details. Using the above IDF's as an example, a record with the given name field matching "kelly" and a family name field matching "taylor," but not matching a postcode field of "90210," would yield a rank calculation of 9.947 (1×9.175+1×8.329+−1×7.557). A record with the family name field matching "taylor" and the postcode field matching "90210," but the given name field was left blank, would yield a rank calculation of 15.886 (0×9.175+1×8.329+1×7.557). Whereas, a record with the given name field matching "Kelly," the family name field matching "taylor," and the postcode field matching "90210," would yield a rank calculation of 25.061 (1×9.175+1×8.329+1×7.557). These rank calculations may be used to rank and filter out records that are unlikely to be associated with the user. For example, out of all of the records that contain at least one occurrence matching a search query, only a threshold number (e.g., 30, 100, 5, etc.) of the highest ranking records may be retained and passed to the supervised model.

Thus, in 1014, for each of the highest ranking records, a user ID associated with the record and the IDF's for each of the fields may be passed to the supervised model, which may then generate a score for each of the highest ranked records reflecting the likelihood that the user is associated. As noted, the supervised model may be a random forest derived from a reference data set with records having at least some fields of the same type (e.g., given name, family name, address, phone number, etc.) as the fields in the set of records searched above. In some cases, the set of records searched may include the reference data set that was used to generate the supervised model. Each of the records in the reference data set may have at least one ground truth value. In the context of the present disclosure, the ground truth value is a value that, absent malicious or inadvertent use of the value (e.g., identity theft), uniquely or otherwise unambiguously corresponds to a target value/objective, which, in many embodiments of the present disclosure, is an identity of the user. For example, in some countries, each citizen is allocated a unique identification number (e.g., a Social Security number in the United States and Switzerland, the Nigerian National Identification Number in Nigeria, the Population Identification Code in Thailand, etc.). Such a unique information value may serve as ground truth in a data set for identifying a user. Note, in some cases it may be possible for multiple ground truth values to correspond to a single target. For example, if a user holds both a social security number from the United States and a social insurance number from Canada, both numbers may be considered ground truth values because they unambiguously identify the individual to whom they are assigned. Thus, the random forest of the supervised model may be generated ("trained") from such a data set (also referred to as a "training" data set) in a manner such that, given a set of matching and/or mismatching details, a likelihood of whether the details correspond to a ground truth can be determined. For example, the process generating the random forest may determine that the combination of a given name and a family name is a much more likely predictor of ground truth than the given name and the family name alone.

Furthermore, the process that generates the random forest may determine, based on training data, that an e-mail address is even a more likely predictor of ground truth than the combination of given name and family name. Consequently, the score generated by the supervised model for each of the records may reflect the likelihood that the record is associated with the user that entered the current set of details based at least in part on the one or more fields matched and/or mismatched. More detail regarding the supervised model may be found in the description of FIG. 3. By training the supervised model on a data set with a ground truth value for a user identity as well as other details about the user corresponding to the user identity, the supervised model can be configured to determine whether a user corresponds to a set of details in a data set that lacks a ground truth value, such as a data set of historical records.

Finally, in 1016, the system performing the process 1000 may provide one or more user identifiers associated with the records that scored the highest number of votes by the supervised model as output in response to the electronic request for validation of 1002. Note that in some implementations, rather than a user identifier the system provides a record identifier corresponding to the top scoring record. In still other implementations, the system provides additional data, such as a confidence score indicating the confidence the supervised model has that the user associated with the details is the same user associated with the respective record or user identifier.

For example, a user may enter details and, based on the details, the supervised model may give a confidence score reflecting a 40% confidence that the user is the same user as a particular existing user. Because 40% confidence suggests that it is 60% likely that the user is not the same, the system performing the process 1000 may conclude that the safest course of action is to treat the user as a new user and assign a new user identifier to the user. Note that one or more of the operations performed in 1002-16 may be performed in various orders and combinations, including in parallel.

Figure 11:
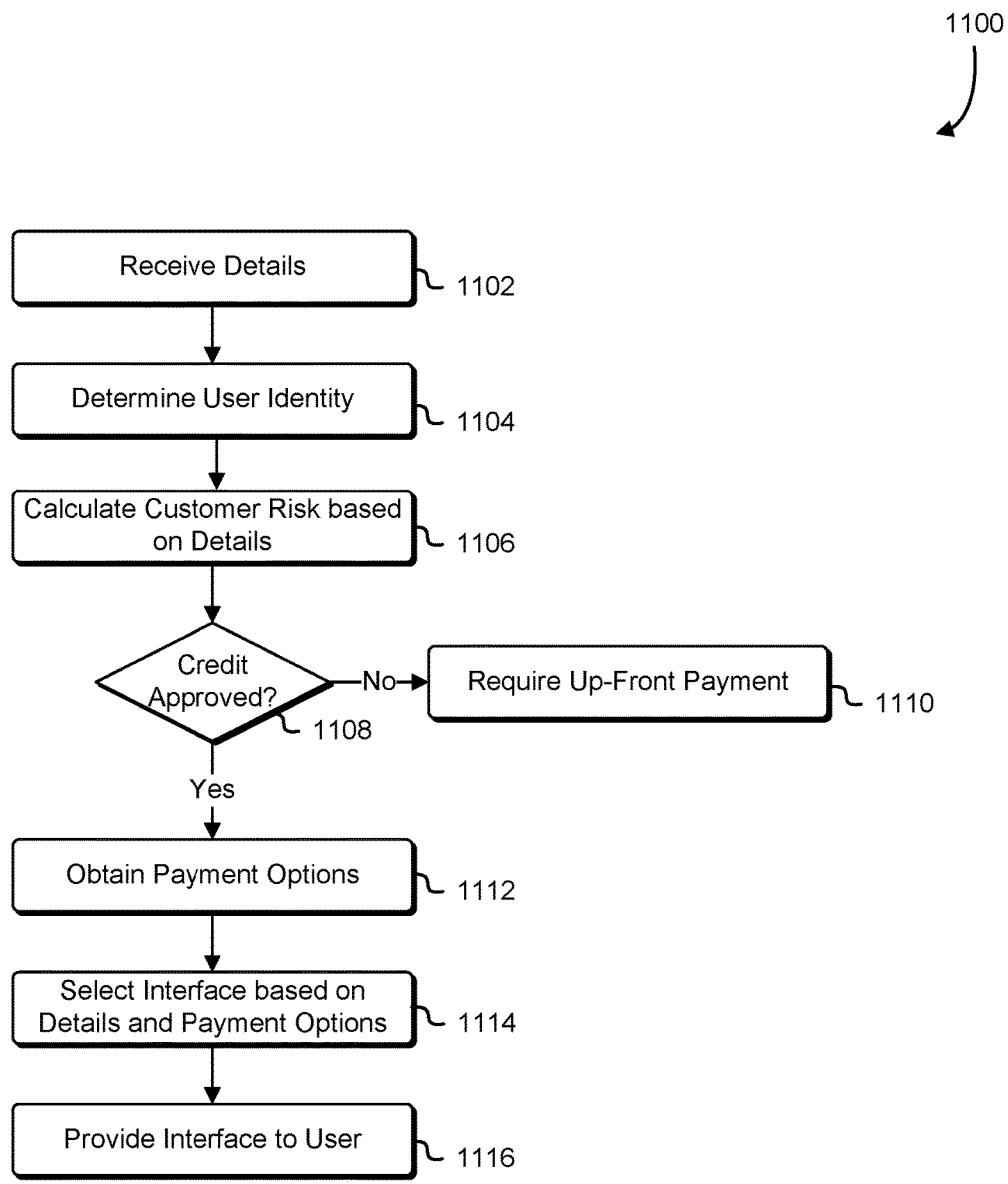
FIG. 11 is a flow chart that illustrates an example of determining a user interface based on a prediction of user preference in accordance with an embodiment.

FIG. 11 is a flow chart illustrating an example of a process 1100 for determining a user payment preference in accordance with various embodiments. Some or all of the process 1100 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). Some or all of process 1100 may be performed, for example, by any suitable system such as the computing device 1900 of FIG. 19. The process 1100 includes a series of operations wherein a set of details are received, user identity is determined based on the set of details, a credit risk is determined based on the user identity, a determination of credit is made, payment options are scored, and the user interface is presented to the user based on the scored payment options if the user is deemed creditworthy.

In 1102, a set of details may be received by the system performing the process 1100. As described, the set of details may correspond to a transaction between a user and a merchant, and may include such details as the user's given name, the user's family name, postcode, e-mail address, Internet protocol address of a computing device being used in the transaction, and a timestamp.

In 1104, based on the information in the set of details, an identity of the user may be determined, such as by a process similar to the process 1000 of FIG. 10. Based on the user's identity, information about previous purchases by the user may be obtained from for example a merchant database configured to store information about purchases. Information about previous purchases may include, a date of the most recent purchase within the last three months, whether the most recent purchase within the last three months has been fully paid for, payment method used in the most recent purchase within the last three months, total amount of purchase of the most recent purchase within last three months, standard deviation of previous purchase prices, and other information based on previous transactions.

In 1106, one or more user characteristics may be computed based upon information received or obtained in 1102-04. One of the characteristics may be a credit risk of the user; that is, a value that corresponds to a likelihood that the user may default on payment for the purchase. For example, if the user is a new customer of the merchant the user may have insufficient payment history to support consideration of the customer as a low credit risk. Consequently, a new customer may be given a high credit risk value. Likewise, an existing customer who has previously defaulted on payment may likewise be given a high credit risk value. On the other hand, an existing customer with an extensive credit history of making good on payments for purchases may be given a low credit risk value, indicating that such customer is unlikely to default on payment.

In 1108, if the user's credit risk is deemed too high (e.g., the credit risk value exceeds a threshold), the user may be presented with a user interface on checkout, in 1110, informing the user that pre-payment for the purchase is necessary before the transaction can be completed. Otherwise, the system performing the process 1100 may proceed to 1112 whereupon, for each of a set of possible payment types/ options, the system may compute a score reflecting likelihood that the user will prefer that payment type. The score may be calculated based at least on inputs derived from the set of details (including information about previous purchases). The score may be calculated by passing the inputs to decision trees of a random forest of the supervised model that has been trained on data from previous purchases by various users, and counting the votes of the decision trees. As noted, the training data used to train the supervised model in this embodiment may include one or more ground truth values for each record, at least one of which corresponding to the payment type selected by the particular users of the previous purchases. In other words, a ground truth value for payment type uniquely or otherwise unambiguously corresponds to the payment type used/selected for the transaction. Note too, that, in some implementations, the supervised model does not utilize decision trees. For example, the supervised model may be implemented as a set of naïve Bayes classifiers, a linear set of decision rules, or as a multinomial logistic regression.

In 1114, the user interface may be determined, based on the set of scores computed for the set of payment options. In some implementations, the user interface may be a user interface selected from a plurality of different user interfaces. In other implementations, the user interface may be dynamically generated. For example, given a set of five different payment options, the payment options may be presented to the user in the user interface in an order (e.g., decreasing, increasing, etc.) corresponding to the scores, and the highest scoring payment option may be selected by default.

Finally, in 1116, the system performing the process 1100 may provide the user interface determined in 1114 to the user (e.g., at checkout). Upon selection or confirmation of a payment options displayed in the user interface, the system performing the process 1100 may initiate the workflow that corresponds to the selected/confirmed payment option. Note that one or more of the operations performed in 1102-16 may be performed in various orders and combinations, including in parallel.

Figure 12:
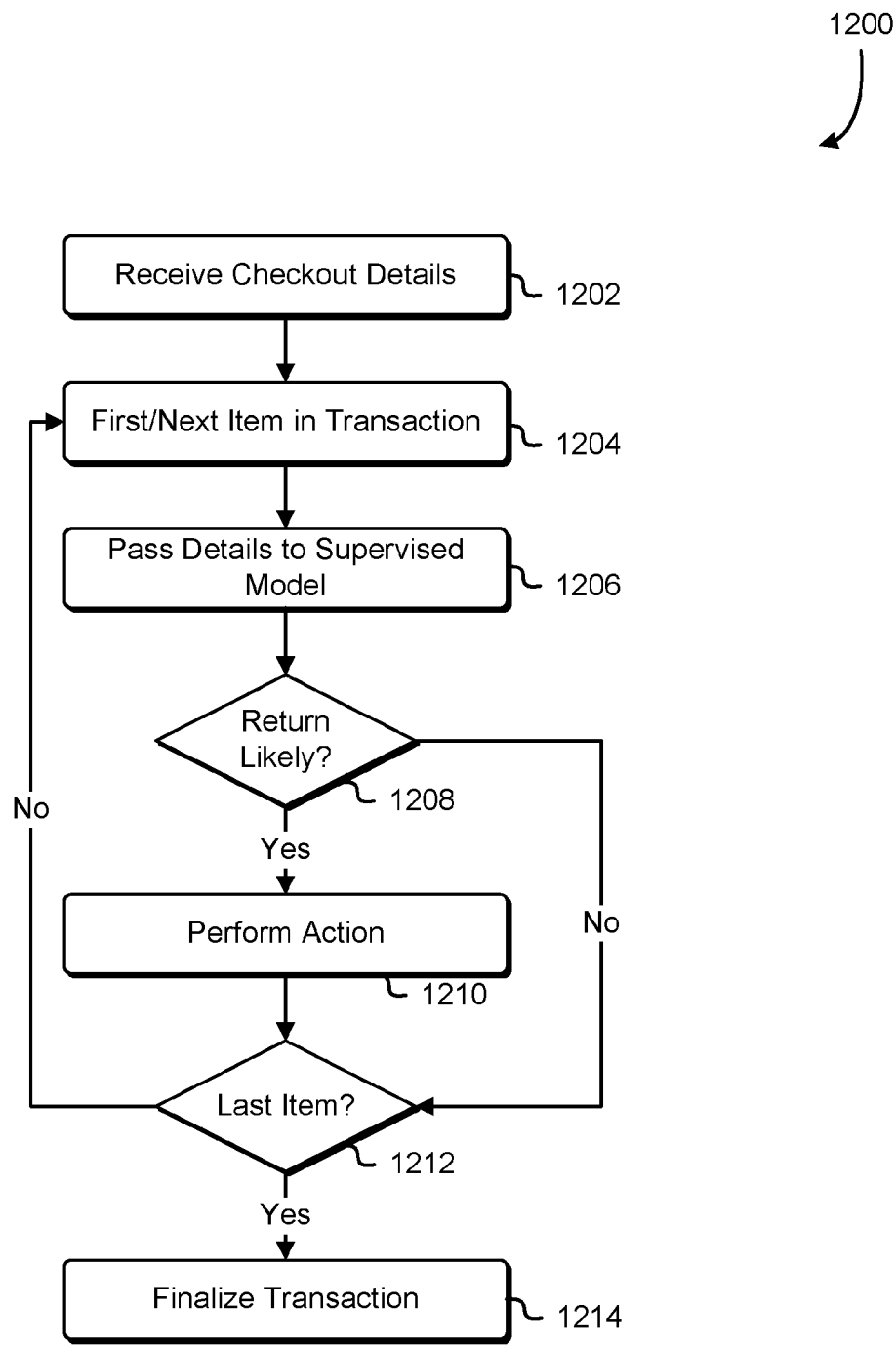
FIG. 12 is a flow chart that illustrates an example of predicting return of an item by a user in accordance with an embodiment.

FIG. 12 is a flow chart illustrating an example of a process 1200 for determining the likelihood of return of a purchase by a user in accordance with various embodiments. Some or all of the process 1200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). Some or all of process 1200 may be performed, for example, by any suitable system such as the computing device 1900 of FIG. 19. The process 1200 includes a series of operations wherein details of the potential purchase are received, and based on the details a determination is made as to the likelihood that the user will return one or more items in the potential purchase after the purchase is finalized.

In 1202, details from potential purchase may be received by the system performing the process 1200. For example, the user may be browsing an online store of the merchant, and may have selected one or more items for purchase, causing the items to be placed into a virtual shopping cart/basket. At the time the operations in 1202 are performed, the user may have clicked a button to proceed to a checkout stage of the transaction. However, it is contemplated that the process 1200 may be performed at various other stages during the online shopping experience; such as after the purchase is finalized or each time the user adds a new item to the virtual shopping cart/basket. Details received by the system of the process 1200 may include information such as, for each item in the virtual shopping cart/basket, item type, item description, item color, item size, quantity of item, item price, and so on. Other details received by the system may include information such as Internet protocol address of the user device being used by the user to conduct the transaction, date, and/or time of day. Still other details received by the system may be details about the user and/or previous purchases made by the user (which may be obtained in a manner similar to obtaining information from historical orders described elsewhere in the present disclosure), such as date of previous purchase, amount still owed by user for the previous purchase, return history of the user (e.g., whether the user is known to frequently, that is above a certain threshold, return purchased items), payment type used for previous purchases, payment type being used for the current purchase, locality of the user, and so on.

In 1204, the first item in the shopping cart/basket of the user may be examined (or, if the system performing the process 1200 is returning from 1212, the next item in the shopping cart/basket). In 1206, details regarding the user (e.g., age, gender, etc.), the current item (e.g., price, color, size, etc.), other items (e.g., quantity of other items, prices of other items, sizes/colors of other items, style/model of other items, etc.) in the shopping cart/basket, and other details about the transaction (e.g., date/time, etc.) may be passed to a supervised model trained on similar data. The similar data from which the supervised model was trained may have been a historical data set containing records of previous purchases by various users, whether those users returned items, and, if so, which items were returned.

The supervised model may return a result that indicates a likelihood that the item will be returned. For example a result of 0.6 may suggest that there is a 60% likelihood that the user will return the item. Consequently, in 1208, if a result received from the supervised model indicates a sufficient likelihood (e.g., above a predetermined threshold, such as 75%) that the item will be returned, the system performing the process 1200 may proceed to 1210, whereupon the system may perform an appropriate action as a result.

An appropriate action may include notifying the merchant of the likely return, thereby allowing the merchant to manage inventory accordingly (e.g., if the merchant sells out of the particular item, the merchant may expect to receive another item into stock from the return). Another appropriate action may be to change, add, or remove a promotion for the transaction. For example, if the item is deemed by the supervised model to be likely (e.g., above a threshold) to be returned, a free shipping promotion may be canceled for the transaction, or the user may be encouraged to add an additional item to the transaction that is less likely to be returned. Still another appropriate action may be to present the user with different payment options then may have otherwise been presented had the risk of return been less likely, with the different payment options being better able to mitigate the extra cost of managing the return. For example, the user may be prompted to prepay for the order, or the user may be presented with an offer to insure the shipment of the item for a fee.

Yet another appropriate action may include adjusting a payment period for the purchase. For example, if the user selected a payment type whereby the customer would pay in full after 14 days, the payment due date may be extended to 28 days to account for a delay in payment due to the likely return. That is, rather than receiving a notification by the merchant on the 15$^{th}$ day requesting payment, the merchant may delay its demand until the 29$^{th}$ day. Even another appropriate action may include the creditor temporarily increasing the credit limit of the user. For example, if the user purchases $5,000 worth of goods and is determined likely to return $1,000 worth of goods from that purchase, the creditor may increase the credit limit of the user by $1,000 in order to not penalize the user for goods which are likely in transit for return back to the merchant.

Otherwise, if the supervised model does not indicate sufficient likelihood of a return of the item, the system performing the process 1200 may instead proceed to 1212, whereupon the system may determine whether the current item being examined is the last item in the user's virtual shopping cart/basket. If not, the system may return to 1204 to examine the next item in the user's virtual shopping cart/basket. If so, the system may proceed to 1214, whereupon the transaction may be finalized (e.g., payment processed, confirmation e-mail sent to user, bill of material generated and sent to merchant for processing, etc.).

Note that it is contemplated that rather than iterating through each item in a user's virtual shopping cart/basket, the supervised model may be configured to evaluate the potential purchase as a whole to determine whether at least a portion of the purchase is likely to be returned by the user rather than an item-by-item determination. Note too that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 13:
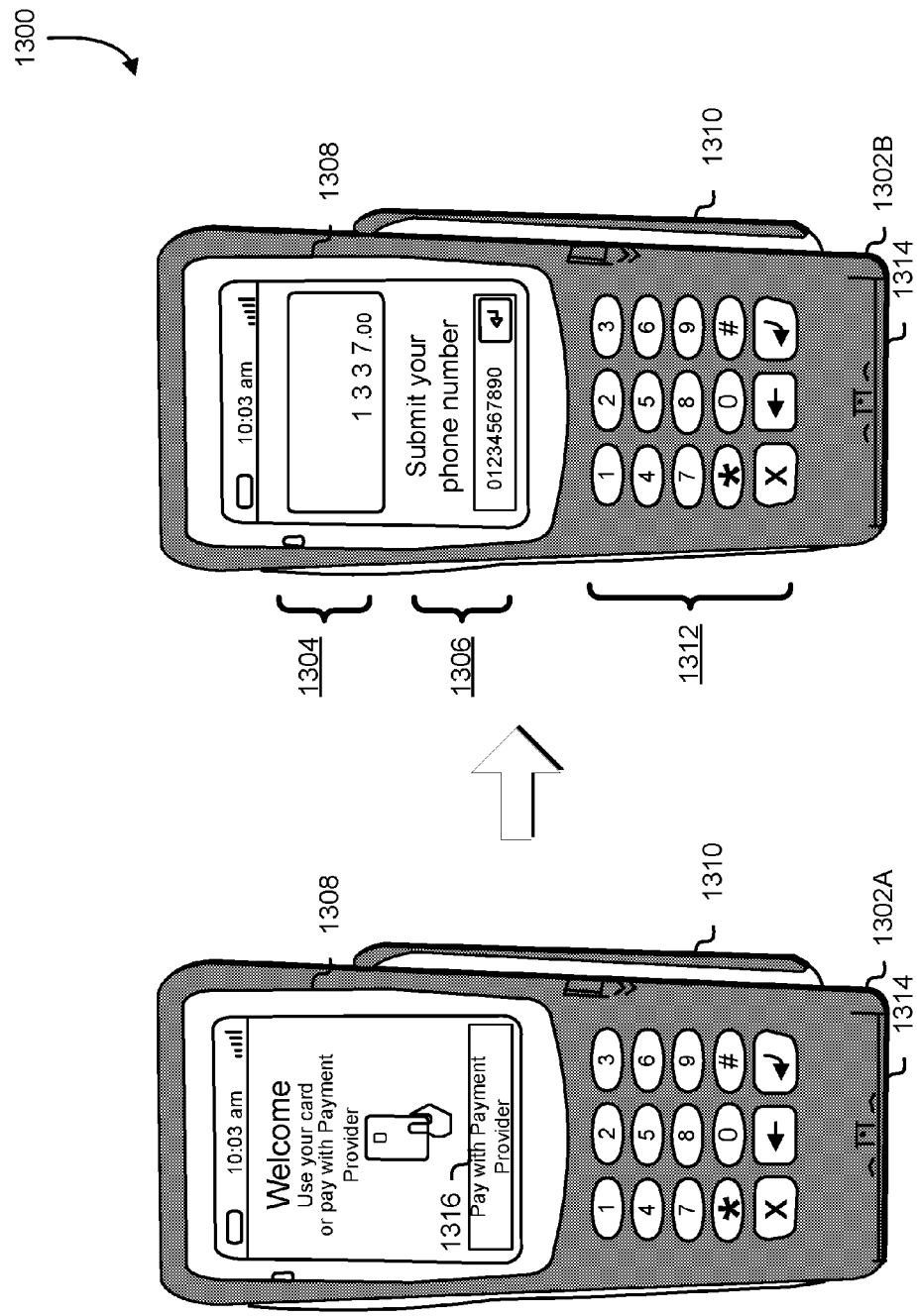
FIG. 13 is a flow chart that illustrates an example of a payment terminal in accordance with an embodiment.
Figure 14:
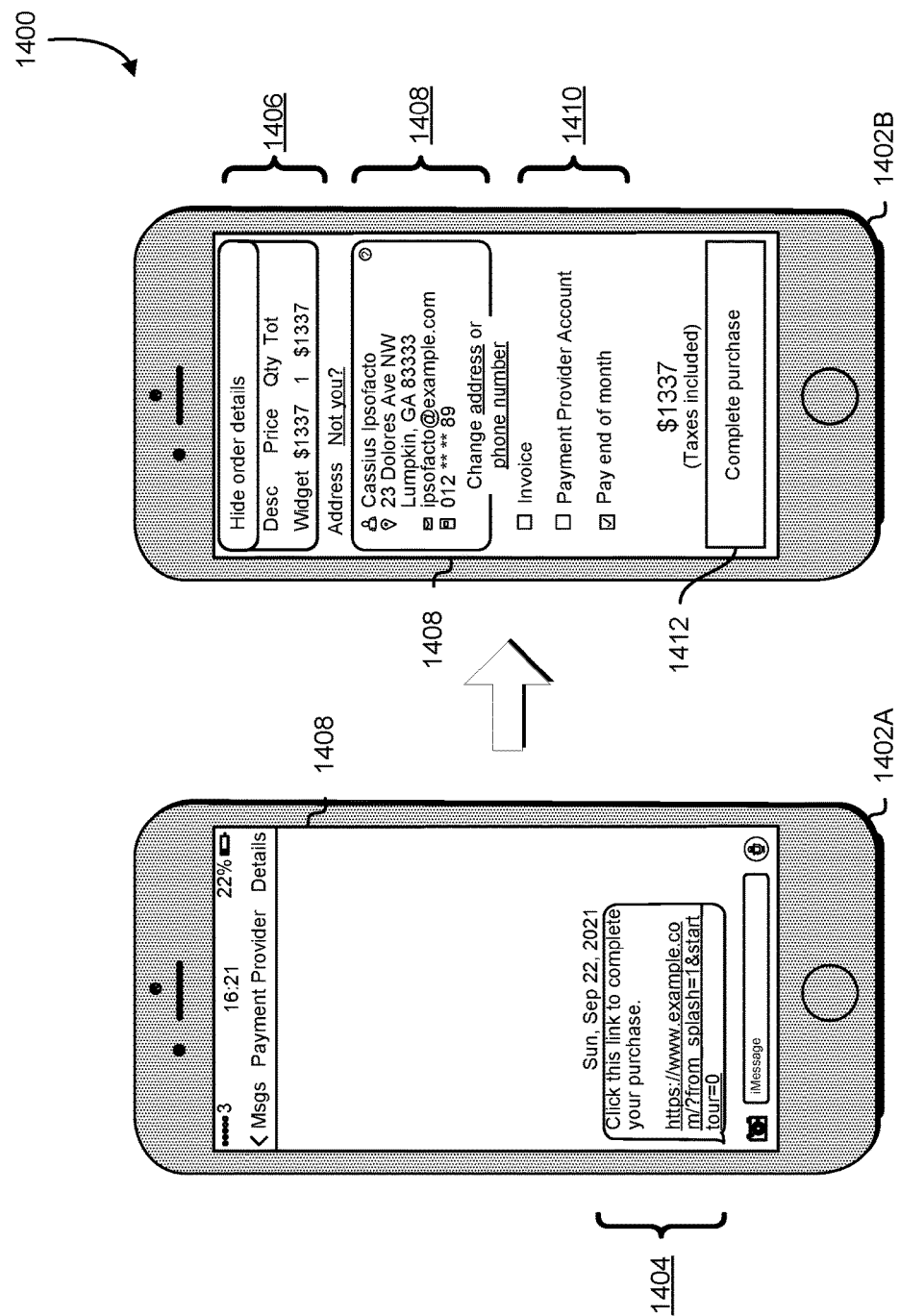
FIG. 14 is a flow chart that illustrates an example of a client device in accordance with an embodiment.
Figure 15:
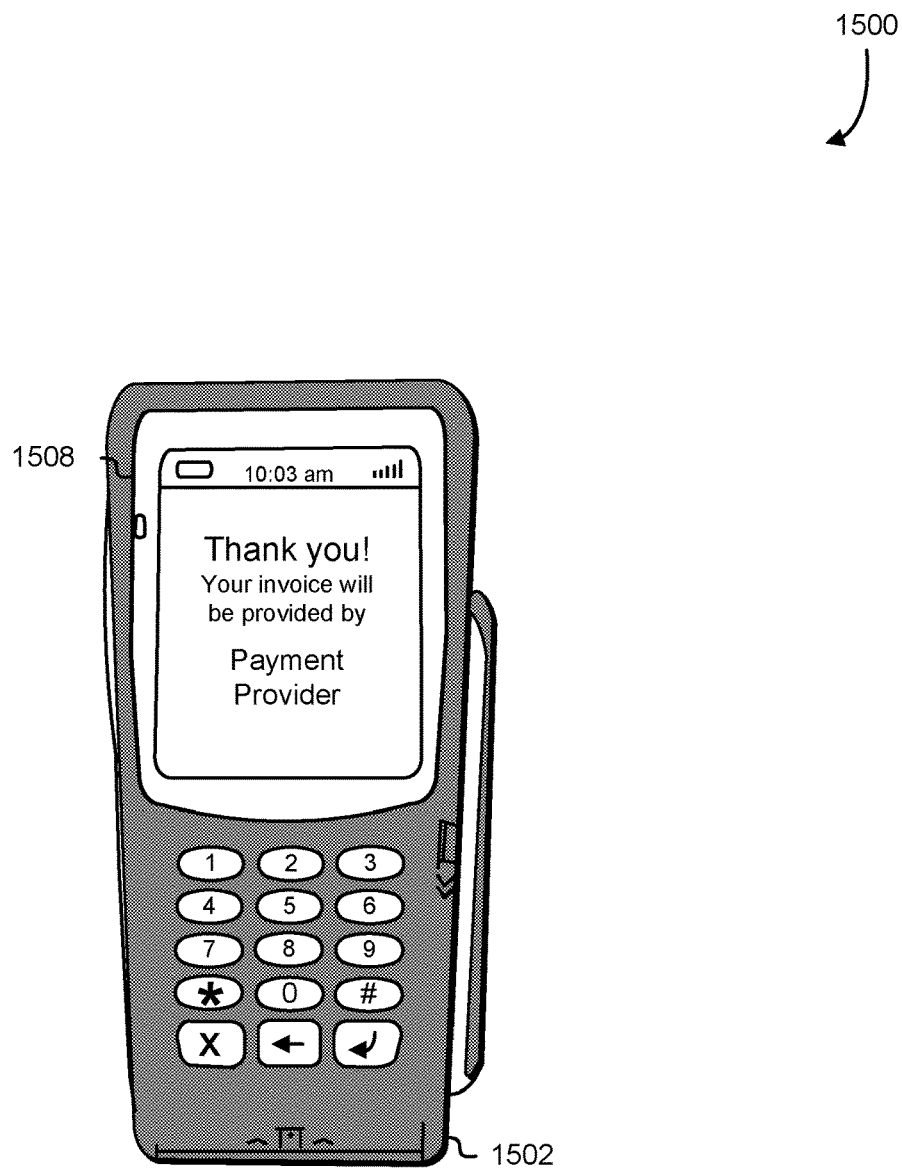
FIG. 15 is a flow chart that illustrates an example of illustrates an example of a final screen of the payment terminal in accordance with an embodiment.

FIGS. 13-15 display screens of devices in the conduct of a transaction in the manner described in the present disclosure. FIGS. 13-15 illustrates an example of conducting a transaction in a physical (e.g., brick-and-mortar) store. Information is provided from a payment terminal 1302 to an online environment (e.g., a browser in a mobile device possessed by a consumer), information about the transaction is confirmed at the online environment, and sent back to the payment terminal 1302 of the physical store. In examples, the term "mobile device" (also known as a handheld computing device) refers to a computing device weighing less than one kilogram, having a processor, memory, a display screen, and hardware operable to accept input from a user. The identity of the consumer may be determined by a record matching service of a type described in the present disclosure.

FIG. 13 illustrates an example of a physical store embodiment 1300 of the present disclosure. In the scenario illustrated in FIG. 13, the consumer is about to pay for a number of items that the consumer has selected for purchase. The consumer may be in a physical store standing at the payment terminal 1302 (also known as a point-of-sale terminal or credit card terminal). The payment terminal 1302 may be a point-of-sale terminal, such as a credit card reader device, computing device, mobile computing device (e.g., a smartphone, Apple iPad, etc.), or could be any of a variety of types of payment terminals. However, in embodiments, the functionality of the payment terminal 1302 is provided by a portal, such as a web-based portal, or a peer-to-peer system. The payment terminal 1302, displayed in FIG. 13, is depicted for illustrative purposes only, and it is contemplated that other payment terminals may have additional or alternative functions from those displayed in FIG. 13. For example, it is contemplated that in some implementations, a payment terminal additionally or alternatively has one or more components of a biometric reader, a global positioning system circuitry, various input devices (e.g., joystick, mouse, barcode reader, digital camera, image scanner, eye gaze tracker, electronic pen, microphone, etc.), contactless card/device reader (e.g., via near field communication (NFC)), radio-frequency identification (RFID) tag reader, or a receipt printer. It is also contemplated that, in embodiments, the user will conduct a transaction online, such as from a personal computing device, mobile device, tablet device, etc.

The payment terminal 1302 may be a special purpose computing device or a computing device similar to the computing device 1900 of FIG. 19. The payment terminal 1302 may have a display 1308 for providing the consumer with information related to the transaction being performed. In some implementations, the display 1308 may be a touch screen, such that the user can interact with screen elements to provide input related to the transaction. The payment terminal 1302 may have a magnetic stripe reader 1310 for reading a magnetic stripe of payment cards (e.g., credit cards, debit cards, etc.) and/or a chip reader 1314 for reading payment cards with EMV chips. The payment terminal 1302 may have a keypad 1312 for allowing the consumer to enter information (e.g., telephone number, personal identification number (PIN) code, etc.). It must be noted that the payment terminal 1302 may be configured to process not only credit cards and debit cards, but also gift cards, cheques, and so on. The payment terminal 1302 may be configured with the network capability to allow payment information to be entered (e.g., via a card), transmit data to a payment provider for authorization, and to transfer funds to the merchant.

As shown in FIG. 13, the payment terminal 1302B is in a first state. At this point in the transaction process, the consumer has already selected the items or services he/she wishes to purchase from the merchant. The merchant may have scanned or otherwise entered in the price for each of the items, and now the payment terminal 1302A may prompt the consumer with an option to utilize the "Pay with Payment Provider" selection. The consumer may select to pay with the payment provider by using the display 1308 as a touch screen (e.g., tapping the pay with payment provider button 1316) or by using the keypad 1312. If the consumer selects to pay with card, the consumer may swipe the card using the magnetic stripe reader 1310 or chip reader 1314 and complete transaction payment in the usual way. However, if the consumer selects to pay with payment provider, the payment terminal 1302 may send details about the transaction to a record matching service, such as the record matching service 314 of FIG. 3 or the record matching service 514 of FIG. 5.

Such details may include the identity or description of the items being transacted, quantity of items, value added tax, merchant identifier for identifying the particular merchant of the transaction, and so on. In some embodiments, the details include information corresponding to the payment terminal 1302, such as geolocation information, Internet protocol address, a device identifier hardcoded to a location (e.g., identifier identifies the device as valid for use in Stockholm), media access control (MAC) address, etc. Based on the details, the record matching service may generate results, which may be used to identify the customer to a degree of confidence, as described in the present disclosure. If the consumer cannot be identified to a sufficient (e.g., above a threshold) degree of certainty, the payment terminal 1302 may prompt the customer to subscribe/register an account with the payment provider. If, at this point, the customer chooses not to register an account with the payment provider, the customer may simply pay using a credit card, debit card, cash, or other payment supported by the merchant.

Then, in response to receiving the selection to pay with payment provider and determining the identity of the consumer with sufficient certainty, the record matching service may cause the payment terminal 1302B to prompt the customer to verify the transaction amount (1337.00 dollars). The display 1308, in some implementations, may display additional information, such as an itemized list of items, quantities, and prices of items in the transaction. The payment terminal 1302A shows the display 1308 in this state. Here, the consumer may be prompted to enter asset information for an asset that can receive electronic information and address corresponding to the asset information (e.g., telephone number to a mobile device, e-mail address of an e-mail inbox, etc.) as further confirmation of the consumer's identity. As can be seen in FIG. 13, the consumer has entered in the telephone number "01234567890" via the keypad 1312.

In various embodiments, additional or alternative information may be requested or permitted, including information such as a unique identification number (e.g., a Social Security number in the United States and Switzerland, the Nigerian National Identification Number in Nigeria, the Population Identification Code in Thailand, etc.), iris/retinal scan, facial recognition data, voice recognition data, or top-of-mind (easily-remembered) information (e.g., address, phone number, postcode, e-mail address). In some implementations, the customer may be allowed to input some or any of the above in a free-form manner, and the system of the present disclosure may determine, based on the format of the data entered, the type of data that was entered. For example, the system may recognize by detecting an "@" character in the data, that the data entered was an e-mail address. Similarly, by counting the number of characters and whether they are numeric or a combination of alphabetical and numeric characters, the system may distinguish phone numbers from postcodes, and so on.

The asset information may then be communicated to the record matching service The record matching service may confirm the telephone number, and proceed to the next screen as shown in the display 1308 of the payment terminal 1302A. In some cases, the record matching service may further determine whether the telephone number corresponds to a pre-paid or post-paid phone number; this determination may also be used as input to the record matching service for confirming the identity of the consumer and/or determining a credit risk score for the consumer. As a next step in the payment process, a message (e.g., such as a hyperlink in an e-mail or text message) may be sent to the device of the consumer that corresponds to the asset information 1306.

It must be noted, that the steps described above may be performed in alternate orders, some steps may be omitted, some steps may be combined with other steps, and/or some additional steps may be present. For example, in some implementations, the record matching service, if it already has a phone number associated with a determined identity for the consumer, may simply send the message to the phone number on record, and the operations associated with 1302B may be omitted. In other implementations, the operations relating to 1302A may be omitted, and the consumer may be prompted to submit asset information at the outset. In some implementations, rather than submitting details to the record matching service after the customer selects to pay with payment provider at the payment terminal 1302A, the details instead are submitted after the consumer confirms payment and/or enters asset information at the payment terminal 1302A.

And still other implementations, the system of the present disclosure does not determine whether the consumer has subscribed or has an account with payment provider until after entering asset information at the payment terminal 1302B. In these implementations, if the consumer does not happen to have an account or subscribe to the payment provider, or if the record matching service has not otherwise determined and identity of the consumer with sufficient confidence, the consumer may be presented with additional options and/or error messages in the display 1308. For example, the consumer may be presented with a screen to input certain information (e.g., username/password, address information, etc.) to confirm their identity, the consumer may be presented with a screen for signing up to subscribe or to obtain an account with payment provider, or the consumer may be presented with an error message that the system was unable to confirm that the consumer subscribes to or has an account with the payment provider.

FIG. 14 illustrates an example of a physical store embodiment 1400 of the present disclosure from a different perspective and from a different stage in the process. In the scenario illustrated in FIG. 14, the consumer has selected to pay with payment provider at a payment terminal, such as the payment terminal described in FIG. 13. As shown, the client device 1402A associated with asset information, such as the asset information 1306 of FIG. 13, has received, in a text message, a secure HyperText Transfer Protocol hyperlink 1404 to open a screen (e.g., via a web browser) for reviewing details and selecting a payment type. The hyperlink 1404 may be a reference, uniquely generated for the consumer based on details of the transaction and/or the consumer's identity, that directs the client device 1402 to display data specific to the current transaction. The text message itself may include header information, such as short message service (SMS) header information (e.g., service center address, protocol data unit type, message reference, originator address, destination address, protocol identifier, data coding scheme, service Center timestamp, validity period, user data links, user data, reply path, user data header indicator, status report indication, status report request, validity period format, whether there are more messages associated with this message, a reject duplicate flag, and/or a message type indicator). The client device 1402 may be a computing device such as the computing device 1900 of FIG. 19.

Selecting the hyperlink 1404 may cause the client device 1402A message to be sent to the system of the present disclosure indicating that the consumer has confirmed receipt of the message, thereby confirming possession of the client device 1402A and the identity of the consumer. In this manner, a layer of security is added to ensure that the individual conducting the transaction corresponds to the individual subscribing to or having an account with the payment provider. It is contemplated that additional layers of security could be added; for example, the consumer may be prompted to enter a password, input biometric data (e.g., via fingerprint reader, retinal scan, etc.), facial recognition data via a camera integrated into the client device 1402, voice data inputs via a microphone for voice analysis, interaction with Google Authenticator, request bank ID, and so on.

Furthermore, selecting the hyperlink 1404 may, in conjunction, cause the system of the present disclosure to provide transaction details to the client device 1402B, thereby causing the screen of the display 1408 of the client device 1402B to be displayed in a manner similar to that shown in FIG. 14. The screen of the client device 1402B may be displayed in a web browser, standalone application, or some other user interface. It must be noted, that items other than hyperlinks may be used to confirm the identity of the consumer to proceed in completing the transaction; for example, rather than a hyperlink, there may be a selectable icon, an executable set of instructions, a uniform resource identifier, a set of manual instructions, or instructions to reply to the message, etc. In some embodiments, the consumer has an application provided by the payment provider installed on the client device 1402, and selecting the hyperlink or other object in the message may causes the payment provider application to be launched for completing the transaction.

The hyperlink 1404 may be unique to the particular transaction. Therefore, as shown in the display 1408 of the client device 1402B, the consumer may view order details 1406 about the transaction, identifying details 1408 associated with the consumer, payment options 1410, and a button 1412 to complete the transaction. It must also be noted that transactions other than purchase transactions may be conducted in a similar manner. For example, credits for returns, sales (e.g., rather than a consumer, the owner of the client device 1402 may be the seller, etc.), and so on.

The order details 1406 may include details about the order, such as a list of items being ordered, quantities, prices, colors, sizes, currency type, and so on. In some implementations, the consumer may have an option to hide the order details. The identifying details 1408 may include items such as the consumer's name, address, e-mail address, phone number, etc. Some information may be redacted (e.g., by "*" characters) for security purposes. Visual icons may be present, and in some implementations the consumer may be given an option ("Change address or phone number") to update some or all of the information in the identifying details 1408. Note too, that a "Not you?" hyperlink or other such input elements may allow the consumer to report an identity mismatch should the identifying details 1408 not match the consumer's actual details.

The payment options 1410 may be a variety of payment options, including any of the payment options discussed in the present disclosure. As shown in the display 1408, the consumer may select to complete the transaction by paying via invoice, payment provider account, or pay at end of the month. A total amount for the transaction may appear in the display 1408, and to complete the purchase, the consumer may tap or click a button or some other control to cause the client device 1402B to send confirmation of the payment selection to the payment provider system and/or payment terminal. An advantage presented by the embodiments of FIGS. 13-18, is that the consumer need not reveal to the merchant the financing method that the consumer is selecting for the transaction. That is, the consumer may privately choose the method in which to pay, as such information may only be displayed on the client device 1402, thereby avoiding potential social embarrassment based on a merchant's assumption of the consumer's ability to pay. Another advantage presented by the system of the present disclosure is that the consumer need not be constrained to only using payment/financing methods supported by the merchant; that is, transparent to the merchant, the payment provider may offer a plethora of financing options and/or credit cards to the consumer in the payment options 1410 of FIG. 14. Furthermore, the payment options 1410 may be customized based on the consumer and the transaction details; that is, different payment options may be presented to the consumer for a total transaction amount that falls within a first range than in transaction amount that falls within a different range. Additionally or alternatively, different payment options may be presented to a first consumer than to a second consumer, based on different risks of default between the consumers computed by the system. For example, a consumer with a computed credit risk score above a certain threshold may see payment options such as "Pay with debit card" or "Cash only," whereas a consumer with a computed credit risk score below another threshold may be presented with "Bill me later" or "Bill me in five monthly installments." Likewise, payment options presented may be limited to the payment options that the consumer has specified in their preferences for their account with the payment provider.

It must be noted that embodiment depicted in FIGS. 13-17 may be utilized in combination with any other embodiments of the present disclosure. For example, the options shown in the display 1408 of the client device 1402B may reflect options of the user interfaces described in conjunction with FIGS. 8-9.

As noted in embodiments, the user conducts the transaction online, such as from a personal computing device, mobile device, tablet device, etc. In such embodiments, the payment terminal and the client device 1402 could be the same device. For example, the consumer may be making an online purchase through a personal computer, receive the hyperlink 1404 in an e-mail inbox accessible through an e-mail reader on the same personal computer, and launch the payment option screen of 1402B in a browser also on the same personal computer. The screens for initiating payment, as shown in FIG. 15, may be shown on the client device 1402 (e.g., such as through a browser, application, etc.); and selecting to pay with payment provider may, as shown, send a message to an address to a destination (e.g., text message address, e-mail inbox, voice message to the client device 1402, etc.) determined to be under control of the consumer.

In such embodiments, the consumer can switch between application screens to complete the transaction.

FIG. 15 illustrates a final example of a physical store embodiment 1500 of the present disclosure. Specifically, FIG. 15 depicts a screen of display 1508 of a payment terminal 1502, such as the payment terminal 1302 of FIG. 13, at a final stage of the transaction. That is, after the consumer completes the purchase in FIG. 14, the information may be transmitted to the system of the payment provider. The payment provider system may then transmit to the payment terminal 1302 a notification that payment has been successful and the transaction is concluded. The payment terminal 1502 may then update its interface to display a screen similar to the screen shown in FIG. 15, indicating that the transaction has been successfully completed. In embodiments, the system depicted in FIGS. 13-15 is a peer-to-peer system.

Figure 16:
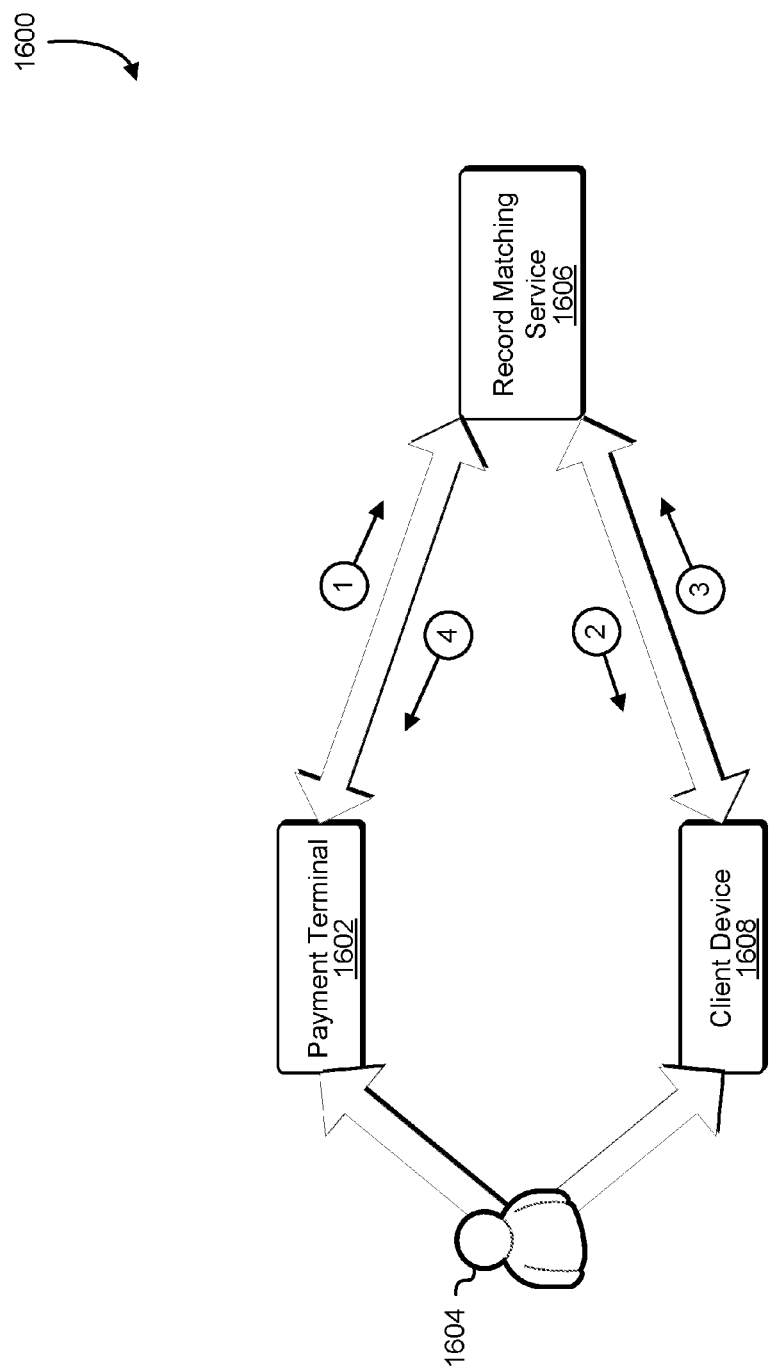
FIG. 16 is a diagram showing the flow of a physical store transaction accordance with an embodiment.

FIG. 16 illustrates an aspect of an environment 1600 in which an embodiment may be practiced. As illustrated in FIG. 16, the environment 1600 may include a consumer 1604 interacting with a payment terminal 1602 in communication with a record matching service 1606, which itself is able to communicate with a client device 1608 of the consumer 1604. The payment terminal 1602 may be a computing device similar to the payment terminal 1302 of FIG. 13. For example, it may be a point-of-sale terminal with the ability to read credit cards, debit cards, gift cards, and so on. As noted, the payment terminal 1602 in some implementations may be a personal computing device, such as a desktop computer or laptop, or a mobile device such as a smartphone.

The consumer 1604 may be an individual attempting to purchase an item or service from a merchant corresponding to the payment terminal 1602. The client device 1608 may be a computing device similar to the client device 1402 of FIG. 14. For example, it may be an Apple iPhone, a tablet computer, a desktop computer, a laptop computer, smartphone, or some other computing device. In some implementations, the functionality described for the payment terminal 1602 and the client device 1608 may be performed by different software applications executing on the same device; for example, the consumer may be making a purchase through an online website of the merchant, which supplies at least some of the functionality of the payment terminal 1602, via a computing device and receive messages at an e-mail inbox accessible by an e-mail reader application via the same computing device.

The record matching service 1606 may be a service similar to the record matching services 114, 314, and 514 of FIGS. 1, 3, and 5 respectively. The payment terminal 1602 may provide details corresponding to the transaction to the record matching service 1606 in a similar manner to the manner in which the details 516 are provided to the record matching service 514 of FIG. 5.

In a first implementation, the consumer 1604 may select, via the payment terminal 1602, to make a payment via a payment provider. Thus, in step 1, details corresponding to the transaction may be provided to the record matching service 1606. The record matching service 1606 may pass at least some of the details through a supervised model as described in the present disclosure (e.g., see FIG. 5) to determine an identity of the consumer 1604. In some embodiments, the details corresponding to the transaction include asset information corresponding to the client device 1608. In other embodiments, the record matching service 1606 directs the payment terminal 1602 to prompt the consumer 1604 for the asset information corresponding to the client device 1608 or other information usable by the record matching service 1606 to confirm the identity of the consumer 1604 and/or identify the client device 1608 to which a message is to be sent in step 2.

Thus, in step 2, the record matching service 1606 may cause a message to be sent to the client device 1608. The message may include a hyperlink, data object, or other object generated to specifically correspond to the current transaction. The consumer 1604 may confirm receipt of the message at the client device in acceptance of a method of payment for the transaction. In confirmation of receipt of the message, the client device 1608 may launch a software application of the payment provider that is installed on the client device 1608 or may launch a browser to display a webpage for completing the transaction. In either case, this may cause additional data to be sent to the record matching service 1606 that includes information such as MAC address, geolocation data, data recorded from an integrated image capture device or microphone, or such data as may be found in an HTTP header (e.g., user agent, Internet protocol address, operating system of the client device 1608, etc.), which may be additionally used to confirm a location of the transaction and/or the consumer 1604. The record matching service 1606 may send data corresponding to the transaction and corresponding to a set of payment options similar to the data displayed on the display 1408 of the client device 1402B of FIG. 14.

The client 1604 may confirm the purchase and the payment option via the client device 1608, thereby causing, in step 3, the confirmation to be sent to the record matching service 1606. The record matching service 1606 may send a notice to the payment terminal 1602 and/or the consumer 1604 via the client device 1608 of successful completion of the transaction in step 4, and the record matching service 1606 may initiate the workflow for paying the merchant that corresponds to the payment terminal 1602.

In a second implementation, the client device 1608 may be compliant with NFC protocol, and the consumer 1604 may initiate payment with the payment provider by bringing the client device 1608 near enough to the payment terminal 1602 that the payment terminal 1602 detects that the client device 1608 is in close proximity (e.g., within four centimeters). The payment terminal 1602 may, in step 1, send details corresponding to the transaction to the record matching service 1606. Furthermore, the asset information of the client device 1608 may be automatically detected from the near field communications and sent to the record matching service 1606 by the payment terminal 1602 simultaneously or asynchronously with the details. Alternatively, the client device 1606 may itself dynamically send the asset information to the record matching service 1606 in parallel with the payment terminal 1602's sending of the details to the record matching service 1606, which may be then matched up at the record matching service 1606. In some of these implementations, the asset information may be sent to the record matching service 1606 by a payment provider application executing on the client device 1608 that is triggered by the near field communication. The asset information may be sent in a message that is digitally signed with a cryptographic key held by the client device 1608, such as a private key of a public-private key pair, of which the record matching service may have a corresponding public key usable to verify the authenticity of the message.

In some implementations, if the consumer 1604 selects to pay with provider, the payment terminal 1602 may switch to a state of waiting for approval from the client device 1608; the approval provided by the consumer 1604 bringing the client device 1608 in close enough proximity (e.g., within four centimeters) to trigger the near field communication. Additionally, in some of these implementations, a payment option may have been preselected by the consumer 1604, and in such implementations the transaction may be successfully completed without further interaction by the consumer 1604.

Figure 17:
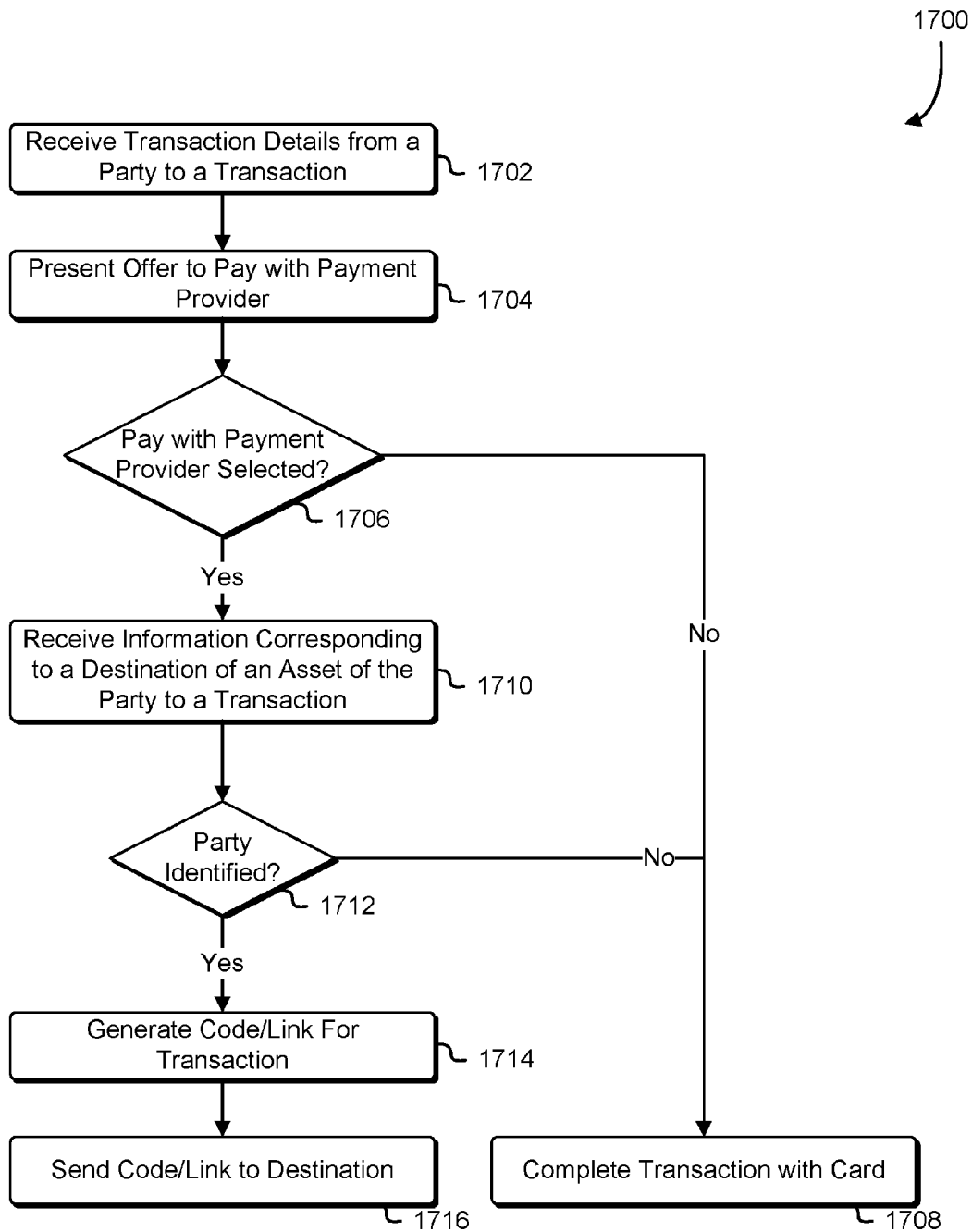
FIG. 17 is a flow chart that illustrates an example of determining an identity of the consumer and providing customized payment options in accordance with an embodiment.

FIG. 17 is a flowchart illustrating an example of a process 1700 for utilizing the supervise model of the present disclosure to identify a party to a transaction in accordance with various embodiments. The process 1700 may describe the process depicted in FIG. 13. Some or all of the process 1700 (or any other processes described, or variations and/or combinations of those processes) may be performed under the control of one or more computer systems configured with executable instructions and/or other data, and may be implemented as executable instructions executing collectively on one or more processors. The system performing the process 1700 may be a system of the payment provider described in conjunction with FIGS. 13-15. The executable instructions and/or other data may be stored on a non-transitory computer-readable storage medium (e.g., a computer program persistently stored on magnetic, optical, or flash media).

For example, some or all of process 1700 may be performed by any suitable system, such as a server in a data center, by various components of the environment 1900 described in conjunction with FIG. 19, such as the web server 1906 or the application server 1908, by multiple computing devices in a distributed system of a computing resource service provider, or by any electronic client device such as the electronic client device 1902. The process 1700 includes a series of operations wherein details from a transaction between a first party and a second party is received, asset information is obtained, the first party selects to pay via a payment provider, and a reference that is usable to cause data specific to the transaction to be displayed at a client device of the first party is generated and sent to an asset associated with the asset information.

In 1702, details related to a transaction between two parties is received by the system performing the process 1700. For example, a first party may be buying goods or services from a second party, and the details may include information such as an identity and description of the goods or services being purchased, quantity being purchased, cost of each good or service being purchased, other information about the goods or services being purchased (e.g., size, color, model, brand, taste, etc.), identity of the seller, geolocation data of the first party and/or the second party, Internet protocol address of a computing device involved in the transaction, the current time of day, and so on. Although the examples shown in FIGS. 13-16 involve a buyer completing a transaction with a seller, it is contemplated that the roles could be reversed; that the transaction could be a seller completing a transaction with a buyer.

In 1704, the system performing the process 1700 may present the first party with an option to complete the transaction using a method supported by the second party (e.g., by swiping a credit card, etc.) or to proceed to select from a set of payment options provided by the system. In 1706, if the first party chooses not to select from a set of payment options provided by the system, the system may proceed to 1708. In 1708, the system may complete the transaction using a method of payment supported by the second party. Otherwise, if the first party elects to select from the set of payment options, the system may proceed to 1710.

In 1710, information corresponding to an asset associated with the first party is obtained. As noted, the information may be a telephone number, an e-mail address, a social media account identity, a device identifier for the asset, or some other such information usable to direct communications to an asset (e.g., mobile telephone, e-mail inbox, social media account, application installed to a computing device of the first party, etc.) presumed to be under the control of the first party. As noted above in the description of the payment terminal 1302B, the transaction details of 1702 and the information corresponding to the asset of 1710 may be included together.

In 1712, the system performing the process 1700 may utilize the supervised model of the present disclosure to determine an identity of the first party. If the identity of the first party could not be determined with sufficient confidence (e.g., a generated confidence score not meeting or exceeding a threshold confidence score), the system performing the process 1700 may proceed to 1708. Otherwise, if the identity of the first party is determined with sufficient confidence (e.g., a generated confidence score meeting or exceeding a threshold confidence score), the system performing the process 1700 may proceed to 1714. Note that, additionally or alternatively, the system may determine whether the first party has an account with the system. In some embodiments, if it is determined that the first party, whether identified or unidentified, does not have an account with the system, the system proceeds instead to 1708 to complete the transaction using a method supported by the second party. Additionally or alternatively, in other embodiments if it is determined that the first party does not have an account with the system, the system prompts the first party to subscribe/register an account with the system. If the first party chooses to subscribe/register with the system, the system may request information from the first party, create an account for the first party, and proceed to 1714. However, if the first party declines to set up an account, the system may instead proceed to 1708.

In 1714, the system may generate reference data specific to the transaction that is usable by a computing device to cause the system to provide details corresponding to the transaction and/or the set of payment options to the computing device. For example, the system may generate a hyperlink, such as the hyperlink shown in 1404 of FIG. 14. In 1716, the system performing the process 1700 may present the generated reference data to the asset corresponding to the asset information; e.g., the system may send, to a messaging application of a mobile device associated with asset information (e.g., the telephone number provided as the asset information 1306 of FIG. 13) provided by the first party, the generated hyperlink. Note that one or more of the operations performed in 1702-16 may be performed in various orders and combinations, including in parallel.

Figure 18:
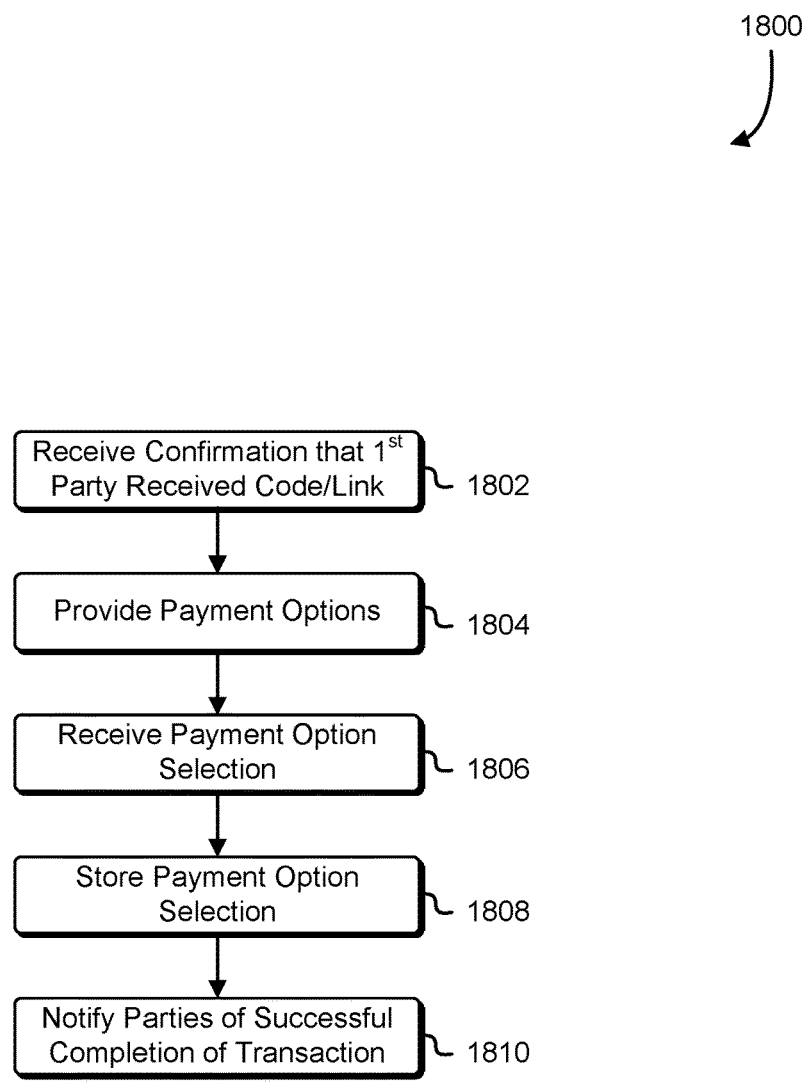
FIG. 18 is a flow chart that illustrates an example of concluding a transaction in accordance with an embodiment.

FIG. 18 is a block diagram illustrating an example of a process 1800 for performed by a system of a payment provider in response to confirmation that the first party received the reference data sent to an asset in 1716 of FIG. 17 in accordance with various embodiments. Some or all of the process 1800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 1800 may be performed by any suitable system, such as a server in a data center, by various components of the environment 1900 described in conjunction with FIG. 19, such as the web server 1906 or the application server 1908, by multiple computing devices in a distributed system of a computing resource service provider, or by any electronic client device such as the electronic client device 1902. The process 1800 includes a series of operations wherein confirmation is received, payment options are provided for selection, a payment option selection is received, information related to the workflow for the payment option is stored, and the parties are notified that the transaction has been successfully completed.

In 1802, the system performing the process 1800 to receive confirmation that the first party received the reference data sent in 1716 of FIG. 17. For example, a buyer may have received the hyperlink 1414 shown in FIG. 14, and tapped or clicked the hyperlink. As a result of tapping or clicking the hyperlink, the client device 1402 would have transmitted information pertaining to this event to the system, thereby confirming to the system that the buyer received the hyperlink and is in possession of the asset (here being the client device 1402).

In 1804, based on the identity of the first party, as may be determined in 1706 of FIG. 17, and/or details of the transaction, as may be obtained in 1702, the system may generate a set of options for paying/financing the present transaction. For example, if the first party is identified as having a high risk of default, less generous payment options may be presented (e.g., cash on delivery, debit from bank account, extend credit with a higher interest rate than more generous credit, etc.). On the other hand, if the first party is identified as having a low risk of default, more generous payment options may be presented (e.g., zero percent down for the first three months, payment installments, bill later, extend credit with a lower interest rate than less generous credit, etc.). The system may provide the generated options to a client device for selection by the first party, such as shown in the display 1408 of the client device 1402B of FIG. 14.

In 1806, the system performing the process 1800 may receive a selection by the first party of an option from the set of options provided in 1804. In 1808, the system may perform whatever workflow is necessary to initiate the particular financing/payment option selected, which may include storing the payment option selection and details associated with the transaction in a database of the payment provider. In 1810, upon successfully initiating the particular financing/payment option, the system performing the process 1800 may notify the parties that the transaction was successfully completed, such as by sending such notification (e.g., via text message, e-mail, or some other method) to a device of either or both the first party and the second party to the transaction (e.g., the payment terminal 1502 of FIG. 15, the client device 1402, etc.). Note that one or more of the operations performed in 1802-10 may be performed in various orders and combinations, including in parallel.

Embodiments of the disclosure can be described in view of the following clauses:

1. A computer-implemented method, comprising:
   receiving an electronic request to determine a user identity, the electronic request including a set of values for a corresponding set of fields;
   transforming the set of values into a set of search terms;
   computing a set of inverse document frequencies for the set of search terms based at least in part on a number of records in a data set of historical records;
   determining a set of historical records matching at least one term in the set of terms;
   for each historical record in the set of matching historical records, computing a set of search term results, each search term result in the set of search term results at least indicating whether:
      a search term corresponding to the search term result matches a corresponding field value in the set of matching historical records;
      the search term corresponds to an empty value in the set of values; or
      the search term is a mismatch to the corresponding field value; and
   filtering, based at least in part on the set of inverse document frequencies and the set of search term results, the set of historical records to obtain a subset of the set of historical records;
   passing inverse document frequencies of the subset of the set of historical records through a random forest to obtain a set of confidence scores, each confidence score in the set of confidence scores corresponding to a historical record of the subset of the set of historical records;
   determining a user identity associated with a historical record based at least in part on the set of confidence scores; and
   providing the user identity in response to the electronic request.

2. The computer-implemented method of clause 1, wherein:
   the user identity is of a set of user identities provided with a set of corresponding confidence scores in response to the electronic request; and
   the user identity is determined based at least in part on a cutoff value, wherein the cutoff value indicates a minimum confidence score required for the determination.

3. The computer-implemented method of clause 1 or 2, further comprising providing content based at least in part on a confidence score associated with the user identity.

4. The computer-implemented method of clause 1 to 3, wherein:
   the random forest has been trained from a data set with at least one field for a ground truth value that identifies an individual as a result of being unambiguously associated with the individual; and
   the set of values does not include a ground truth value for the user identity.

5. A system, comprising:
   one or more processors; and
   memory including instructions that, when executed by the one or more processors, cause the system to:
      receive an electronic request to determine, based at least in part on a set of details, an identity of a user;
      determine a set of frequencies for the set of details;
      obtain a set of records based at least in part on the set of details;
      obtain a set of scores for at least a subset of the set of records, the set of scores obtained by, for each record in the set of records, causing the system to:
         traverse a plurality of decision trees, the plurality of decision trees configured to result in a plurality of votes based at least in part on one or more frequencies in the set of frequencies that are associated with the record; and
generate the score based at least in part on a count of the plurality of votes of the plurality of decision trees; and
determine the identity based at least in part on the set of scores.
6. The system of clause 5, wherein the one or more frequencies include one or more inverse document frequencies corresponding to how uncommon it is that details in the set of details are found in a particular data set.
7. The system of clause 5 or 6, wherein for each frequency in the set of frequencies, determine the frequency based at least in part on a function of:
a total number of records in a data set that includes the set of records; and
a number of records found in which a search term occurs in a particular field, the search term generated at least in part from the set of details.
8. The system of clause 7, wherein the function is a logarithmic function.
9. The system of any of clauses 5 to 8, wherein the plurality of decision trees is a decision tree in a random forest of decision trees.
10. The system of clause 9, wherein a training data set for the random forest has values for a plurality of fields, wherein at least one field of the plurality of fields is a source of ground truth for an identity of an individual.
11. The system of any of clauses 5 to 10, wherein the instructions further include instructions that cause the system to:
calculate a rank for each record in the set of records based at least in part on a one or more frequency values associated with field values in the record; and
select the at least a subset of the set of records based at least in part on the calculated rank of each record in the set of records.
12. The system of clause 11, wherein the instructions that cause the system to calculate a rank, include instructions that cause the system to:
increase the rank of a record if a search term based at least in part on the set of details is found in a particular field of the record; and
decrease the rank of the record if the search term is not found in the particular field.
13. The system of clause 11, wherein the at least a subset of the set of records is a predetermined number of records having higher calculated ranks than other records in the set of records.
14. A non-transitory computer-readable storage medium having stored thereon executable instructions that, when executed by one or more processors of a computer system, cause the computer system to at least:
receive information consequent to communication between a user and the computer system;
perform one or more queries based at least in part on the information;
compute a set of frequency values for results of the one or more queries;
determine at least one confidence score for the one or more queries based at least in part on an outcome of evaluating the set of frequency values against sets of decision rules; and
based at least in part on the at least one confidence score, output at least one user identity associated with the at least one confidence score.
15. The non-transitory computer-readable storage medium of clause 14, wherein the instructions that cause the computer system to perform the one or more queries include instructions that cause the computer system to:
transform the information into a set of normalized search terms; and
obtain a set of records based at least in part on the set of normalized search terms, wherein individual records in the set of records include at least one field value that matches a search term from the set of normalized search terms.
16. The non-transitory computer-readable storage medium of clause 14 or 15, wherein the one or more queries includes one or more of a query for a match of a predetermined number of first characters in a particular data field or a match of a concatenation of values from at least two particular search fields.
17. The non-transitory computer-readable storage medium of any of clauses 14 to 16, wherein the one or more queries are performed on a set of records, wherein the set of records are indexed by one or more of e-mail address, phone number, given name, family name, combination of given name and family name, address, and postcode.
18. The non-transitory computer-readable storage medium of any of clauses 14 to 17, wherein individual frequency values in the set of frequency values indicate how common corresponding queries are matched to values in fields of in a particular data set.
19. The non-transitory computer-readable storage medium of any of clauses 14 to 18, wherein the sets of decision rules correspond to decision trees in a random forest that has been generated based at least in part on a data set associated with a population of individuals.
20. The non-transitory computer-readable storage medium of clause 19, wherein the data set associated with the population of individuals has a field corresponding to a ground truth value for a user identity and the one or more queries are performed on a data set that lacks ground truth data.
21. A computer-implemented method, comprising:
receiving a set of field values corresponding to a transaction;
determining, based at least in part on the set of field values, identifying information about a user associated with the transaction;
obtaining previous transaction information relating to at least one previous transaction to which the user was a party;
computing, based at least in part on the identifying information and the previous transaction information, a user characteristic associated with the user;
generating a set of inputs based at least in part on the identifying information and the previous transaction information;
obtaining a set of payment types for an automated payment system, each payment type in the set corresponding to a workflow for completion of the transaction by the automated payment system;
computing a score for each payment type in the set of payment types by passing the set of inputs through a random forest, thereby obtaining a set of scores for the set of payment types, the random forest is trained from a data set comprising records that include at least one field for a ground truth value that corresponds to a payment type from the set of payment types;

selecting, a user interface based at least in part on the set of payment types, the set of scores, and the user characteristic; and providing the user interface to the user such that a selection from user interface by the user causes the one or more computer systems to perform the workflow corresponding to the payment type associated with the selection.

22. The computer-implemented method of clause 21, wherein the user characteristic is a risk score indicating a risk of payment default by the user.

23. The computer-implemented method of clause 21 or 22, further comprising providing content based at least in part on the user characteristic to the user via the user interface.

24. The computer-implemented method of clause 21 to 23, wherein determining identifying information about the user includes determining an identity of the user based at least in part on passing frequency values through a random forest trained from a data set with at least one field for a ground truth value that identifies an individual, wherein the frequency values are associated with frequencies of occurrence of field values in the set of field values within a set of historical records.

25. A system, comprising:
one or more processors; and
memory including instructions that, when executed by the one or more processors, cause the system to:
receive an electronic request to predict a preferred payment type for a user, the electronic request including a set of values associated with an uncompleted transaction;
obtain information relating to at least one previous transaction to which the user was a party based at least in part on the set of values;
obtain a set of payment types, each payment type in the set corresponding to a different computer-implemented process for completing the uncompleted transaction;
compute a score, based at least in part on the information and the set of values, for each payment type in the set of payment types to obtain a set of scores;
determine the preferred payment type from the set of payment types based at least in part on the set of scores; and
provide an interface that presents the preferred payment type to the user and enables the user to complete the uncompleted transaction according to a computer-implemented process corresponding to the preferred payment type.

26. The system of clause 25, wherein the instructions that cause the system to compute the score, include instructions that cause the system to transform the set of values and the information into values for a set of variables, wherein the set of variables include one or more variables for:
indicating whether a name of the user is found within an e-mail address of the user,
a category for products or services being transacted,
a time of day of the transaction,
a total cost of the transaction,
a total amount of debt by the user, or
a quantity of different products being purchased in the transaction.

27. The system of clause 25 or 26, wherein the instructions that cause the system to obtain the information relating to the at least one previous transaction, further include instructions that cause the system to:
determine an identity of the user by passing a set of inputs through a random forest trained on a data set associated with a population of individuals, the set of inputs based at least in part on the set of values; and
obtaining the information relating to the at least one previous transaction at least in part from a set of historical records associated with the identity.

28. The system of any of clauses 25 to 27, wherein the instructions further include instructions that cause the system to:
compute a risk value associated with the user based at least in part on the set of values; and
the instructions that determine the preferred payment type include instructions that determine the preferred payment type further based at least in part on the risk value.

29. The system of any of clauses 25 to 28, wherein the instructions that compute a score include instructions that cause the system to evaluate a plurality of decision trees configured to arrive at a decision whether a particular payment type will be preferred by the user based at least in part on the information and set of values.

30. The system of clause 29, wherein the plurality of decision trees are decision trees in a random forest.

31. The system of clause 30, wherein a training data set for the random forest has values for a plurality of fields, wherein at least one of the plurality of fields is a source of ground truth for a payment type.

32. The system of any of clauses 30 or 31, wherein the score is a count of votes of the decision trees in the random forest.

33. A non-transitory computer-readable storage medium having stored thereon executable instructions that, when executed by one or more processors of a computer system, cause the computer system to at least:
receive information corresponding to a prospective transaction by a user;
compute a characteristic value for the user based at least in part on the information;
generate a score for at least one payment type based at least in part on the information and historical data about previous transactions, the at least one payment type corresponding to at least one computer-executed workflow for finalizing the prospective transaction;
determine, based at least in part on the score and the characteristic value, an interface to display to the user, the interface including functionality that enables the user to initiate execution of the at least one computer-executed workflow; and
provide the interface to the user.

34. The non-transitory computer-readable storage medium of clause 33, wherein the characteristic value is a value reflecting a risk that the user will default on payment for the prospective transaction.

35. The non-transitory computer-readable storage medium of clause 33 or 34, wherein the historical data about previous transactions is obtained by:
determining an identity associated with the user based at least in part on at least one confidence score computed by evaluating, through one or more sets of decision rules, one or more frequency values associated with the information; and
obtaining a set of historical records associated with the identity.

36. The non-transitory computer-readable storage medium of any of clauses 33 to 35, wherein:
the interface is a web interface for finalizing the transaction at checkout;
the web interface includes a graphical control for confirming the at least one payment type; and
upon confirmation of the at least one payment type by the user via the graphical control, the web interface causes execution of the at least one computer-executed workflow to be initiated.

37. The non-transitory computer-readable storage medium of any of clauses 33 to 36, wherein the instructions that cause the computer system to generate the score for the at least one payment type based at least in part on the historical data include instructions that cause the computer system to:
transform the historical data into values for a set of variables and generate the score based at least in part on the values for the set of variables, wherein the set of variables include one or more variables for:
a date of a most recent purchase by the user,
a total cost of the most recent purchase by the user,
a deviation of a cost of the transaction from costs of previous transactions by the user,
a payment method used in the most recent purchase by the user, or
a number of purchases made by the user using the at least one payment type within a predetermined time period prior to the transaction.

38. The non-transitory computer-readable storage medium of any of clauses 33 to 37, wherein:
the user is a first user; and
the historical data is obtained from one or more historical records associated with a second user, wherein the second user is determined to be the first user based at least in part on a confidence score exceeding a minimum confidence score.

39. The non-transitory computer-readable storage medium of any of clauses 33 to 38, wherein the instructions that generate the score for the at least one payment type include instructions that cause the computer system to:
determine values for a set of input variables based on the information and the historical data;
for each payment type of the at least one payment type, cast one or more votes for the payment type based at least in part on an evaluation of the values of the set of input variables; and
generate the score based at least in part on a count of votes for the at least one payment type.

40. The non-transitory computer-readable storage medium of clause 39, wherein the evaluation of the values is performed by traversing decision trees of a random forest.

41. A computer-implemented method, comprising:
under the control of one or more computer systems that execute instructions,
receiving, from a credit card terminal:
details associated with a transaction between a first party and a second party; and
asset information that operates as an address for directing communications to a destination that is accessible via a handheld device of the first party;
providing at least the details as input to a supervised model;
receiving a result from the supervised model, the result including an indication of an identity of the first party;
generating a reference that is specific to the transaction;
transmitting, at least in part by using the asset information, the reference to the handheld device;
in response to receiving a selection of the reference from the handheld device:
determining, based at least in part on the details, a set of payment options; and
providing, to the handheld device, data that is specific to the transaction, the data including the set of payment options;
receiving, from the handheld device, a selection of a payment option from the set of payment options; and
providing, to the second party, information that indicates completion of the transaction.

42. The computer-implemented method of clause 41, wherein determining the set of payment options includes:
computing, based at least in part on the details and a transaction history associated with the identity of the first party, a risk value; and
selecting a payment option for the set of payment options based at least in part on the risk value.

43. The computer-implemented method of clause 41 or 42, wherein the details include a description of a good or service being transacted, a quantity of the good or service being transacted, and a price of the good or service being transacted.

44. The computer-implemented method of any of clauses 41 to 43, wherein the details includes geolocation information corresponding to a geographic location of the credit card terminal.

45. A system, comprising:
a payment terminal comprising first one or more processors and first memory including first executable instructions that, as a result of execution by the first one or more processors, cause the payment terminal to:
provide, to a backend order matching service:
details associated with a transaction between a first party and a second party; and
an address for directing communications to an asset of the first party; and
receive from the backend order matching service an indication that the transaction has been successfully completed; and
the backend order matching service comprising second one or more processors and second memory including second executable instructions that, as a result of execution by the second one or more processors, cause the backend order matching service to:
receive, from the payment terminal, the details and the address;
determine an identity of the first party;
provide, via the address of the asset, data generated to correspond to the transaction;
receive, from the first party, confirmation of receipt of the data;
provide, to the first party, a set of payment options;
receive, from the first party, a selection of a payment option; and
provide, to the payment terminal, the indication that the transaction has been successfully completed.

46. The system of clause 45, wherein the address of the asset is one of:
a telephone number,
an e-mail address,
a device identifier for the asset, or
a social media account identity.

47. The system of clause 45 or 46, wherein the asset is one of:
a telephone,
an e-mail inbox,
a software application installed to a computing device, or
a social media account.
48. The system of any of clauses 45 to 47, wherein the second executable instructions further include instructions that cause the backend order matching service to, as a result of receiving the selection of the payment option, initiate a workflow that, upon completion, results in a completion of payment to the second party to the transaction.
49. The system of any of clauses 45 to 48, wherein the second instructions that cause the backend order matching service to determine the identity include instructions that cause the backend order matching service to determine the identity as a result of passing a set of inputs, derived at least in part from the details, through one of:
a random forest,
a set of naïve Bayes classifiers,
a linear set of decision rules, or
a multinomial logistic regression.
50. The system of any of clauses 45 to 49, wherein:
the first party is a consumer;
the second party is a merchant; and
the transaction is a transaction for the consumer to buy one or more goods or services from the merchant.
51. The system of any of clauses 45 to 50, wherein:
the payment terminal is accessible via a website of the second party; and
the transaction is an online transaction being conducted at least in part, via the website, by the first party using a computing device of the first party.
52. The system of clause 51, wherein the asset is accessible to the first party via the computing device.
53. A set of non-transitory computer-readable storage media having stored thereon executable instructions that, as a result of execution by one or more processors of a computer system, cause the computer system to at least:
receive, from a first computing device, details associated with a transaction;
determine an identity of a party to the transaction;
obtain an address to which communications to the party can be directed and accessed via a second computing device, the second computing device being associated with the party;
generate confirmation data specific to the transaction;
provide, via the address, the confirmation data to the second computing device;
receive, from the party, confirmation of receipt of the confirmation data;
provide, to the party, a set of payment options;
receive, from the party, a selection of a payment option; and
provide, to the first computing device, notice that the transaction has been completed.
54. The non-transitory computer-readable storage medium of clause 53, wherein the first computing device is a point-of-sale terminal.
55. The non-transitory computer-readable storage medium of clause 53 or 54, wherein the second computing device is a handheld computing device.
56. The non-transitory computer-readable storage medium of any of clauses 53 to 55, wherein the confirmation data is a hyperlink usable for confirmation that the party has access to the second computing device.
57. The non-transitory computer-readable storage medium of any of clauses 53 to 56, wherein each payment option in the set of payment options corresponds to a different computer-implemented process for completing the transaction.
58. The non-transitory computer-readable storage medium of any of clauses 53 to 57, wherein the executable instructions that cause the computer system to determine the identity of the party include executable instructions that cause the computer system to:
obtain results of one or more queries performed based at least in part on the details;
compute a set of frequency values based at least in part on the results;
determine a confidence score based at least in part on evaluating the set of frequency values against a set of decision rules; and
determine the identity of the party based at least in part on the confidence score reaching a value relative to a threshold confidence value.
59. The non-transitory computer-readable storage medium of clause 58, wherein the sets of decision rules correspond to decision trees in a random forest.
60. The non-transitory computer-readable storage medium of clause 59, wherein the random forest is trained on a data set having at least one field for a ground truth value that identifies an individual.

FIG. 19 is an illustrative, simplified block diagram of an example computing device 1900 that may be used to practice at least one embodiment of the present disclosure. In various embodiments, the computing device 1900 may be used to implement any of the systems illustrated herein and described above. For example, the computing device 1900 may be configured for use as a data server, a web server, a portable computing device, a personal computer, or any electronic computing device. As shown in FIG. 19, the computing device 1900 may include one or more processors 1902 that may be configured to communicate with, and are operatively coupled to, a number of peripheral subsystems via a bus subsystem 1904. The processors 1902 may be utilized for the traversal of decision trees in random forest of supervised models in embodiments of the present disclosure (e.g., cause the evaluation of inverse document frequencies of various search terms, etc.). These peripheral subsystems may include a storage subsystem 1906, comprising a memory subsystem 1908 and a file storage subsystem 1910, one or more user interface input devices 1912, one or more user interface output devices 1914, and a network interface subsystem 1916. Such storage subsystem 1906 may be used for temporary or long-term storage of information such as details associated with transactions described in the present disclosure, databases of historical records described in the present disclosure, and storage of decision rules of the supervised models in the present disclosure).

The bus subsystem 1904 may provide a mechanism for enabling the various components and subsystems of computing device 1900 to communicate with each other as intended. Although the bus subsystem 1904 is shown schematically as a single bus, alternative embodiments of the bus subsystem may utilize multiple busses. The network interface subsystem 1916 may provide an interface to other computing devices and networks. The network interface subsystem 1916 may serve as an interface for receiving data from, and transmitting data to, other systems from the computing device 1900. For example, the network interface subsystem 1916 may enable a data technician to connect the device to a wireless network such that the data technician may be able to transmit and receive data while in a remote location, such as a user data center. The bus subsystem 1904 may be utilized for communicating data, such as details, search terms, and so on to the supervised model of the present disclosure, and may be utilized for communicating the output of the supervised model to the one or more processors 1902 and to merchants and/or creditors via the network interface 1916.

The user interface input devices 1912 may include one or more user input devices, such as a keyboard, pointing devices such as an integrated mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to the computing device 1900. User interface output devices 1914 may include a display subsystem, a printer, or non-visual displays such as audio output devices, etc. The display subsystem may be a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 1900. The output device(s) 1914 may be used, for example, to present user interfaces to facilitate user interaction with applications performing processes described herein and variations therein, when such interaction may be appropriate.

The storage subsystem 1906 may provide a computer-readable storage medium for storing the basic programming and data constructs that may provide the functionality of at least one embodiment of the present disclosure. The applications (programs, code modules, instructions) that, when executed by one or more processors, may provide the functionality of one or more embodiments of the present disclosure, and may be stored in the storage subsystem 1906. These application modules or instructions may be executed by the one or more processors 1902. The storage subsystem 1906 may additionally provide a repository for storing data used in accordance with the present disclosure. The storage subsystem 1906 may comprise a memory subsystem 1908 and a file/disk storage subsystem 1910.

The memory subsystem 1908 may include a number of memories including a main random access memory (RAM) 1918 for storage of instructions and data during program execution and a read only memory (ROM) 1920 in which fixed instructions may be stored. The file storage subsystem 1910 may provide a non-transitory persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

The computing device 1900 may include at least one local clock 1924. The local clock 1924 may be a counter that represents the number of ticks that have transpired from a particular starting date and may be located integrally within the computing device 1900. The local clock 1924 may be used to synchronize data transfers in the processors for the computing device 1900 and all of the subsystems included therein at specific clock pulses and may be used to coordinate synchronous operations between the computing device 1900 and other systems in a data center. In one embodiment the local clock 1924 is an atomic clock. In another embodiment, the local clock is a programmable interval timer.

The computing device 1900 may be of various types including a portable computer device, tablet computer, a workstation, or any other device described below. Additionally, the computing device 1900 may include another device that may be connected to the computing device 1900 through one or more ports (e.g., USB, a headphone jack, Lightning connector, etc.). The device that may be connected to the computing device 1900 may include a plurality of ports configured to accept fiber-optic connectors. Accordingly, this device may be configured to convert optical signals to electrical signals that may be transmitted through the port connecting the device to the computing device 1900 for processing. Due to the ever-changing nature of computers and networks, the description of the computing device 1900 depicted in FIG. 19 is intended only as a specific example for purposes of illustrating the preferred embodiment of the device. Many other configurations having more or fewer components than the system depicted in FIG. 19 are possible.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B or C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, from a first computing device, a field value associated with a transaction;
   computing, using a processor, an inverse frequency value based at least in part on results of one or more queries performed by the processor based at least in part on the field value, the inverse frequency value being an inverse of a frequency of occurrence of the field value within a transaction dataset;
   providing the inverse frequency value as input to a decision tree executed by the processor to produce a score indicating a degree of certainty of an identity of a party to the transaction;
   using the processor to determine, based at least in part on the score reaching a value relative to a threshold confidence value, the identity of the party;
   obtaining an address to which communications to the party can be directed and accessed via a second computing device, the second computing device being associated with the party;
   generating confirmation data specific to the transaction;
   providing, via the address, the confirmation data to the second computing device;
   receiving, from the party, confirmation of receipt of the confirmation data;
   providing, to the party, a set of payment options;
   receiving, from the party, a selection from the set of payment options; and
   providing, to the first computing device, notice that the transaction has been completed.

2. The computer-implemented method of claim 1, further comprising determining the set of payment options by at least:
   computing, based at least in part on the field value and a transaction history associated with the identity of the party, a risk value; and
   selecting a payment option from a set of payment options based at least in part on the risk value.

3. The computer-implemented method of claim 1, wherein the field value include a description of a good or service being transacted, a quantity of the good or service being transacted, and a price of the good or service being transacted.

4. The computer-implemented method of claim 1, wherein the field value includes geolocation information corresponding to a geographic location of the first computing device.

5. The computer-implemented method of claim 1, wherein receiving confirmation of receipt of the confirmation data includes receiving biometric data associated with the party.

6. A system, comprising:
   a first computer system comprising first one or more processors and first memory including first executable instructions that, as a result of execution by the first one or more processors, cause the first computer system to:
      provide, to a second computer system:
         field value associated with a transaction; and
         an address to which communications to a party to the transaction can be directed and accessed via an asset of the party;
      receive from the second computer system an indication that the transaction has been successfully completed; and
   the second computer system comprising second one or more processors and second memory including second executable instructions that, as a result of execution by the second one or more processors, cause the second computer system to:
      perform, using the second one or more processors, a query based at least in part on the field value to obtain a query result;
      compute, using the second one or more processors, an inverse frequency value based at least in part on the query result;
      provide the inverse frequency value as input to a decision tree executed by the second one or more processors to produce a score;

using the second one or more processors to determine, based at least in part on the score reaching a value relative to a threshold value, an identity of the party;
generate confirmation data specific to the transaction;
provide, via the address, the confirmation data to the asset;
receive, from the party, confirmation of receipt of the confirmation data;
provide, to the party, a set of payment options;
receive, from the party, a selection of a payment option; and
provide, to the first computer system, notice that the transaction has been completed.

7. The system of claim 6, wherein the address of the asset is one of:
a telephone number,
an e-mail address,
a device identifier for the asset, or
a social media account identity.

8. The system of claim 6, wherein the asset is one of:
a telephone,
an e-mail inbox,
a software application installed to a computing device, or
a social media account.

9. The system of claim 6, wherein the second executable instructions further include executable instructions that cause the second computer system to, as a result of receiving the selection of the payment option, initiate a workflow that, upon completion, results in a completion of payment to a second party to the transaction.

10. The system of claim 6, wherein the second executable instructions that cause the second computer system to determine the identity include executable instructions that cause the second computer system to determine the identity as a result of providing the inverse frequency value as input to:
a random forest,
a set of naïve Bayes classifiers,
a linear set of decision rules, or
a multinomial logistic regression.

11. The system of claim 6, wherein:
the party is a consumer;
a second party to the transaction is a merchant; and
the transaction is a transaction for the consumer to buy a good or service from the merchant.

12. The system of claim 6, wherein:
the party is a first party to the transaction;
the first computer system is accessible via a website of a second party to the transaction; and
the transaction is an online transaction being conducted at least in part, via the website, by the first party using a computing device of the first party.

13. The system of claim 12, wherein the asset is accessible to the first party via the computing device.

14. A set of non-transitory computer-readable storage media having stored thereon executable instructions that, as a result of being executed by one or more processors of a computer system, cause the computer system to at least:
receive, from a first computing device, field value associated with a transaction;
compute, using the one or more processors, an inverse frequency value based at least in part on results of a query performed based at least in part on the field value;
provide the inverse frequency value as input to a decision tree executed by the one or more processors to produce a score;
using the one or more processors to determine, based at least in part on the score reaching a value relative to a threshold, an identity of a party to the transaction;
obtain an address to which communications to the party can be directed and accessed via a second computing device, the second computing device being associated with the party;
generate confirmation data specific to the transaction;
provide, via the address, the confirmation data to the second computing device;
receive, from the party, confirmation of receipt of the confirmation data;
provide, to the party, a set of payment options;
receive, from the party, a selection of a payment option; and
provide, to the first computing device, notice that the transaction has been completed.

15. The set of non-transitory computer-readable storage media of claim 14, wherein the first computing device is a point-of-sale terminal.

16. The set of non-transitory computer-readable storage media of claim 14, wherein the second computing device is a handheld computing device.

17. The set of non-transitory computer-readable storage media of claim 14, wherein the confirmation data is a hyperlink usable for confirmation that the party has access to the second computing device.

18. The set of non-transitory computer-readable storage media of claim 14, wherein each payment option in the set of payment options corresponds to a different computer-implemented process for completing the transaction.

19. The set of non-transitory computer-readable storage media of claim 14, wherein the decision tree is a member of a random forest.

20. The set of non-transitory computer-readable storage media of claim 19, wherein the random forest is trained on a dataset having at least one field for a ground truth value that identifies an individual.

21. The set of non-transitory computer-readable storage media of claim 14, wherein the executable instructions further include executable instructions that cause the computer system to, as a result of receiving the selection of the payment option, initiate a workflow that, upon completion, results in a completion of payment to a second party to the transaction, the workflow being associated with the selection of the payment option.

* * * * *